US011696074B2

(12) United States Patent
Woo et al.

(10) Patent No.: US 11,696,074 B2
(45) Date of Patent: Jul. 4, 2023

(54) SYSTEMS AND METHODS FOR ASSOCIATING PLAYBACK DEVICES WITH VOICE ASSISTANT SERVICES

(71) Applicant: Sonos, Inc., Santa Barbara, CA (US)

(72) Inventors: Sein Woo, Somerville, MA (US); John G. Tolomei, Renton, WA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 17/446,690

(22) Filed: Sep. 1, 2021

(65) Prior Publication Data

US 2022/0007111 A1 Jan. 6, 2022

Related U.S. Application Data

(63) Continuation of application No. 16/876,493, filed on May 18, 2020, now Pat. No. 11,197,096, which is a
(Continued)

(51) Int. Cl.
*H04R 3/12* (2006.01)
*G10L 15/22* (2006.01)
(Continued)

(52) U.S. Cl.
CPC ............... *H04R 3/12* (2013.01); *G06F 3/165* (2013.01); *G10L 15/22* (2013.01); *G10L 15/28* (2013.01);
(Continued)

(58) Field of Classification Search
None
See application file for complete search history.

(56) References Cited

U.S. PATENT DOCUMENTS

| 4,741,038 A | 4/1988 | Elko et al. |
| 4,941,187 A | 7/1990 | Slater |

(Continued)

FOREIGN PATENT DOCUMENTS

| AU | 2017100486 A4 | 6/2017 |
| AU | 2017100581 A4 | 6/2017 |

(Continued)

OTHER PUBLICATIONS

US 9,299,346 B1, 03/2016, Hart et al. (withdrawn)
(Continued)

*Primary Examiner* — Hemant S Patel
(74) *Attorney, Agent, or Firm* — Fortem IP LLP; Matt Lincicum

(57) ABSTRACT

Systems and methods for media playback via a media playback system include detecting a first wake word via a first network microphone device of a first playback device, detecting a second wake word via a second network microphone device of a second playback device, and forming a bonded zone that includes the first playback device and the second playback device. In response to detecting the first wake word, a first voice first voice utterance following the first wake word is transmitted a first voice assistant service. In response to detecting the second wake word, a second voice utterance following the second wake word is transmitted to a second voice assistant service. Requested media content received from the first and/or second voice assistant service is played back via the first playback device and the second playback device in synchrony with one another.

20 Claims, 24 Drawing Sheets

Related U.S. Application Data continuation of application No. 16/022,662, filed on Jun. 28, 2018, now Pat. No. 10,681,460.

(51) Int. Cl.
  *G06F 3/16* (2006.01)
  *G10L 15/28* (2013.01)
  *H04R 27/00* (2006.01)

(52) U.S. Cl.
  CPC ........ *H04R 27/00* (2013.01); *G10L 2015/223* (2013.01); *H04R 2227/003* (2013.01); *H04R 2227/005* (2013.01)

(56) References Cited

U.S. PATENT DOCUMENTS

| | | | |
|---|---|---|---|
| 4,974,213 A | 11/1990 | Siwecki | |
| 5,036,538 A | 7/1991 | Oken et al. | |
| 5,440,644 A | 8/1995 | Farinelli et al. | |
| 5,588,065 A | 12/1996 | Tanaka et al. | |
| 5,740,260 A | 4/1998 | Odom | |
| 5,761,320 A | 6/1998 | Farinelli et al. | |
| 5,923,902 A | 7/1999 | Inagaki | |
| 5,949,414 A | 9/1999 | Namikata et al. | |
| 6,032,202 A | 2/2000 | Lea et al. | |
| 6,088,459 A | 7/2000 | Hobelsberger | |
| 6,256,554 B1 | 7/2001 | DiLorenzo | |
| 6,301,603 B1 | 10/2001 | Maher et al. | |
| 6,311,157 B1 | 10/2001 | Strong | |
| 6,366,886 B1 | 4/2002 | Dragosh et al. | |
| 6,404,811 B1 | 6/2002 | Cvetko et al. | |
| 6,408,078 B1 | 6/2002 | Hobelsberger | |
| 6,469,633 B1 | 10/2002 | Wachter | |
| 6,522,886 B1 | 2/2003 | Youngs et al. | |
| 6,594,347 B1 | 7/2003 | Calder et al. | |
| 6,594,630 B1 | 7/2003 | Zlokarnik et al. | |
| 6,611,537 B1 | 8/2003 | Edens et al. | |
| 6,611,604 B1 | 8/2003 | Irby et al. | |
| 6,631,410 B1 | 10/2003 | Kowalski et al. | |
| 6,757,517 B2 | 6/2004 | Chang | |
| 6,778,869 B2 | 8/2004 | Champion | |
| 6,937,977 B2 | 8/2005 | Gerson | |
| 7,099,821 B2 | 8/2006 | Visser et al. | |
| 7,103,542 B2 | 9/2006 | Doyle | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,174,299 B2 | 2/2007 | Fujii et al. | |
| 7,228,275 B1 | 6/2007 | Endo et al. | |
| 7,236,773 B2 | 6/2007 | Thomas | |
| 7,295,548 B2 | 11/2007 | Blank et al. | |
| 7,356,471 B2 | 4/2008 | Ito et al. | |
| 7,383,297 B1 | 6/2008 | Atsmon et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,577,757 B2 | 8/2009 | Carter et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,661,107 B1 | 2/2010 | Van et al. | |
| 7,702,508 B2 | 4/2010 | Bennett | |
| 7,792,311 B1 | 9/2010 | Holmgren et al. | |
| 7,853,341 B2 | 12/2010 | McCarty et al. | |
| 7,961,892 B2 | 6/2011 | Fedigan | |
| 7,987,294 B2 | 7/2011 | Bryce et al. | |
| 8,014,423 B2 | 9/2011 | Thaler et al. | |
| 8,019,076 B1 | 9/2011 | Lambert | |
| 8,032,383 B1 | 10/2011 | Bhardwaj et al. | |
| 8,041,565 B1 | 10/2011 | Bhardwaj et al. | |
| 8,045,952 B2 | 10/2011 | Qureshey et al. | |
| 8,073,125 B2 | 12/2011 | Zhang et al. | |
| 8,073,681 B2 | 12/2011 | Baldwin et al. | |
| 8,103,009 B2 | 1/2012 | McCarty et al. | |
| 8,136,040 B2 | 3/2012 | Fleming | |
| 8,165,867 B1 | 4/2012 | Fish | |
| 8,234,395 B2 | 7/2012 | Millington | |
| 8,239,206 B1 | 8/2012 | LeBeau et al. | |
| 8,255,224 B2 | 8/2012 | Singleton et al. | |
| 8,284,982 B2 | 10/2012 | Bailey | |
| 8,290,603 B1 | 10/2012 | Lambourne | |
| 8,340,975 B1 | 12/2012 | Rosenberger | |
| 8,364,481 B2 | 1/2013 | Strope et al. | |
| 8,385,557 B2 | 2/2013 | Tashev et al. | |
| 8,386,261 B2 | 2/2013 | Mellott et al. | |
| 8,386,523 B2 | 2/2013 | Mody et al. | |
| 8,423,893 B2 | 4/2013 | Ramsay et al. | |
| 8,428,758 B2 | 4/2013 | Naik et al. | |
| 8,453,058 B1 | 5/2013 | Coccaro et al. | |
| 8,473,618 B2 | 6/2013 | Spear et al. | |
| 8,483,853 B1 | 7/2013 | Lambourne | |
| 8,484,025 B1 | 7/2013 | Moreno et al. | |
| 8,588,849 B2 | 11/2013 | Patterson et al. | |
| 8,600,443 B2 | 12/2013 | Kawaguchi et al. | |
| 8,710,970 B2 | 4/2014 | Oelrich et al. | |
| 8,719,039 B1 | 5/2014 | Sharifi | |
| 8,738,925 B1 | 5/2014 | Park et al. | |
| 8,775,191 B1 | 7/2014 | Sharifi et al. | |
| 8,831,761 B2 | 9/2014 | Kemp et al. | |
| 8,831,957 B2 | 9/2014 | Taubman et al. | |
| 8,848,879 B1 | 9/2014 | Coughlan et al. | |
| 8,861,756 B2 | 10/2014 | Zhu et al. | |
| 8,874,448 B1 | 10/2014 | Kauffmann et al. | |
| 8,938,394 B1 | 1/2015 | Faaborg et al. | |
| 8,942,252 B2 | 1/2015 | Balassanian et al. | |
| 8,983,383 B1 | 3/2015 | Haskin | |
| 8,983,844 B1 | 3/2015 | Thomas et al. | |
| 9,015,049 B2 | 4/2015 | Baldwin et al. | |
| 9,042,556 B2 | 5/2015 | Kallai et al. | |
| 9,060,224 B1 | 6/2015 | List | |
| 9,094,539 B1 | 7/2015 | Noble | |
| 9,098,467 B1 | 8/2015 | Blanksteen et al. | |
| 9,124,650 B2 | 9/2015 | Maharajh et al. | |
| 9,124,711 B2 | 9/2015 | Park et al. | |
| 9,148,742 B1 | 9/2015 | Koulomzin et al. | |
| 9,190,043 B2 | 11/2015 | Krisch et al. | |
| 9,208,785 B2 | 12/2015 | Ben-David et al. | |
| 9,215,545 B2 | 12/2015 | Dublin et al. | |
| 9,245,527 B2 | 1/2016 | Lindahl | |
| 9,251,793 B2 | 2/2016 | LeBeau et al. | |
| 9,253,572 B2 | 2/2016 | Beddingfield, Sr. et al. | |
| 9,262,612 B2 | 2/2016 | Cheyer | |
| 9,263,042 B1 | 2/2016 | Sharifi | |
| 9,275,637 B1 | 3/2016 | Salvador et al. | |
| 9,288,597 B2 | 3/2016 | Carlsson et al. | |
| 9,300,266 B2 | 3/2016 | Grokop | |
| 9,304,736 B1 | 4/2016 | Whiteley et al. | |
| 9,307,321 B1 | 4/2016 | Unruh | |
| 9,318,107 B1 | 4/2016 | Sharifi | |
| 9,319,816 B1 | 4/2016 | Narayanan | |
| 9,324,322 B1 | 4/2016 | Torok et al. | |
| 9,335,819 B1 | 5/2016 | Jaeger et al. | |
| 9,361,878 B2 | 6/2016 | Boukadakis | |
| 9,361,885 B2 | 6/2016 | Ganong, III et al. | |
| 9,368,105 B1 | 6/2016 | Freed et al. | |
| 9,373,329 B2 | 6/2016 | Strope et al. | |
| 9,374,634 B2 | 6/2016 | Macours | |
| 9,386,154 B2 | 7/2016 | Baciu et al. | |
| 9,390,708 B1 | 7/2016 | Hoffmeister | |
| 9,401,058 B2 | 7/2016 | De La Fuente et al. | |
| 9,412,392 B2 | 8/2016 | Lindahl et al. | |
| 9,426,567 B2 | 8/2016 | Lee et al. | |
| 9,431,021 B1 | 8/2016 | Scalise et al. | |
| 9,443,516 B2 | 9/2016 | Katuri et al. | |
| 9,443,527 B1 | 9/2016 | Watanabe et al. | |
| 9,472,201 B1 | 10/2016 | Sleator | |
| 9,472,203 B1 | 10/2016 | Ayrapetian et al. | |
| 9,484,030 B1 | 11/2016 | Meaney et al. | |
| 9,489,948 B1 | 11/2016 | Chu et al. | |
| 9,494,683 B1 | 11/2016 | Sadek | |
| 9,509,269 B1 | 11/2016 | Rosenberg | |
| 9,510,101 B1 | 11/2016 | Polleros | |
| 9,514,476 B2 | 12/2016 | Kay et al. | |
| 9,514,752 B2 | 12/2016 | Sharifi | |

(56) References Cited

U.S. PATENT DOCUMENTS

| | | |
|---|---|---|
| 9,516,081 B2 | 12/2016 | Tebbs et al. |
| 9,536,541 B2 | 1/2017 | Chen et al. |
| 9,548,053 B1 | 1/2017 | Basye et al. |
| 9,548,066 B2 | 1/2017 | Jain et al. |
| 9,552,816 B2 | 1/2017 | Vanlund et al. |
| 9,554,210 B1 | 1/2017 | Ayrapetian et al. |
| 9,560,441 B1 | 1/2017 | McDonough, Jr. et al. |
| 9,576,591 B2 | 2/2017 | Kim et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,626,695 B2 | 4/2017 | Balasubramanian et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,661 B1 | 4/2017 | Typrin et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,648,564 B1 | 5/2017 | Cui et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,674,587 B2 | 6/2017 | Triplett et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,566 B2 | 8/2017 | Newendorp et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,736,578 B2 | 8/2017 | Iyengar et al. |
| 9,743,204 B1 | 8/2017 | Welch et al. |
| 9,743,207 B1 | 8/2017 | Hartung |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,749,760 B2 | 8/2017 | Lambourne |
| 9,754,605 B1 | 9/2017 | Chhetri |
| 9,762,967 B2 | 9/2017 | Clarke et al. |
| 9,769,420 B1 | 9/2017 | Moses |
| 9,779,725 B2 | 10/2017 | Sun et al. |
| 9,779,732 B2 | 10/2017 | Lee et al. |
| 9,779,734 B2 | 10/2017 | Lee |
| 9,779,735 B2 | 10/2017 | Civelli et al. |
| 9,805,733 B2 | 10/2017 | Park |
| 9,811,314 B2 | 11/2017 | Plagge et al. |
| 9,813,810 B1 | 11/2017 | Nongpiur |
| 9,813,812 B2 | 11/2017 | Berthelsen et al. |
| 9,818,407 B1 | 11/2017 | Secker-Walker et al. |
| 9,820,036 B1 | 11/2017 | Tritschler et al. |
| 9,820,039 B2 | 11/2017 | Lang |
| 9,826,306 B2 | 11/2017 | Lang |
| 9,865,259 B1 | 1/2018 | Typrin et al. |
| 9,865,264 B2 | 1/2018 | Gelfenbeyn et al. |
| 9,881,616 B2 | 1/2018 | Beckley et al. |
| 9,900,723 B1 | 2/2018 | Choisel et al. |
| 9,916,839 B1 | 3/2018 | Scalise et al. |
| 9,947,316 B2 | 4/2018 | Millington et al. |
| 9,947,333 B1 | 4/2018 | David |
| 9,972,318 B1 | 5/2018 | Kelly et al. |
| 9,972,343 B1 | 5/2018 | Thorson et al. |
| 9,973,849 B1 | 5/2018 | Zhang et al. |
| 9,979,560 B2 | 5/2018 | Kim et al. |
| 10,013,381 B2 | 7/2018 | Mayman et al. |
| 10,013,995 B1 | 7/2018 | Lashkari et al. |
| 10,025,447 B1 | 7/2018 | Dixit et al. |
| 10,026,401 B1 | 7/2018 | Mutagi et al. |
| 10,048,930 B1 | 8/2018 | Vega et al. |
| 10,049,675 B2 | 8/2018 | Haughay |
| 10,051,366 B1 | 8/2018 | Buoni et al. |
| 10,051,600 B1 | 8/2018 | Zhong et al. |
| 10,057,698 B2 | 8/2018 | Drinkwater et al. |
| RE47,049 E | 9/2018 | Zhu et al. |
| 10,068,573 B1 | 9/2018 | Aykac et al. |
| 10,074,369 B2 | 9/2018 | Devaraj et al. |
| 10,074,371 B1 | 9/2018 | Wang et al. |
| 10,079,015 B1 | 9/2018 | Lockhart et al. |
| 10,089,981 B1 | 10/2018 | Elangovan et al. |
| 10,108,393 B2 | 10/2018 | Millington et al. |
| 10,115,400 B2 | 10/2018 | Wilberding |
| 10,116,748 B2 | 10/2018 | Farmer et al. |
| 10,127,911 B2 | 11/2018 | Kim et al. |
| 10,134,388 B1 | 11/2018 | Lilly |
| 10,134,399 B2 | 11/2018 | Lang et al. |
| 10,136,204 B1 | 11/2018 | Poole et al. |
| 10,152,969 B2 | 12/2018 | Reilly et al. |
| 10,181,323 B2 | 1/2019 | Beckhardt et al. |
| 10,186,265 B1 | 1/2019 | Lockhart et al. |
| 10,186,266 B1 | 1/2019 | Devaraj et al. |
| 10,192,546 B1 | 1/2019 | Piersol et al. |
| 10,224,056 B1 | 3/2019 | Torok et al. |
| 10,225,651 B2 | 3/2019 | Lang |
| 10,229,680 B1 | 3/2019 | Gillespie et al. |
| 10,241,754 B1 | 3/2019 | Kadarundalagi Raghuram Doss et al. |
| 10,248,376 B2 | 4/2019 | Keyser-Allen et al. |
| 10,276,161 B2 | 4/2019 | Hughes et al. |
| 10,297,256 B2 | 5/2019 | Reilly et al. |
| 10,339,917 B2 | 7/2019 | Aleksic et al. |
| 10,339,957 B1 | 7/2019 | Chenier et al. |
| 10,346,122 B1 | 7/2019 | Morgan |
| 10,354,650 B2 | 7/2019 | Gruenstein et al. |
| 10,365,887 B1 | 7/2019 | Mulherkar |
| 10,365,889 B2 | 7/2019 | Plagge et al. |
| 10,366,688 B2 | 7/2019 | Gunn et al. |
| 10,366,699 B1 | 7/2019 | Dharia et al. |
| 10,374,816 B1 | 8/2019 | Leblang et al. |
| 10,381,001 B2 | 8/2019 | Gunn et al. |
| 10,381,002 B2 | 8/2019 | Gunn et al. |
| 10,381,003 B2 | 8/2019 | Wakisaka et al. |
| 10,388,272 B1 | 8/2019 | Thomson et al. |
| 10,433,058 B1 | 10/2019 | Torgerson et al. |
| 10,445,057 B2 | 10/2019 | Vega et al. |
| 10,445,365 B2 | 10/2019 | Luke et al. |
| 10,469,966 B2 | 11/2019 | Lambourne |
| 10,499,146 B2 | 12/2019 | Lang et al. |
| 10,510,340 B1 | 12/2019 | Fu et al. |
| 10,511,904 B2 | 12/2019 | Buoni et al. |
| 10,515,625 B1 | 12/2019 | Metallinou et al. |
| 10,522,146 B1 | 12/2019 | Tushinskiy |
| 10,546,583 B2 | 1/2020 | White et al. |
| 10,573,312 B1 | 2/2020 | Thomson et al. |
| 10,573,321 B1 | 2/2020 | Smith et al. |
| 10,580,405 B1 | 3/2020 | Wang et al. |
| 10,586,540 B1 | 3/2020 | Smith et al. |
| 10,599,287 B2 | 3/2020 | Kumar et al. |
| 10,600,406 B1 | 3/2020 | Shapiro et al. |
| 10,602,268 B1 | 3/2020 | Soto |
| 10,614,807 B2 | 4/2020 | Beckhardt et al. |
| 10,621,981 B2 | 4/2020 | Sereshki |
| 10,622,009 B1 | 4/2020 | Zhang et al. |
| 10,623,811 B1 | 4/2020 | Cwik |
| 10,624,612 B2 | 4/2020 | Sumi et al. |
| 10,643,609 B1 | 5/2020 | Pogue et al. |
| 10,645,130 B2 | 5/2020 | Corbin et al. |
| 10,672,383 B1 | 6/2020 | Thomson et al. |
| 10,679,625 B1 | 6/2020 | Lockhart et al. |
| 10,681,460 B2 | 6/2020 | Woo et al. |
| 10,685,669 B1 | 6/2020 | Lan et al. |
| 10,694,608 B2 | 6/2020 | Baker et al. |
| 10,706,843 B1 | 7/2020 | Elangovan et al. |
| 10,712,997 B2 | 7/2020 | Wilberding et al. |

(56) References Cited

U.S. PATENT DOCUMENTS

| | | | |
|---|---|---|---|
| 10,728,196 B2 | 7/2020 | Wang | |
| 10,740,065 B2 | 8/2020 | Jarvis et al. | |
| 10,748,531 B2 * | 8/2020 | Kim | G10L 15/22 |
| 10,762,896 B1 | 9/2020 | Yavagal et al. | |
| 10,777,189 B1 | 9/2020 | Fu et al. | |
| 10,797,667 B2 | 10/2020 | Fish et al. | |
| 10,847,143 B2 | 11/2020 | Millington et al. | |
| 10,847,149 B1 | 11/2020 | Mok et al. | |
| 10,848,885 B2 | 11/2020 | Lambourne | |
| RE48,371 E | 12/2020 | Zhu et al. | |
| 10,867,596 B2 | 12/2020 | Yoneda et al. | |
| 10,878,811 B2 | 12/2020 | Smith et al. | |
| 10,878,826 B2 | 12/2020 | Li et al. | |
| 10,897,679 B2 | 1/2021 | Lambourne | |
| 10,911,596 B1 | 2/2021 | Do et al. | |
| 10,943,598 B2 | 3/2021 | Singh et al. | |
| 10,971,158 B1 | 4/2021 | Patangay et al. | |
| 11,127,405 B1 | 9/2021 | Antos et al. | |
| 2001/0003173 A1 | 6/2001 | Lim | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0034280 A1 | 3/2002 | Infosino | |
| 2002/0046023 A1 | 4/2002 | Fujii et al. | |
| 2002/0072816 A1 | 6/2002 | Shdema et al. | |
| 2002/0116196 A1 | 8/2002 | Tran | |
| 2002/0124097 A1 | 9/2002 | Isely et al. | |
| 2003/0015354 A1 | 1/2003 | Edwards et al. | |
| 2003/0038848 A1 | 2/2003 | Lee et al. | |
| 2003/0040908 A1 | 2/2003 | Yang et al. | |
| 2003/0070182 A1 | 4/2003 | Pierre et al. | |
| 2003/0070869 A1 | 4/2003 | Hlibowicki | |
| 2003/0072462 A1 | 4/2003 | Hlibowicki | |
| 2003/0095672 A1 | 5/2003 | Hobelsberger | |
| 2003/0130850 A1 | 7/2003 | Badt et al. | |
| 2003/0157951 A1 | 8/2003 | Hasty, Jr. | |
| 2003/0235244 A1 | 12/2003 | Pessoa et al. | |
| 2004/0024478 A1 | 2/2004 | Hans et al. | |
| 2004/0093219 A1 | 5/2004 | Shin et al. | |
| 2004/0105566 A1 | 6/2004 | Matsunaga et al. | |
| 2004/0127241 A1 | 7/2004 | Shostak | |
| 2004/0128135 A1 | 7/2004 | Anastasakos et al. | |
| 2004/0234088 A1 | 11/2004 | McCarty et al. | |
| 2005/0031131 A1 | 2/2005 | Browning et al. | |
| 2005/0031132 A1 | 2/2005 | Browning et al. | |
| 2005/0031133 A1 | 2/2005 | Browning et al. | |
| 2005/0031134 A1 | 2/2005 | Leske | |
| 2005/0031137 A1 | 2/2005 | Browning et al. | |
| 2005/0031138 A1 | 2/2005 | Browning et al. | |
| 2005/0031139 A1 | 2/2005 | Browning et al. | |
| 2005/0031140 A1 | 2/2005 | Browning | |
| 2005/0033582 A1 | 2/2005 | Gadd et al. | |
| 2005/0047606 A1 | 3/2005 | Lee et al. | |
| 2005/0077843 A1 | 4/2005 | Benditt | |
| 2005/0164664 A1 | 7/2005 | DiFonzo et al. | |
| 2005/0195988 A1 | 9/2005 | Tashev et al. | |
| 2005/0201254 A1 | 9/2005 | Looney et al. | |
| 2005/0207584 A1 | 9/2005 | Bright | |
| 2005/0235334 A1 | 10/2005 | Togashi et al. | |
| 2005/0254662 A1 | 11/2005 | Blank et al. | |
| 2005/0268234 A1 | 12/2005 | Rossi et al. | |
| 2005/0283330 A1 | 12/2005 | Laraia et al. | |
| 2005/0283475 A1 | 12/2005 | Beranek et al. | |
| 2006/0004834 A1 | 1/2006 | Pyhalammi et al. | |
| 2006/0023945 A1 | 2/2006 | King et al. | |
| 2006/0041431 A1 | 2/2006 | Maes | |
| 2006/0093128 A1 | 5/2006 | Oxford | |
| 2006/0104451 A1 | 5/2006 | Browning et al. | |
| 2006/0147058 A1 | 7/2006 | Wang | |
| 2006/0190269 A1 | 8/2006 | Tessel et al. | |
| 2006/0190968 A1 | 8/2006 | Jung et al. | |
| 2006/0247913 A1 | 11/2006 | Huerta et al. | |
| 2006/0262943 A1 | 11/2006 | Oxford | |
| 2007/0018844 A1 | 1/2007 | Sutardja | |
| 2007/0019815 A1 | 1/2007 | Asada et al. | |
| 2007/0033043 A1 | 2/2007 | Hyakumoto | |
| 2007/0038999 A1 | 2/2007 | Millington | |
| 2007/0060054 A1 | 3/2007 | Romesburg | |
| 2007/0071206 A1 | 3/2007 | Gainsboro et al. | |
| 2007/0071255 A1 | 3/2007 | Schobben | |
| 2007/0076131 A1 | 4/2007 | Li et al. | |
| 2007/0076906 A1 | 4/2007 | Takagi et al. | |
| 2007/0140058 A1 | 6/2007 | McIntosh et al. | |
| 2007/0140521 A1 | 6/2007 | Mitobe et al. | |
| 2007/0142944 A1 | 6/2007 | Goldberg et al. | |
| 2007/0147651 A1 | 6/2007 | Mitobe et al. | |
| 2007/0201639 A1 | 8/2007 | Park et al. | |
| 2007/0254604 A1 | 11/2007 | Kim | |
| 2007/0286426 A1 | 12/2007 | Xiang et al. | |
| 2008/0037814 A1 | 2/2008 | Shau | |
| 2008/0090537 A1 | 4/2008 | Sutardja | |
| 2008/0090617 A1 | 4/2008 | Sutardja | |
| 2008/0144858 A1 | 6/2008 | Khawand et al. | |
| 2008/0146289 A1 | 6/2008 | Korneluk et al. | |
| 2008/0182518 A1 | 7/2008 | Lo | |
| 2008/0207115 A1 | 8/2008 | Lee et al. | |
| 2008/0208594 A1 | 8/2008 | Cross et al. | |
| 2008/0221897 A1 | 9/2008 | Cerra et al. | |
| 2008/0247530 A1 | 10/2008 | Barton et al. | |
| 2008/0248797 A1 | 10/2008 | Freeman et al. | |
| 2008/0291896 A1 | 11/2008 | Tuubel et al. | |
| 2008/0301729 A1 | 12/2008 | Broos et al. | |
| 2009/0003620 A1 | 1/2009 | McKillop et al. | |
| 2009/0005893 A1 | 1/2009 | Sugii et al. | |
| 2009/0010445 A1 | 1/2009 | Matsuo | |
| 2009/0018828 A1 | 1/2009 | Nakadai et al. | |
| 2009/0043206 A1 | 2/2009 | Towfiq et al. | |
| 2009/0052688 A1 | 2/2009 | Ishibashi et al. | |
| 2009/0076821 A1 | 3/2009 | Brenner et al. | |
| 2009/0153289 A1 | 6/2009 | Hope et al. | |
| 2009/0191854 A1 | 7/2009 | Beason | |
| 2009/0197524 A1 | 8/2009 | Haff et al. | |
| 2009/0220107 A1 | 9/2009 | Every et al. | |
| 2009/0228919 A1 | 9/2009 | Zott et al. | |
| 2009/0238377 A1 | 9/2009 | Ramakrishnan et al. | |
| 2009/0238386 A1 | 9/2009 | Usher et al. | |
| 2009/0248397 A1 | 10/2009 | Garcia et al. | |
| 2009/0249222 A1 | 10/2009 | Schmidt et al. | |
| 2009/0264072 A1 | 10/2009 | Dai | |
| 2009/0323907 A1 | 12/2009 | Gupta et al. | |
| 2009/0326949 A1 | 12/2009 | Douthitt et al. | |
| 2010/0014690 A1 | 1/2010 | Wolff et al. | |
| 2010/0023638 A1 | 1/2010 | Bowman | |
| 2010/0035593 A1 | 2/2010 | Franco et al. | |
| 2010/0041443 A1 | 2/2010 | Yokota | |
| 2010/0070922 A1 | 3/2010 | DeMaio et al. | |
| 2010/0075723 A1 | 3/2010 | Min et al. | |
| 2010/0088100 A1 | 4/2010 | Lindahl | |
| 2010/0092004 A1 | 4/2010 | Kuze | |
| 2010/0161335 A1 | 6/2010 | Whynot | |
| 2010/0172516 A1 | 7/2010 | Lastrucci | |
| 2010/0178873 A1 | 7/2010 | Lee et al. | |
| 2010/0179874 A1 | 7/2010 | Higgins et al. | |
| 2010/0185448 A1 | 7/2010 | Meisel | |
| 2010/0211199 A1 | 8/2010 | Naik et al. | |
| 2011/0033059 A1 | 2/2011 | Bhaskar et al. | |
| 2011/0035580 A1 | 2/2011 | Wang et al. | |
| 2011/0044461 A1 | 2/2011 | Kuech et al. | |
| 2011/0044489 A1 | 2/2011 | Saiki et al. | |
| 2011/0046952 A1 | 2/2011 | Koshinaka | |
| 2011/0066634 A1 | 3/2011 | Phillips et al. | |
| 2011/0091055 A1 | 4/2011 | Leblanc | |
| 2011/0103615 A1 | 5/2011 | Sun | |
| 2011/0131032 A1 | 6/2011 | Yang et al. | |
| 2011/0145581 A1 | 6/2011 | Malhotra et al. | |
| 2011/0170707 A1 | 7/2011 | Yamada et al. | |
| 2011/0182436 A1 | 7/2011 | Murgia et al. | |
| 2011/0202924 A1 | 8/2011 | Banguero et al. | |
| 2011/0218656 A1 | 9/2011 | Bishop et al. | |
| 2011/0267985 A1 | 11/2011 | Wilkinson et al. | |
| 2011/0276333 A1 | 11/2011 | Wang et al. | |
| 2011/0280422 A1 | 11/2011 | Neumeyer et al. | |
| 2011/0285808 A1 | 11/2011 | Feng et al. | |
| 2011/0289506 A1 | 11/2011 | Trivi et al. | |

(56) References Cited

U.S. PATENT DOCUMENTS

| | | |
|---|---|---|
| 2011/0299706 A1 | 12/2011 | Sakai |
| 2012/0020486 A1 | 1/2012 | Fried et al. |
| 2012/0022863 A1 | 1/2012 | Cho et al. |
| 2012/0022864 A1 | 1/2012 | Leman et al. |
| 2012/0078635 A1 | 3/2012 | Rothkopf et al. |
| 2012/0086568 A1 | 4/2012 | Scott et al. |
| 2012/0123268 A1 | 5/2012 | Tanaka et al. |
| 2012/0128160 A1 | 5/2012 | Kim et al. |
| 2012/0131125 A1 | 5/2012 | Seidel et al. |
| 2012/0148075 A1 | 6/2012 | Goh et al. |
| 2012/0162540 A1 | 6/2012 | Ouchi et al. |
| 2012/0163603 A1 | 6/2012 | Abe et al. |
| 2012/0177215 A1 | 7/2012 | Bose et al. |
| 2012/0183149 A1 | 7/2012 | Hiroe |
| 2012/0224715 A1 | 9/2012 | Kikkeri |
| 2012/0297284 A1 | 11/2012 | Matthews, III et al. |
| 2012/0308044 A1 | 12/2012 | Vander Mey et al. |
| 2012/0308046 A1 | 12/2012 | Muza |
| 2013/0006453 A1 | 1/2013 | Wang et al. |
| 2013/0024018 A1 | 1/2013 | Chang et al. |
| 2013/0034241 A1 | 2/2013 | Pandey et al. |
| 2013/0039527 A1 | 2/2013 | Jensen et al. |
| 2013/0051755 A1 | 2/2013 | Brown et al. |
| 2013/0058492 A1 | 3/2013 | Silzle et al. |
| 2013/0066453 A1 | 3/2013 | Seefeldt |
| 2013/0080146 A1 | 3/2013 | Kato et al. |
| 2013/0124211 A1 | 5/2013 | McDonough |
| 2013/0148821 A1 | 6/2013 | Sorensen |
| 2013/0170647 A1 | 7/2013 | Reilly et al. |
| 2013/0179173 A1 | 7/2013 | Lee et al. |
| 2013/0183944 A1 | 7/2013 | Mozer et al. |
| 2013/0191119 A1 | 7/2013 | Sugiyama |
| 2013/0191122 A1 | 7/2013 | Mason |
| 2013/0198298 A1 | 8/2013 | Li et al. |
| 2013/0211826 A1 | 8/2013 | Mannby |
| 2013/0216056 A1 | 8/2013 | Thyssen |
| 2013/0262101 A1 | 10/2013 | Srinivasan |
| 2013/0315420 A1 | 11/2013 | You |
| 2013/0317635 A1 | 11/2013 | Bates et al. |
| 2013/0322462 A1 | 12/2013 | Poulsen |
| 2013/0322665 A1 | 12/2013 | Bennett et al. |
| 2013/0324031 A1 | 12/2013 | Loureiro |
| 2013/0329896 A1 | 12/2013 | Krishnaswamy et al. |
| 2013/0331970 A1 | 12/2013 | Beckhardt et al. |
| 2013/0332165 A1 | 12/2013 | Beckley et al. |
| 2013/0339028 A1 | 12/2013 | Rosner et al. |
| 2013/0343567 A1 | 12/2013 | Triplett et al. |
| 2014/0003611 A1 | 1/2014 | Mohammad et al. |
| 2014/0003625 A1 | 1/2014 | Sheen et al. |
| 2014/0003635 A1 | 1/2014 | Mohammad et al. |
| 2014/0005813 A1 | 1/2014 | Reimann |
| 2014/0006026 A1 | 1/2014 | Lamb et al. |
| 2014/0006825 A1 | 1/2014 | Shenhav |
| 2014/0019743 A1 | 1/2014 | DeLuca |
| 2014/0034929 A1 | 2/2014 | Hamada et al. |
| 2014/0046464 A1 | 2/2014 | Reimann |
| 2014/0064501 A1 | 3/2014 | Olsen et al. |
| 2014/0073298 A1 | 3/2014 | Rossmann |
| 2014/0075306 A1 | 3/2014 | Rega |
| 2014/0075311 A1 | 3/2014 | Boettcher et al. |
| 2014/0094151 A1 | 4/2014 | Klappert et al. |
| 2014/0100854 A1 | 4/2014 | Chen et al. |
| 2014/0109138 A1 | 4/2014 | Cannistraro et al. |
| 2014/0122075 A1 | 5/2014 | Bak et al. |
| 2014/0136195 A1 | 5/2014 | Abdossalami et al. |
| 2014/0145168 A1 | 5/2014 | Ohsawa et al. |
| 2014/0146983 A1 | 5/2014 | Kim et al. |
| 2014/0149118 A1 | 5/2014 | Lee et al. |
| 2014/0163978 A1 | 6/2014 | Basye et al. |
| 2014/0164400 A1 | 6/2014 | Kruglick |
| 2014/0167931 A1 | 6/2014 | Lee et al. |
| 2014/0168344 A1 | 6/2014 | Shoemake et al. |
| 2014/0172953 A1 | 6/2014 | Blanksteen |
| 2014/0181271 A1 | 6/2014 | Millington |
| 2014/0192986 A1 | 7/2014 | Lee et al. |
| 2014/0195252 A1 | 7/2014 | Gruber et al. |
| 2014/0207457 A1 | 7/2014 | Biatov et al. |
| 2014/0214429 A1 | 7/2014 | Pantel |
| 2014/0215332 A1 | 7/2014 | Lee et al. |
| 2014/0219472 A1 | 8/2014 | Huang et al. |
| 2014/0222436 A1 | 8/2014 | Binder et al. |
| 2014/0229184 A1 | 8/2014 | Shires |
| 2014/0244013 A1 | 8/2014 | Reilly |
| 2014/0244712 A1 | 8/2014 | Walters et al. |
| 2014/0249817 A1 | 9/2014 | Hart et al. |
| 2014/0252386 A1 | 9/2014 | Ito et al. |
| 2014/0254805 A1 | 9/2014 | Su et al. |
| 2014/0258292 A1 | 9/2014 | Thramann et al. |
| 2014/0259075 A1 | 9/2014 | Chang et al. |
| 2014/0269757 A1 | 9/2014 | Park et al. |
| 2014/0270282 A1 | 9/2014 | Tammi et al. |
| 2014/0274185 A1 | 9/2014 | Luna et al. |
| 2014/0274203 A1 | 9/2014 | Ganong, III et al. |
| 2014/0274218 A1 | 9/2014 | Kadiwala et al. |
| 2014/0277650 A1 | 9/2014 | Zurek et al. |
| 2014/0278372 A1 | 9/2014 | Nakadai et al. |
| 2014/0278933 A1 | 9/2014 | McMillan |
| 2014/0291642 A1 | 10/2014 | Watabe et al. |
| 2014/0303969 A1 | 10/2014 | Inose et al. |
| 2014/0310002 A1 | 10/2014 | Nitz et al. |
| 2014/0310614 A1 | 10/2014 | Jones |
| 2014/0324203 A1 | 10/2014 | Coburn, IV et al. |
| 2014/0330896 A1 | 11/2014 | Addala et al. |
| 2014/0334645 A1 | 11/2014 | Yun et al. |
| 2014/0340888 A1 | 11/2014 | Ishisone et al. |
| 2014/0357248 A1 | 12/2014 | Tonshal et al. |
| 2014/0358535 A1 | 12/2014 | Lee et al. |
| 2014/0363022 A1 | 12/2014 | Dizon et al. |
| 2014/0363024 A1 | 12/2014 | Apodaca |
| 2014/0365227 A1 | 12/2014 | Cash et al. |
| 2014/0369491 A1 | 12/2014 | Kloberdans et al. |
| 2014/0372109 A1 | 12/2014 | Iyer et al. |
| 2015/0006176 A1 | 1/2015 | Pogue et al. |
| 2015/0006184 A1 | 1/2015 | Marti et al. |
| 2015/0010169 A1 | 1/2015 | Popova et al. |
| 2015/0014680 A1 | 1/2015 | Yamazaki et al. |
| 2015/0016642 A1 | 1/2015 | Walsh et al. |
| 2015/0018992 A1 | 1/2015 | Griffiths et al. |
| 2015/0019201 A1 | 1/2015 | Schoenbach |
| 2015/0019219 A1 | 1/2015 | Tzirkel-Hancock et al. |
| 2015/0036831 A1 | 2/2015 | Klippel |
| 2015/0039303 A1 | 2/2015 | Lesso et al. |
| 2015/0039317 A1 | 2/2015 | Klein et al. |
| 2015/0058018 A1 | 2/2015 | Georges et al. |
| 2015/0063580 A1 | 3/2015 | Huang et al. |
| 2015/0066479 A1 | 3/2015 | Pasupalak et al. |
| 2015/0086034 A1 | 3/2015 | Lombardi et al. |
| 2015/0091709 A1 | 4/2015 | Reichert et al. |
| 2015/0092947 A1 | 4/2015 | Gossain et al. |
| 2015/0104037 A1 | 4/2015 | Lee et al. |
| 2015/0106085 A1 | 4/2015 | Lindahl |
| 2015/0110294 A1 | 4/2015 | Chen et al. |
| 2015/0112672 A1 | 4/2015 | Giacobello et al. |
| 2015/0124975 A1 | 5/2015 | Pontoppidan |
| 2015/0128065 A1 | 5/2015 | Torii et al. |
| 2015/0134456 A1 | 5/2015 | Baldwin |
| 2015/0154976 A1 | 6/2015 | Mutagi |
| 2015/0161990 A1 | 6/2015 | Sharifi |
| 2015/0169279 A1 | 6/2015 | Duga |
| 2015/0170645 A1 | 6/2015 | Di et al. |
| 2015/0170665 A1 | 6/2015 | Gundeti et al. |
| 2015/0172843 A1 | 6/2015 | Quan |
| 2015/0179181 A1 | 6/2015 | Morris et al. |
| 2015/0180432 A1 | 6/2015 | Gao et al. |
| 2015/0181318 A1 | 6/2015 | Gautama et al. |
| 2015/0189438 A1 | 7/2015 | Hampiholi et al. |
| 2015/0200454 A1 | 7/2015 | Heusdens et al. |
| 2015/0200923 A1 | 7/2015 | Triplett |
| 2015/0201271 A1 | 7/2015 | Diethorn et al. |
| 2015/0221678 A1 | 8/2015 | Yamazaki et al. |
| 2015/0222563 A1 | 8/2015 | Burns et al. |
| 2015/0222987 A1 | 8/2015 | Angel, Jr. et al. |
| 2015/0228274 A1 | 8/2015 | Leppanen et al. |
| 2015/0228803 A1 | 8/2015 | Koezuka et al. |

(56) References Cited

U.S. PATENT DOCUMENTS

| | | |
|---|---|---|
| 2015/0237406 A1 | 8/2015 | Ochoa et al. |
| 2015/0243287 A1 | 8/2015 | Nakano et al. |
| 2015/0245152 A1 | 8/2015 | Ding et al. |
| 2015/0245154 A1 | 8/2015 | Dadu et al. |
| 2015/0249889 A1 | 9/2015 | Iyer et al. |
| 2015/0253292 A1 | 9/2015 | Larkin et al. |
| 2015/0253960 A1 | 9/2015 | Lin et al. |
| 2015/0254057 A1 | 9/2015 | Klein et al. |
| 2015/0263174 A1 | 9/2015 | Yamazaki et al. |
| 2015/0271593 A1 | 9/2015 | Sun et al. |
| 2015/0277846 A1 | 10/2015 | Yen et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0319529 A1 | 11/2015 | Klippel |
| 2015/0325267 A1 | 11/2015 | Lee et al. |
| 2015/0331663 A1 | 11/2015 | Beckhardt et al. |
| 2015/0334471 A1 | 11/2015 | Innes et al. |
| 2015/0338917 A1 | 11/2015 | Steiner et al. |
| 2015/0341406 A1 | 11/2015 | Rockefeller et al. |
| 2015/0346845 A1 | 12/2015 | Di et al. |
| 2015/0348548 A1 | 12/2015 | Piernot et al. |
| 2015/0348551 A1 | 12/2015 | Gruber et al. |
| 2015/0355878 A1 | 12/2015 | Corbin |
| 2015/0363061 A1 | 12/2015 | De, III et al. |
| 2015/0363401 A1 | 12/2015 | Chen et al. |
| 2015/0370531 A1 | 12/2015 | Faaborg |
| 2015/0371657 A1 | 12/2015 | Gao |
| 2015/0371659 A1 | 12/2015 | Gao |
| 2015/0371664 A1 | 12/2015 | Bar-Or et al. |
| 2015/0380010 A1 | 12/2015 | Srinivasan |
| 2015/0382047 A1 | 12/2015 | Van Os et al. |
| 2016/0007116 A1 | 1/2016 | Holman |
| 2016/0018873 A1 | 1/2016 | Fernald et al. |
| 2016/0021458 A1 | 1/2016 | Johnson et al. |
| 2016/0026428 A1 | 1/2016 | Morganstern et al. |
| 2016/0029142 A1 | 1/2016 | Isaac et al. |
| 2016/0035321 A1 | 2/2016 | Cho et al. |
| 2016/0035337 A1 | 2/2016 | Aggarwal et al. |
| 2016/0036962 A1 | 2/2016 | Rand et al. |
| 2016/0042748 A1 | 2/2016 | Jain et al. |
| 2016/0044151 A1 | 2/2016 | Shoemaker et al. |
| 2016/0050488 A1 | 2/2016 | Matheja et al. |
| 2016/0055850 A1 | 2/2016 | Nakadai et al. |
| 2016/0057522 A1 | 2/2016 | Choisel et al. |
| 2016/0070526 A1 | 3/2016 | Sheen |
| 2016/0072804 A1 | 3/2016 | Chien et al. |
| 2016/0077710 A1 | 3/2016 | Lewis et al. |
| 2016/0086609 A1 | 3/2016 | Yue et al. |
| 2016/0088036 A1 | 3/2016 | Corbin et al. |
| 2016/0088392 A1 | 3/2016 | Huttunen et al. |
| 2016/0093304 A1 | 3/2016 | Kim et al. |
| 2016/0094718 A1 | 3/2016 | Mani et al. |
| 2016/0094917 A1 | 3/2016 | Wilk et al. |
| 2016/0098393 A1 | 4/2016 | Hebert |
| 2016/0098992 A1 | 4/2016 | Renard et al. |
| 2016/0103653 A1 | 4/2016 | Jang |
| 2016/0104480 A1 | 4/2016 | Sharifi |
| 2016/0111110 A1 | 4/2016 | Gautama et al. |
| 2016/0125876 A1 | 5/2016 | Schroeter et al. |
| 2016/0127780 A1 | 5/2016 | Roberts et al. |
| 2016/0133259 A1 | 5/2016 | Rubin et al. |
| 2016/0134966 A1 | 5/2016 | Fitzgerald et al. |
| 2016/0134982 A1 | 5/2016 | Iyer |
| 2016/0140957 A1 | 5/2016 | Duta et al. |
| 2016/0148615 A1 | 5/2016 | Lee et al. |
| 2016/0154089 A1 | 6/2016 | Altman |
| 2016/0155442 A1 | 6/2016 | Kannan et al. |
| 2016/0155443 A1 | 6/2016 | Khan et al. |
| 2016/0157035 A1 | 6/2016 | Russell et al. |
| 2016/0162469 A1 | 6/2016 | Santos |
| 2016/0171976 A1 | 6/2016 | Sun et al. |
| 2016/0173578 A1 | 6/2016 | Sharma et al. |
| 2016/0173983 A1 | 6/2016 | Berthelsen et al. |
| 2016/0180853 A1 | 6/2016 | Vanlund et al. |
| 2016/0189716 A1 | 6/2016 | Lindahl et al. |
| 2016/0192099 A1 | 6/2016 | Oishi et al. |
| 2016/0196499 A1 | 7/2016 | Khan et al. |
| 2016/0203331 A1 | 7/2016 | Khan et al. |
| 2016/0210110 A1 | 7/2016 | Feldman |
| 2016/0212538 A1 | 7/2016 | Fullam et al. |
| 2016/0216938 A1 | 7/2016 | Millington |
| 2016/0217789 A1 | 7/2016 | Lee et al. |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0234615 A1 | 8/2016 | Lambourne |
| 2016/0239255 A1 | 8/2016 | Chavez et al. |
| 2016/0240192 A1 | 8/2016 | Raghuvir |
| 2016/0241976 A1 | 8/2016 | Pearson |
| 2016/0253050 A1 | 9/2016 | Mishra et al. |
| 2016/0260431 A1 | 9/2016 | Newendorp et al. |
| 2016/0283841 A1 | 9/2016 | Sainath et al. |
| 2016/0302018 A1 | 10/2016 | Russell et al. |
| 2016/0314782 A1 | 10/2016 | Klimanis |
| 2016/0316293 A1 | 10/2016 | Klimanis |
| 2016/0322045 A1 | 11/2016 | Hatfield et al. |
| 2016/0336519 A1 | 11/2016 | Seo et al. |
| 2016/0343866 A1 | 11/2016 | Koezuka et al. |
| 2016/0343949 A1 | 11/2016 | Seo et al. |
| 2016/0343954 A1 | 11/2016 | Seo et al. |
| 2016/0345114 A1 | 11/2016 | Hanna et al. |
| 2016/0352915 A1 | 12/2016 | Gautama |
| 2016/0353217 A1 | 12/2016 | Starobin et al. |
| 2016/0353218 A1 | 12/2016 | Starobin et al. |
| 2016/0357503 A1 | 12/2016 | Triplett et al. |
| 2016/0364206 A1 | 12/2016 | Keyser-Allen et al. |
| 2016/0366515 A1 | 12/2016 | Mendes et al. |
| 2016/0372113 A1 | 12/2016 | David et al. |
| 2016/0372688 A1 | 12/2016 | Seo et al. |
| 2016/0373269 A1 | 12/2016 | Okubo et al. |
| 2016/0373909 A1 | 12/2016 | Rasmussen et al. |
| 2016/0379634 A1 | 12/2016 | Yamamoto et al. |
| 2017/0003931 A1 | 1/2017 | Dvortsov et al. |
| 2017/0012207 A1 | 1/2017 | Seo et al. |
| 2017/0012232 A1 | 1/2017 | Kataishi et al. |
| 2017/0019732 A1 | 1/2017 | Mendes et al. |
| 2017/0025124 A1 | 1/2017 | Mixter et al. |
| 2017/0025615 A1 | 1/2017 | Seo et al. |
| 2017/0025630 A1 | 1/2017 | Seo et al. |
| 2017/0026769 A1 | 1/2017 | Patel |
| 2017/0032244 A1 | 2/2017 | Kurata |
| 2017/0034263 A1 | 2/2017 | Archambault et al. |
| 2017/0039025 A1 | 2/2017 | Kielak |
| 2017/0040002 A1 | 2/2017 | Basson et al. |
| 2017/0040018 A1 | 2/2017 | Tormey |
| 2017/0041724 A1 | 2/2017 | Master et al. |
| 2017/0053648 A1 | 2/2017 | Chi |
| 2017/0053650 A1 | 2/2017 | Ogawa |
| 2017/0060526 A1 | 3/2017 | Barton et al. |
| 2017/0062734 A1 | 3/2017 | Suzuki et al. |
| 2017/0070478 A1 | 3/2017 | Park et al. |
| 2017/0076212 A1 | 3/2017 | Shams et al. |
| 2017/0076720 A1 | 3/2017 | Gopalan et al. |
| 2017/0076726 A1 | 3/2017 | Bae |
| 2017/0078824 A1 | 3/2017 | Heo |
| 2017/0083285 A1 | 3/2017 | Meyers et al. |
| 2017/0084277 A1 | 3/2017 | Sharifi |
| 2017/0084292 A1 | 3/2017 | Yoo |
| 2017/0084295 A1 | 3/2017 | Tsiartas et al. |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0092299 A1 | 3/2017 | Matsuo |
| 2017/0092889 A1 | 3/2017 | Seo et al. |
| 2017/0092890 A1 | 3/2017 | Seo et al. |
| 2017/0094215 A1 | 3/2017 | Western |
| 2017/0103748 A1 | 4/2017 | Weissberg et al. |
| 2017/0103754 A1 | 4/2017 | Higbie et al. |
| 2017/0103755 A1 | 4/2017 | Jeon et al. |
| 2017/0110124 A1 | 4/2017 | Boesen et al. |
| 2017/0110144 A1 | 4/2017 | Sharifi et al. |
| 2017/0117497 A1 | 4/2017 | Seo et al. |
| 2017/0123251 A1 | 5/2017 | Nakada et al. |

(56) References Cited

U.S. PATENT DOCUMENTS

| | | |
|---|---|---|
| 2017/0125037 A1 | 5/2017 | Shin |
| 2017/0125456 A1 | 5/2017 | Kasahara |
| 2017/0133007 A1 | 5/2017 | Drewes |
| 2017/0133011 A1 | 5/2017 | Chen et al. |
| 2017/0134872 A1 | 5/2017 | Silva et al. |
| 2017/0139720 A1 | 5/2017 | Stein |
| 2017/0140449 A1 | 5/2017 | Kannan |
| 2017/0140748 A1 | 5/2017 | Roberts et al. |
| 2017/0140759 A1 | 5/2017 | Kumar et al. |
| 2017/0151930 A1 | 6/2017 | Boesen |
| 2017/0177585 A1 | 6/2017 | Rodger et al. |
| 2017/0178662 A1 | 6/2017 | Ayrapetian et al. |
| 2017/0180561 A1 | 6/2017 | Kadiwala et al. |
| 2017/0188150 A1 | 6/2017 | Brunet et al. |
| 2017/0188437 A1 | 6/2017 | Banta |
| 2017/0193999 A1 | 7/2017 | Aleksic et al. |
| 2017/0206896 A1 | 7/2017 | Ko et al. |
| 2017/0206900 A1 | 7/2017 | Lee et al. |
| 2017/0214996 A1 | 7/2017 | Yeo |
| 2017/0236512 A1 | 8/2017 | Williams et al. |
| 2017/0236515 A1 | 8/2017 | Pinsky et al. |
| 2017/0242649 A1 | 8/2017 | Jarvis et al. |
| 2017/0242651 A1 | 8/2017 | Lang et al. |
| 2017/0242653 A1 | 8/2017 | Lang et al. |
| 2017/0242657 A1 | 8/2017 | Jarvis et al. |
| 2017/0243576 A1 | 8/2017 | Millington et al. |
| 2017/0243587 A1 | 8/2017 | Plagge et al. |
| 2017/0245076 A1 | 8/2017 | Kusano et al. |
| 2017/0255612 A1 | 9/2017 | Sari et al. |
| 2017/0257686 A1 | 9/2017 | Gautama et al. |
| 2017/0269975 A1 | 9/2017 | Wood et al. |
| 2017/0270919 A1 | 9/2017 | Parthasarathi et al. |
| 2017/0278512 A1 | 9/2017 | Pandya et al. |
| 2017/0287485 A1 | 10/2017 | Civelli et al. |
| 2017/0300990 A1 | 10/2017 | Tanaka et al. |
| 2017/0330565 A1 | 11/2017 | Daley et al. |
| 2017/0331869 A1 | 11/2017 | Bendahan et al. |
| 2017/0332168 A1 | 11/2017 | Moghimi et al. |
| 2017/0346872 A1 | 11/2017 | Naik et al. |
| 2017/0352357 A1 | 12/2017 | Fink |
| 2017/0353789 A1 | 12/2017 | Kim et al. |
| 2017/0357475 A1 | 12/2017 | Lee et al. |
| 2017/0357478 A1 | 12/2017 | Piersol et al. |
| 2017/0366393 A1 | 12/2017 | Shaker et al. |
| 2017/0374454 A1 | 12/2017 | Bernardini et al. |
| 2017/0374552 A1 | 12/2017 | Xia et al. |
| 2018/0018964 A1 | 1/2018 | Reilly et al. |
| 2018/0018967 A1 | 1/2018 | Lang et al. |
| 2018/0020306 A1 | 1/2018 | Sheen |
| 2018/0025733 A1 | 1/2018 | Qian et al. |
| 2018/0033428 A1 | 2/2018 | Kim et al. |
| 2018/0033438 A1 | 2/2018 | Toma et al. |
| 2018/0040324 A1* | 2/2018 | Wilberding .......... H05B 47/165 |
| 2018/0047394 A1 | 2/2018 | Tian et al. |
| 2018/0053504 A1 | 2/2018 | Wang et al. |
| 2018/0054506 A1 | 2/2018 | Hart et al. |
| 2018/0061396 A1 | 3/2018 | Srinivasan et al. |
| 2018/0061402 A1 | 3/2018 | Devaraj et al. |
| 2018/0061404 A1 | 3/2018 | Devaraj et al. |
| 2018/0061419 A1 | 3/2018 | Melendo Casado et al. |
| 2018/0061420 A1 | 3/2018 | Patil et al. |
| 2018/0062871 A1 | 3/2018 | Jones et al. |
| 2018/0084367 A1 | 3/2018 | Greff et al. |
| 2018/0088900 A1 | 3/2018 | Glaser et al. |
| 2018/0091898 A1 | 3/2018 | Yoon et al. |
| 2018/0091913 A1 | 3/2018 | Hartung et al. |
| 2018/0096683 A1 | 4/2018 | James et al. |
| 2018/0096696 A1 | 4/2018 | Mixter |
| 2018/0107446 A1 | 4/2018 | Wilberding et al. |
| 2018/0108351 A1 | 4/2018 | Beckhardt et al. |
| 2018/0122372 A1 | 5/2018 | Wanderlust |
| 2018/0122378 A1 | 5/2018 | Mixter et al. |
| 2018/0130469 A1 | 5/2018 | Gruenstein et al. |
| 2018/0132217 A1 | 5/2018 | Stirling-Gallacher |
| 2018/0132298 A1 | 5/2018 | Birnam et al. |
| 2018/0137861 A1 | 5/2018 | Ogawa |
| 2018/0152557 A1 | 5/2018 | White et al. |
| 2018/0158454 A1 | 6/2018 | Campbell et al. |
| 2018/0165055 A1 | 6/2018 | Yu et al. |
| 2018/0167981 A1 | 6/2018 | Jonna et al. |
| 2018/0174597 A1 | 6/2018 | Lee et al. |
| 2018/0182383 A1 | 6/2018 | Kim et al. |
| 2018/0182390 A1 | 6/2018 | Hughes et al. |
| 2018/0182397 A1 | 6/2018 | Carbune et al. |
| 2018/0188948 A1 | 7/2018 | Ouyang et al. |
| 2018/0190274 A1 | 7/2018 | Kirazci et al. |
| 2018/0190285 A1 | 7/2018 | Heckman et al. |
| 2018/0197533 A1 | 7/2018 | Lyon et al. |
| 2018/0199146 A1 | 7/2018 | Sheen |
| 2018/0204569 A1 | 7/2018 | Nadkar et al. |
| 2018/0205963 A1 | 7/2018 | Matei et al. |
| 2018/0210698 A1 | 7/2018 | Park et al. |
| 2018/0211665 A1 | 7/2018 | Park et al. |
| 2018/0218747 A1 | 8/2018 | Moghimi et al. |
| 2018/0219976 A1 | 8/2018 | Decenzo et al. |
| 2018/0225933 A1 | 8/2018 | Park et al. |
| 2018/0228006 A1 | 8/2018 | Baker et al. |
| 2018/0233130 A1 | 8/2018 | Kaskari et al. |
| 2018/0233136 A1 | 8/2018 | Torok et al. |
| 2018/0233137 A1 | 8/2018 | Torok et al. |
| 2018/0233139 A1 | 8/2018 | Finkelstein et al. |
| 2018/0233142 A1 | 8/2018 | Koishida et al. |
| 2018/0233150 A1 | 8/2018 | Gruenstein et al. |
| 2018/0234765 A1 | 8/2018 | Torok et al. |
| 2018/0261213 A1 | 9/2018 | Arik et al. |
| 2018/0262793 A1 | 9/2018 | Lau et al. |
| 2018/0262831 A1 | 9/2018 | Matheja et al. |
| 2018/0270565 A1 | 9/2018 | Ganesh |
| 2018/0277107 A1 | 9/2018 | Kim |
| 2018/0277113 A1 | 9/2018 | Hartung et al. |
| 2018/0277119 A1 | 9/2018 | Baba et al. |
| 2018/0277133 A1 | 9/2018 | Deetz et al. |
| 2018/0286394 A1 | 10/2018 | Li et al. |
| 2018/0286414 A1 | 10/2018 | Ravindran et al. |
| 2018/0293484 A1 | 10/2018 | Wang et al. |
| 2018/0308470 A1 | 10/2018 | Park et al. |
| 2018/0314552 A1 | 11/2018 | Kim et al. |
| 2018/0322891 A1 | 11/2018 | Van Den Oord et al. |
| 2018/0324756 A1 | 11/2018 | Ryu et al. |
| 2018/0335903 A1 | 11/2018 | Coffman et al. |
| 2018/0336274 A1 | 11/2018 | Choudhury et al. |
| 2018/0349093 A1 | 12/2018 | McCarty et al. |
| 2018/0356962 A1 | 12/2018 | Corbin |
| 2018/0358009 A1 | 12/2018 | Daley et al. |
| 2018/0365567 A1 | 12/2018 | Kolavennu et al. |
| 2018/0367944 A1 | 12/2018 | Heo et al. |
| 2019/0012141 A1 | 1/2019 | Piersol et al. |
| 2019/0013019 A1 | 1/2019 | Lawrence |
| 2019/0014592 A1 | 1/2019 | Hampel et al. |
| 2019/0033446 A1 | 1/2019 | Bultan et al. |
| 2019/0042187 A1 | 2/2019 | Truong et al. |
| 2019/0043488 A1 | 2/2019 | Booklet et al. |
| 2019/0043492 A1 | 2/2019 | Lang |
| 2019/0051298 A1 | 2/2019 | Lee et al. |
| 2019/0066672 A1 | 2/2019 | Wood et al. |
| 2019/0066687 A1 | 2/2019 | Wood et al. |
| 2019/0074025 A1 | 3/2019 | Lashkari et al. |
| 2019/0079724 A1 | 3/2019 | Feuz et al. |
| 2019/0081507 A1 | 3/2019 | Ide |
| 2019/0081810 A1 | 3/2019 | Jung |
| 2019/0082255 A1 | 3/2019 | Tajiri et al. |
| 2019/0087455 A1 | 3/2019 | He et al. |
| 2019/0088261 A1 | 3/2019 | Lang et al. |
| 2019/0090056 A1 | 3/2019 | Rexach et al. |
| 2019/0096408 A1 | 3/2019 | Li et al. |
| 2019/0098400 A1 | 3/2019 | Buoni et al. |
| 2019/0104119 A1 | 4/2019 | Giorgi et al. |
| 2019/0104373 A1 | 4/2019 | Wodrich et al. |
| 2019/0108839 A1 | 4/2019 | Reilly et al. |
| 2019/0115011 A1 | 4/2019 | Khellah et al. |
| 2019/0130906 A1 | 5/2019 | Kobayashi et al. |
| 2019/0163153 A1 | 5/2019 | Price et al. |
| 2019/0172452 A1 | 6/2019 | Smith et al. |
| 2019/0173687 A1 | 6/2019 | MacKay et al. |

(56) References Cited

U.S. PATENT DOCUMENTS

| | | |
|---|---|---|
| 2019/0179607 A1 | 6/2019 | Thangarathnam et al. |
| 2019/0179611 A1 | 6/2019 | Wojogbe et al. |
| 2019/0182072 A1 | 6/2019 | Roe et al. |
| 2019/0206391 A1 | 7/2019 | Busch et al. |
| 2019/0206412 A1 | 7/2019 | Li et al. |
| 2019/0219976 A1 | 7/2019 | Giorgi et al. |
| 2019/0220246 A1 | 7/2019 | Orr et al. |
| 2019/0221206 A1 | 7/2019 | Chen et al. |
| 2019/0237067 A1 | 8/2019 | Friedman et al. |
| 2019/0239008 A1 | 8/2019 | Lambourne |
| 2019/0239009 A1 | 8/2019 | Lambourne |
| 2019/0243603 A1 | 8/2019 | Keyser-Allen et al. |
| 2019/0243606 A1 | 8/2019 | Jayakumar et al. |
| 2019/0244608 A1 | 8/2019 | Choi et al. |
| 2019/0281397 A1 | 9/2019 | Lambourne |
| 2019/0287546 A1 | 9/2019 | Ganeshkumar |
| 2019/0288970 A1 | 9/2019 | Siddiq |
| 2019/0289367 A1 | 9/2019 | Siddiq |
| 2019/0295542 A1 | 9/2019 | Huang et al. |
| 2019/0295563 A1 | 9/2019 | Kamdar et al. |
| 2019/0297388 A1 | 9/2019 | Panchaksharaiah et al. |
| 2019/0304443 A1 | 10/2019 | Bhagwan |
| 2019/0311710 A1 | 10/2019 | Eraslan et al. |
| 2019/0311712 A1 | 10/2019 | Firik et al. |
| 2019/0311720 A1 | 10/2019 | Pasko |
| 2019/0317606 A1 | 10/2019 | Jain et al. |
| 2019/0342962 A1 | 11/2019 | Chang et al. |
| 2019/0347063 A1 | 11/2019 | Liu et al. |
| 2019/0348044 A1 | 11/2019 | Chun et al. |
| 2019/0362714 A1 | 11/2019 | Mori et al. |
| 2019/0364375 A1 | 11/2019 | Soto et al. |
| 2019/0364422 A1 | 11/2019 | Zhuo |
| 2019/0371310 A1 | 12/2019 | Fox et al. |
| 2020/0007987 A1 | 1/2020 | Woo et al. |
| 2020/0034492 A1 | 1/2020 | Verbeke et al. |
| 2020/0051554 A1 | 2/2020 | Kim et al. |
| 2020/0074990 A1 | 3/2020 | Kim et al. |
| 2020/0090647 A1 | 3/2020 | Kurtz |
| 2020/0092687 A1 | 3/2020 | Devaraj et al. |
| 2020/0098354 A1 | 3/2020 | Lin et al. |
| 2020/0098379 A1 | 3/2020 | Tai et al. |
| 2020/0105245 A1 | 4/2020 | Gupta et al. |
| 2020/0105256 A1 | 4/2020 | Fainberg et al. |
| 2020/0105264 A1 | 4/2020 | Jang et al. |
| 2020/0152206 A1 | 5/2020 | Shen et al. |
| 2020/0175989 A1 | 6/2020 | Lockhart et al. |
| 2020/0184964 A1 | 6/2020 | Myers et al. |
| 2020/0184980 A1 | 6/2020 | Wilberding |
| 2020/0193973 A1 | 6/2020 | Tolomei et al. |
| 2020/0211539 A1 | 7/2020 | Lee |
| 2020/0211550 A1 | 7/2020 | Pan et al. |
| 2020/0211556 A1 | 7/2020 | Mixter et al. |
| 2020/0213729 A1 | 7/2020 | Soto |
| 2020/0216089 A1 | 7/2020 | Garcia et al. |
| 2020/0234709 A1 | 7/2020 | Kunitake |
| 2020/0251107 A1 | 8/2020 | Wang et al. |
| 2020/0265838 A1 | 8/2020 | Lee et al. |
| 2020/0310751 A1 | 10/2020 | Anand et al. |
| 2020/0336846 A1 | 10/2020 | Rohde et al. |
| 2020/0366477 A1 | 11/2020 | Brown et al. |
| 2020/0395006 A1 | 12/2020 | Smith et al. |
| 2020/0395010 A1 | 12/2020 | Smith et al. |
| 2020/0395013 A1 | 12/2020 | Smith et al. |
| 2020/0409652 A1 | 12/2020 | Wilberding et al. |
| 2021/0035561 A1 | 2/2021 | D'Amato et al. |
| 2021/0035572 A1 | 2/2021 | D'Amato et al. |
| 2021/0067867 A1 | 3/2021 | Kagoshima |
| 2021/0118429 A1 | 4/2021 | Shan |
| 2021/0166680 A1 | 6/2021 | Jung et al. |
| 2021/0183366 A1 | 6/2021 | Reinspach et al. |
| 2021/0280185 A1 | 9/2021 | Tan et al. |

FOREIGN PATENT DOCUMENTS

| | | |
|---|---|---|
| CN | 1323435 A | 11/2001 |
| CN | 101310558 A | 11/2008 |
| CN | 101480039 A | 7/2009 |
| CN | 101661753 A | 3/2010 |
| CN | 101686282 A | 3/2010 |
| CN | 101907983 A | 12/2010 |
| CN | 102123188 A | 7/2011 |
| CN | 102256098 A | 11/2011 |
| CN | 102567468 A | 7/2012 |
| CN | 103052001 A | 4/2013 |
| CN | 103181192 A | 6/2013 |
| CN | 103210663 A | 7/2013 |
| CN | 103546616 A | 1/2014 |
| CN | 103811007 A | 5/2014 |
| CN | 104010251 A | 8/2014 |
| CN | 104035743 A | 9/2014 |
| CN | 104053088 A | 9/2014 |
| CN | 104092936 A | 10/2014 |
| CN | 104104769 A | 10/2014 |
| CN | 104115224 A | 10/2014 |
| CN | 104282305 A | 1/2015 |
| CN | 104520927 A | 4/2015 |
| CN | 104538030 A | 4/2015 |
| CN | 104575504 A | 4/2015 |
| CN | 104635539 A | 5/2015 |
| CN | 104865550 A | 8/2015 |
| CN | 105187907 A | 12/2015 |
| CN | 105204357 A | 12/2015 |
| CN | 105206281 A | 12/2015 |
| CN | 105284076 A | 1/2016 |
| CN | 105493442 A | 4/2016 |
| CN | 105679318 A | 6/2016 |
| CN | 106028223 A | 10/2016 |
| CN | 106375902 A | 2/2017 |
| CN | 106531165 A | 3/2017 |
| CN | 106708403 A | 5/2017 |
| CN | 107004410 A | 8/2017 |
| CN | 107919123 A | 4/2018 |
| CN | 109712626 A | 5/2019 |
| EP | 1349146 A1 | 10/2003 |
| EP | 1389853 A1 | 2/2004 |
| EP | 2051542 A1 | 4/2009 |
| EP | 2166737 A1 | 3/2010 |
| EP | 2683147 A1 | 1/2014 |
| EP | 2986034 A1 | 2/2016 |
| EP | 3128767 A2 | 2/2017 |
| EP | 3133595 A1 | 2/2017 |
| EP | 2351021 B1 | 9/2017 |
| EP | 3270377 A1 | 1/2018 |
| EP | 3285502 A1 | 2/2018 |
| JP | S63101998 A | 12/1988 |
| JP | H0883091 A | 3/1996 |
| JP | 2001236093 A | 8/2001 |
| JP | 2003223188 A | 8/2003 |
| JP | 2004347943 A | 12/2004 |
| JP | 2004354721 A | 12/2004 |
| JP | 2005242134 A | 9/2005 |
| JP | 2005250867 A | 9/2005 |
| JP | 2005284492 A | 10/2005 |
| JP | 2006092482 A | 4/2006 |
| JP | 2007013400 A | 1/2007 |
| JP | 2007142595 A | 6/2007 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |
| JP | 2015161551 A | 9/2015 |
| JP | 2015527768 A | 9/2015 |
| JP | 2016095383 A | 5/2016 |
| JP | 2017072857 A | 4/2017 |
| JP | 2017129860 A | 7/2017 |
| JP | 2017227912 A | 12/2017 |
| JP | 2018055259 A | 4/2018 |
| KR | 20100036351 A | 4/2010 |
| KR | 100966415 B1 | 6/2010 |

(56) References Cited

FOREIGN PATENT DOCUMENTS

| | | | |
|---|---|---|---|
| KR | 20100111071 A | 10/2010 | |
| KR | 20130050987 A | 5/2013 | |
| KR | 20140005410 A | 1/2014 | |
| KR | 20140035310 A | 3/2014 | |
| KR | 20140054643 A | 5/2014 | |
| KR | 20140111859 A | 9/2014 | |
| KR | 20140112900 A | 9/2014 | |
| WO | 200153994 | 7/2001 | |
| WO | 03054854 A2 | 7/2003 | |
| WO | 2003093950 A2 | 11/2003 | |
| WO | 2008048599 A1 | 4/2008 | |
| WO | 2012166386 A2 | 12/2012 | |
| WO | 2013184792 A1 | 12/2013 | |
| WO | 2014064531 A1 | 5/2014 | |
| WO | 2014159581 A1 | 10/2014 | |
| WO | 2015017303 A1 | 2/2015 | |
| WO | 2015037396 A1 | 3/2015 | |
| WO | 2015105788 A1 | 7/2015 | |
| WO | 2015131024 A1 | 9/2015 | |
| WO | 2015178950 A1 | 11/2015 | |
| WO | 2016014142 A1 | 1/2016 | |
| WO | 2016022926 A1 | 2/2016 | |
| WO | 2016033364 A1 | 3/2016 | |
| WO | 2016057268 A1 | 4/2016 | |
| WO | 2016085775 A2 | 6/2016 | |
| WO | 2016165067 A1 | 10/2016 | |
| WO | 2016171956 A1 | 10/2016 | |
| WO | 2016200593 A1 | 12/2016 | |
| WO | 2017039632 A1 | 3/2017 | |
| WO | 2017058654 A1 | 4/2017 | |
| WO | 2017138934 A1 | 8/2017 | |
| WO | 2017147075 A1 | 8/2017 | |
| WO | 2017147936 A1 | 9/2017 | |
| WO | 2018027142 A1 | 2/2018 | |
| WO | 2018067404 A1 | 4/2018 | |

OTHER PUBLICATIONS

Non-Final Office Action dated Jan. 4, 2022, issued in connection with U.S. Appl. No. 16/879,549, filed May 20, 2020, 14 pages.
Non-Final Office Action dated Nov. 5, 2021, issued in connection with U.S. Appl. No. 16/153,530, filed Oct. 5, 2018, 21 pages.
Non-Final Office Action dated Apr. 6, 2020, issued in connection with U.S. Appl. No. 16/424,825, filed May 29, 2019, 22 pages.
Non-Final Office Action dated Feb. 6, 2018, issued in connection with U.S. Appl. No. 15/211,689, filed Jul. 15, 2016, 32 pages.
Non-Final Office Action dated Feb. 6, 2018, issued in connection with U.S. Appl. No. 15/237,133, filed Aug. 15, 2016, 6 pages.
Non-Final Office Action dated Jan. 6, 2021, issued in connection with U.S. Appl. No. 16/439,046, filed Jun. 12, 2019, 13 pages.
Non-Final Office Action dated Mar. 6, 2020, issued in connection with U.S. Appl. No. 16/141,875, filed Sep. 25, 2018, 8 pages.
Non-Final Office Action dated Sep. 6, 2017, issued in connection with U.S. Appl. No. 15/131,254, filed Apr. 18, 2016, 13 pages.
Non-Final Office Action dated Sep. 6, 2018, issued in connection with U.S. Appl. No. 15/098,760, filed Apr. 14, 2016, 29 pages.
Non-Final Office Action dated Dec. 7, 2021, issued in connection with U.S. Appl. No. 16/168,389, filed Oct. 23, 2018, 36 pages.
Non-Final Office Action dated Jan. 7, 2022, issued in connection with U.S. Appl. No. 17/135,123, filed Dec. 28, 2020, 16 pages.
Non-Final Office Action dated Sep. 8, 2020, issued in connection with U.S. Appl. No. 15/936,177, filed Mar. 26, 2018, 19 pages.
Non-Final Office Action dated Apr. 9, 2018, issued in connection with U.S. Appl. No. 15/804,776, filed Nov. 6, 2017, 18 pages.
Non-Final Office Action dated Apr. 9, 2021, issued in connection with U.S. Appl. No. 16/780,483, filed Feb. 3, 2020, 45 pages.
Non-Final Office Action dated Feb. 9, 2021, issued in connection with U.S. Appl. No. 16/806,747, filed Mar. 2, 2020, 16 pages.
Non-Final Office Action dated May 9, 2018, issued in connection with U.S. Appl. No. 15/818,051, filed Nov. 20, 2017, 22 pages.
Non-Final Office Action dated Sep. 9, 2020, issued in connection with U.S. Appl. No. 16/168,389, filed Oct. 23, 2018, 29 pages.
Notice of Allowance dated Aug. 10, 2021, issued in connection with U.S. Appl. No. 17/157,686, filed Jan. 25, 2021, 9 pages.
Notice of Allowance dated Aug. 2, 2021, issued in connection with U.S. Appl. No. 16/660,197, filed Oct. 22, 2019, 7 pages.
Notice of Allowance dated Mar. 31, 2021, issued in connection with U.S. Appl. No. 16/813,643, filed Mar. 9, 2020, 11 pages.
Notice of Allowance dated Aug. 4, 2021, issued in connection with U.S. Appl. No. 16/780,483, filed Feb. 3, 2020, 5 pages.
Notice of Allowance dated Dec. 2, 2019, issued in connection with U.S. Appl. No. 15/718,521, filed Sep. 28, 2017, 15 pages.
Notice of Allowance dated Dec. 4, 2017, issued in connection with U.S. Appl. No. 15/277,810, filed Sep. 27, 2016, 5 pages.
Notice of Allowance dated Jul. 5, 2018, issued in connection with U.S. Appl. No. 15/237,133, filed Aug. 15, 2016, 5 pages.
Notice of Allowance dated Jul. 9, 2018, issued in connection with U.S. Appl. No. 15/438,741, filed Feb. 21, 2017, 5 pages.
Notice of Allowance dated Apr. 1, 2019, issued in connection with U.S. Appl. No. 15/935,966, filed Mar. 26, 2018, 5 pages.
Notice of Allowance dated Aug. 1, 2018, issued in connection with U.S. Appl. No. 15/297,627, filed Oct. 19, 2016, 9 pages.
Notice of Allowance dated Jun. 1, 2021, issued in connection with U.S. Appl. No. 16/219,702, filed Dec. 13, 2018, 8 pages.
Notice of Allowance dated Jun. 1, 2021, issued in connection with U.S. Appl. No. 16/685,135, filed Nov. 15, 2019, 10 pages.
Notice of Allowance dated Sep. 1, 2021, issued in connection with U.S. Appl. No. 15/936,177, filed Mar. 26, 2018, 22 pages.
Notice of Allowance dated Aug. 10, 2020, issued in connection with U.S. Appl. No. 16/424,825, filed May 29, 2019, 9 pages.
Notice of Allowance dated Feb. 10, 2021, issued in connection with U.S. Appl. No. 16/138,111, filed Sep. 21, 2018, 8 pages.
Notice of Allowance dated Apr. 11, 2018, issued in connection with U.S. Appl. No. 15/719,454, filed Sep. 28, 2017, 15 pages.
Notice of Allowance dated Oct. 11, 2019, issued in connection with U.S. Appl. No. 16/437,476, filed Jun. 11, 2019, 9 pages.
Notice of Allowance dated Sep. 11, 2019, issued in connection with U.S. Appl. No. 16/154,071, filed Oct. 8, 2018, 5 pages.
Notice of Allowance dated Aug. 12, 2021, issued in connection with U.S. Appl. No. 16/819,755, filed Mar. 16, 2020, 6 pages.
Notice of Allowance dated Dec. 12, 2018, issued in connection with U.S. Appl. No. 15/811,468, filed Nov. 13, 2017, 9 pages.
Notice of Allowance dated Jul. 12, 2017, issued in connection with U.S. Appl. No. 15/098,805, filed Apr. 14, 2016, 8 pages.
Notice of Allowance dated Jun. 12, 2019, issued in connection with U.S. Appl. No. 15/670,361, filed Aug. 7, 2017, 7 pages.
Notice of Allowance dated May 12, 2021, issued in connection with U.S. Appl. No. 16/402,617, filed May 3, 2019, 8 pages.
Notice of Allowance dated Sep. 12, 2018, issued in connection with U.S. Appl. No. 15/438,744, filed Feb. 21, 2017, 15 pages.
Notice of Allowance dated Dec. 13, 2017, issued in connection with U.S. Appl. No. 15/784,952, filed Oct. 16, 2017, 9 pages.
Notice of Allowance dated Dec. 13, 2021, issued in connection with U.S. Appl. No. 16/879,553, filed May 20, 2020, 15 pages.
Notice of Allowance dated Feb. 13, 2019, issued in connection with U.S. Appl. No. 15/959,907, filed Apr. 23, 2018, 10 pages.
Notice of Allowance dated Jan. 13, 2020, issued in connection with U.S. Appl. No. 16/192,126, filed Nov. 15, 2018, 6 pages.
Notice of Allowance dated Jan. 13, 2021, issued in connection with U.S. Appl. No. 16/539,843, filed Aug. 13, 2019, 5 pages.
Notice of Allowance dated Nov. 13, 2020, issued in connection with U.S. Appl. No. 16/131,409, filed Sep. 14, 2018, 11 pages.
Notice of Allowance dated Aug. 14, 2017, issued in connection with U.S. Appl. No. 15/098,867, filed Apr. 14, 2016, 10 pages.
Notice of Allowance dated Aug. 14, 2020, issued in connection with U.S. Appl. No. 16/598,125, filed Oct. 10, 2019, 5 pages.
Notice of Allowance dated Feb. 14, 2017, issued in connection with U.S. Appl. No. 15/229,855, filed Aug. 5, 2016, 11 pages.
Non-Final Office Action dated Jun. 25, 2021, issued in connection with U.S. Appl. No. 16/213,570, filed Dec. 7, 2018, 11 pages.
Non-Final Office Action dated Jul. 8, 2021, issued in connection with U.S. Appl. No. 16/813,643, filed Mar. 9, 2020, 12 pages.

(56) References Cited

OTHER PUBLICATIONS

Non-Final Office Action dated Dec. 9, 2020, issued in connection with U.S. Appl. No. 16/271,550, filed Feb. 8, 2019, 35 pages.
Non-Final Office Action dated Jul. 9, 2021, issued in connection with U.S. Appl. No. 16/806,747, filed Mar. 2, 2020, 18 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Nov. 4, 2019, issued in connection with U.S. Appl. No. 16/022,662, filed Jun. 28, 2018, 16 pages.
Non-Final Office Action dated Sep. 5, 2019, issued in connection with U.S. Appl. No. 16/416,752, filed May 20, 2019, 14 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Oct. 9, 2019, issued in connection with U.S. Appl. No. 15/936,177, filed Mar. 26, 2018, 16 pages.
Non-Final Office Action dated Jul. 1, 2020, issued in connection with U.S. Appl. No. 16/138,111, filed Sep. 21, 2018, 14 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/438,725, filed Feb. 21, 2017, 15 pages.
Non-Final Office Action dated Sep. 10, 2018, issued in connection with U.S. Appl. No. 15/670,361, filed Aug. 7, 2017, 17 pages.
Non-Final Office Action dated Aug. 11, 2021, issued in connection with U.S. Appl. No. 16/841,116, filed Apr. 6, 2020, 9 pages.
Non-Final Office Action dated Feb. 11, 2021, issued in connection with U.S. Appl. No. 16/876,493, filed May 18, 2020, 16 pages.
Non-Final Office Action dated Mar. 11, 2021, issued in connection with U.S. Appl. No. 16/834,483, filed Mar. 30, 2020, 11 pages.
Non-Final Office Action dated Oct. 11, 2019, issued in connection with U.S. Appl. No. 16/177,185, filed Oct. 31, 2018, 14 pages.
Non-Final Office Action dated Sep. 11, 2020, issued in connection with U.S. Appl. No. 15/989,715, filed May 25, 2018, 8 pages.
Non-Final Office Action dated Sep. 11, 2020, issued in connection with U.S. Appl. No. 16/219,702, filed Dec. 13, 2018, 9 pages.
Non-Final Office Action dated Apr. 12, 2021, issued in connection with U.S. Appl. No. 16/528,224, filed Jul. 31, 2019, 9 pages.
Non-Final Office Action dated Dec. 12, 2016, issued in connection with U.S. Appl. No. 15/098,718, filed Apr. 14, 2016, 11 pages.
Non-Final Office Action dated Feb. 12, 2019, issued in connection with U.S. Appl. No. 15/670,361, filed Aug. 7, 2017, 13 pages.
Non-Final Office Action dated Jan. 13, 2017, issued in connection with U.S. Appl. No. 15/098,805, filed Apr. 14, 2016, 11 pages.
Non-Final Office Action dated Nov. 13, 2018, issued in connection with U.S. Appl. No. 15/717,621, filed Sep. 27, 2017, 23 pages.
Non-Final Office Action dated Nov. 13, 2018, issued in connection with U.S. Appl. No. 16/160,107, filed Oct. 15, 2018, 8 pages.
Non-Final Office Action dated Nov. 13, 2019, issued in connection with U.S. Appl. No. 15/984,073, filed May 18, 2018, 18 pages.
Non-Final Office Action dated Oct. 13, 2021, issued in connection with U.S. Appl. No. 16/679,538, filed Nov. 11, 2019, 8 pages.
Non-Final Office Action dated May 14, 2020, issued in connection with U.S. Appl. No. 15/948,541, filed Apr. 9, 2018, 8 pages.
Non-Final Office Action dated Sep. 14, 2017, issued in connection with U.S. Appl. No. 15/178,180, filed Jun. 9, 2016, 16 pages.
Non-Final Office Action dated Sep. 14, 2018, issued in connection with U.S. Appl. No. 15/959,907, filed Apr. 23, 2018, 15 pages.
Non-Final Office Action dated Apr. 15, 2020, issued in connection with U.S. Appl. No. 16/138,111, filed Sep. 21, 2018, 15 pages.
Non-Final Office Action dated Dec. 15, 2020, issued in connection with U.S. Appl. No. 17/087,423, filed Nov. 2, 2020, 7 pages.
Non-Final Office Action dated Jan. 15, 2019, issued in connection with U.S. Appl. No. 16/173,797, filed Oct. 29, 2018, 6 pages.
Non-Final Office Action dated Nov. 15, 2019, issued in connection with U.S. Appl. No. 16/153,530, filed Oct. 5, 2018, 17 pages.
Non-Final Office Action dated Mar. 16, 2018, issued in connection with U.S. Appl. No. 15/681,937, filed Aug. 21, 2017, 5 pages.
Non-Final Office Action dated Oct. 16, 2018, issued in connection with U.S. Appl. No. 15/131,254, filed Apr. 18, 2016, 16 pages.
Non-Final Office Action dated Sep. 16, 2021, issued in connection with U.S. Appl. No. 16/879,553, filed May 20, 2020, 24 pages.
Non-Final Office Action dated Aug. 17, 2021, issued in connection with U.S. Appl. No. 17/236,559, filed Apr. 21, 2021, 10 pages.
Non-Final Office Action dated Sep. 17, 2020, issued in connection with U.S. Appl. No. 16/600,949, filed Oct. 14, 2019, 29 pages.
Non-Final Office Action dated Apr. 18, 2018, issued in connection with U.S. Appl. No. 15/811,468 filed Nov. 13, 2017, 14 pages.
Non-Final Office Action dated Aug. 18, 2021, issued in connection with U.S. Appl. No. 16/845,946, filed Apr. 10, 2020, 14 pages.
Non-Final Office Action dated Jan. 18, 2019, issued in connection with U.S. Appl. No. 15/721,141, filed Sep. 29, 2017, 18 pages.
Non-Final Office Action dated Oct. 18, 2019, issued in connection with U.S. Appl. No. 15/098,760, filed Apr. 14, 2016, 27 pages.
Non-Final Office Action dated Sep. 18, 2019, issued in connection with U.S. Appl. No. 16/179,779, filed Nov. 2, 2018, 14 pages.
Non-Final Office Action dated Apr. 19, 2017, issued in connection with U.S. Appl. No. 15/131,776, filed Apr. 18, 2016, 12 pages.
Couke et al. Efficient Keyword Spotting using Dilated Convolutions and Gating, arXiv:1811.07684v2, Feb. 18, 2019, 5 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European EPC Article 94.3 dated Nov. 11, 2021, issued in connection with European Application No. 19784172.9, 5 pages.
European Patent Office, European EPC Article 94.3 dated Feb. 23, 2021, issued in connection with European Application No. 17200837.7, 8 pages.
European Patent Office, European EPC Article 94.3 dated Feb. 26, 2021, issued in connection with European Application No. 18789515.6, 8 pages.
European Patent Office, European Extended Search Report dated Oct. 7, 2021, issued in connection with European Application No. 21193616.6, 9 pages.
European Patent Office, European Extended Search Report dated Nov. 25, 2020, issued in connection with European Application No. 20185599.6, 9 pages.
European Patent Office, European Extended Search Report dated Feb. 3, 2020, issued in connection with European Application No. 19197116.7, 9 pages.
European Patent Office, European Extended Search Report dated Jan. 3, 2019, issued in connection with European Application No. 177570702, 8 pages.
European Patent Office, European Extended Search Report dated Jan. 3, 2019, issued in connection with European Application No. 17757075.1, 9 pages.
European Patent Office, European Extended Search Report dated Oct. 30, 2017, issued in connection with EP Application No. 17174435.2, 11 pages.
European Patent Office, European Extended Search Report dated Aug. 6, 2020, issued in connection with European Application No. 20166332.5, 10 pages.
European Patent Office, European Extended Search Report dated Jul. 1, 2020, issued in connection with European Application No. 17757075.1, 7 pages.
European Patent Office, European Office Action dated Jan. 14, 2020, issued in connection with European Application No. 17757070.2, 7 pages.
European Patent Office, European Office Action dated Jan. 21, 2021, issued in connection with European Application No. 17792272.1, 7 pages.

(56) References Cited

OTHER PUBLICATIONS

European Patent Office, European Office Action dated Jan. 22, 2019, issued in connection with European Application No. 17174435.2, 9 pages.
European Patent Office, European Office Action dated Sep. 23, 2020, issued in connection with European Application No. 18788976.1, 7 pages.
European Patent Office, European Office Action dated Oct. 26, 2020, issued in connection with European Application No. 18760101.8, 4 pages.
European Patent Office, European Office Action dated Aug. 30, 2019, issued in connection with European Application No. 17781608.9, 6 pages.
European Patent Office, European Office Action dated Sep. 9, 2020, issued in connection with European Application No. 18792656.3, 10 pages.
European Patent Office, Examination Report dated Jul. 15, 2021, issued in connection with European Patent Application No. 19729968.8, 7 pages.
European Patent Office, Extended Search Report dated Aug. 13, 2021, issued in connection with European Patent Application No. 21164130.3, 11 pages.
European Patent Office, Extended Search Report dated May 16, 2018, issued in connection with European Patent Application No. 17200837.7, 11 pages.
European Patent Office, Extended Search Report dated Jul. 25, 2019, issued in connection with European Patent Application No. 18306501.0, 14 pages.
European Patent Office, Extended Search Report dated May 29, 2020, issued in connection with European Patent Application No. 19209389.6, 8 pages.
European Patent Office, Summons to Attend Oral Proceedings dated Dec. 20, 2019, issued in connection with European Application No. 17174435.2, 13 pages.
European Patent Office, Summons to Attend Oral Proceedings dated Dec. 9, 2021, issued in connection with European Application No. 17200837.7, 10 pages.
Fadilpasic,"Cortana can now be the default PDA on your Android", IT Pro Portal: Accessed via WayBack Machine; http://web.archive.org/web/20171129124915/https://www.itproportal.com/2015/08/11/cortana-can-now-be- . . . , Aug. 11, 2015, 6 pages.
Final Office Action dated Jul. 23, 2021, issued in connection with U.S. Appl. No. 16/439,046, filed Jun. 12, 2019, 12 pages.
Final Office Action dated Oct. 6, 2017, issued in connection with U.S. Appl. No. 15/098,760, filed Apr. 14, 2016, 25 pages.
Final Office Action dated Feb. 10, 2021, issued in connection with U.S. Appl. No. 16/219,702, filed Dec. 13, 2018, 9 pages.
Final Office Action dated Feb. 10, 2021, issued in connection with U.S. Appl. No. 16/402,617, filed May 3, 2019, 13 pages.
Final Office Action dated Nov. 10, 2020, issued in connection with U.S. Appl. No. 16/600,644, filed Oct. 14, 2019, 19 pages.
Final Office Action dated Apr. 11, 2019, issued in connection with U.S. Appl. No. 15/131,254, filed Apr. 18, 2016, 17 pages.
Final Office Action dated Aug. 11, 2017, issued in connection with U.S. Appl. No. 15/131,776, filed Apr. 18, 2016, 7 pages.
Final Office Action dated Dec. 11, 2019, issued in connection with U.S. Appl. No. 16/227,308, filed Dec. 20, 2018, 10 pages.
Final Office Action dated Sep. 11, 2019, issued in connection with U.S. Appl. No. 16/178,122, filed Nov. 1, 2018, 13 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Final Office Action dated May 13, 2020, issued in connection with U.S. Appl. No. 16/153,530, filed Oct. 5, 2018, 20 pages.
Final Office Action dated Jul. 15, 2021, issued in connection with U.S. Appl. No. 16/153,530, filed Oct. 5, 2018, 22 pages.
Final Office Action dated Jun. 15, 2017, issued in connection with U.S. Appl. No. 15/098,718, filed Apr. 14, 2016, 15 pages.
Final Office Action dated Jun. 15, 2021, issued in connection with U.S. Appl. No. 16/819,755, filed Mar. 16, 2020, 12 pages.
Final Office Action dated Oct. 15, 2018, issued in connection with U.S. Appl. No. 15/804,776, filed Nov. 6, 2017, 18 pages.
Final Office Action dated Oct. 15, 2020, issued in connection with U.S. Appl. No. 16/109,375, filed Aug. 22, 2018, 9 pages.
Final Office Action dated Oct. 16, 2018, issued in connection with U.S. Appl. No. 15/438,725, filed Feb. 21, 2017, 10 pages.
Final Office Action dated Dec. 17, 2021, issued in connection with U.S. Appl. No. 16/813,643, filed Mar. 9, 2020, 12 pages.
Final Office Action dated May 18, 2020, issued in connection with U.S. Appl. No. 16/177,185, filed Oct. 31, 2018, 16 pages.
Restriction Requirement dated Aug. 9, 2018, issued in connection with U.S. Appl. No. 15/717,621, filed Sep. 27, 2017, 8 pages.
Rottondi et al., "An Overview on Networked Music Performance Technologies," IEEE Access, vol. 4, pp. 8823-8843, 2016, Doi: 10.1109/ACCESS.2016.2628440, 21 pages.
Rybakov et al. Streaming keyword spotting on mobile devices, arXiv:2005.06720v2, Jul. 29, 2020, 5 pages.
Shan et al. Attention-based End-to-End Models for Small-Footprint Keyword Spotting, arXiv:1803.10916v1, Mar. 29, 2018, 5 pages.
Snips: How to Snips—Assistant creation & Installation, Jun. 26, 2017, 6 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Speidel, Hans. Chatbot Training: How to use training data to provide fully automated customer support. Retrieved from the Internet: URL: https://www.crowdguru.de/wp-content/uploads/Case-Study-Chatbox-training-How-to-use-training-data-to-provide-fully-automated-customer-support.pdf. Jun. 29, 2017, 4 pages.
Stemmer et al. Speech Recognition and Understanding on Hardware-Accelerated DSP. Proceedings of Interspeech 2017: Show & Tell Contribution, Aug. 20, 2017, 2 pages.
Steven J. Nowlan and Geoffrey E. Hinton "Simplifying Neural Networks by Soft Weight-Sharing" Neural Computation 4, 1992, 21 pages.
Tsiami et al. "Experiments in acoustic source localization using sparse arrays in adverse indoors environments", 2014 22nd European Signal Processing Conference, Sep. 1, 2014, 5 pages.
Tsung-Hsien Wen et al: "A Network-based End-to-End Trainable Task-oriented Dialogue System", CORR (ARXIV), vol. 1604.04562v1, Apr. 15, 2016 (Apr. 15, 2016), pp. 1-11.
Tsung-Hsien Wen et al: "A Network-based End-to-End Trainable Task-oriented Dialogue System", CORR ARXIV, vol. 1604.04562v1, Apr. 15, 2016, pp. 1-11, XP055396370, Stroudsburg, PA, USA.
Tweet: "How to start using Google app voice commands to make your life easier Share This Story shop #Bullet", Jan. 21, 2016, https://bgr.com/2016/01/21/best-ok-google-voice-commands/, 3 page.
Ullrich et al. "Soft Weight-Sharing for Neural Network Compression." ICLR 2017, 16 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.

(56) References Cited

OTHER PUBLICATIONS

Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.
"S Voice or Google Now?"; https://web.archive.org/web/20160807040123/lowdown.carphonewarehouse.com/news/s-voice-or-google-now/ . . . , Apr. 28, 2015; 4 pages.
Wen et al. A Network-based End-to-End Trainable Task-oriented Dialogue System, CORR (ARXIV), Apr. 15, 2016, 11 pages.
Wu et al. End-to-End Recurrent Entity Network for Entity-Value Independent Goal-Oriented Dialog Learning. DSTC6—Dialog System Technology Challenges, Dec. 10, 2017, 5 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Xiaoguang et al. "Robust Small-Footprint Keyword Spotting Using Sequence-to-Sequence Model with Connectionist Temporal Classifier", 2019 IEEE, Sep. 28, 2019, 5 pages.
Xu et al. An End-to-end Approach for Handling Unknown Slot Values in Dialogue State Tracking. ARXIV.org, Cornell University Library, May 3, 2018, 10 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
Zaykovskiy, Dmitry. Survey of the Speech Recognition Techniques for Mobile Devices. Proceedings of Specom 2006, Jun. 25, 2006, 6 pages.
Non-Final Office Action dated Dec. 19, 2019, issued in connection with U.S. Appl. No. 16/147,710, filed Sep. 29, 2018, 10 pages.
Non-Final Office Action dated Feb. 19, 2020, issued in connection with U.S. Appl. No. 16/148,879, filed Oct. 1, 2018, 15 pages.
Non-Final Office Action dated Sep. 2, 2020, issued in connection with U.S. Appl. No. 16/290,599, filed Mar. 1, 2019, 17 pages.
Non-Final Office Action dated Sep. 2, 2021, issued in connection with U.S. Appl. No. 16/947,895, filed Aug. 24, 2020, 16 pages.
Non-Final Office Action dated Feb. 20, 2018, issued in connection with U.S. Appl. No. 15/211,748, filed Jul. 15, 2016, 31 pages.
Non-Final Office Action dated Jun. 20, 2019, issued in connection with U.S. Appl. No. 15/946,585, filed Apr. 5, 2018, 10 pages.
Non-Final Office Action dated Apr. 21, 2021, issued in connection with U.S. Appl. No. 16/109,375, filed Aug. 22, 2018, 9 pages.
Non-Final Office Action dated Aug. 21, 2019, issued in connection with U.S. Appl. No. 16/192,126, filed Nov. 15, 2018, 8 pages.
Non-Final Office Action dated Feb. 21, 2019, issued in connection with U.S. Appl. No. 16/214,666, filed Dec. 10, 2018, 12 pages.
Non-Final Office Action dated Jan. 21, 2020, issued in connection with U.S. Appl. No. 16/214,711, filed Dec. 10, 2018, 9 pages.
Non-Final Office Action dated Jan. 21, 2020, issued in connection with U.S. Appl. No. 16/598,125, filed Oct. 10, 2019, 25 pages.
Non-Final Office Action dated Oct. 21, 2019, issued in connection with U.S. Appl. No. 15/973,413, filed May 7, 2018, 10 pages.
Non-Final Office Action dated Jul. 22, 2020, issued in connection with U.S. Appl. No. 16/145,275, filed Sep. 28, 2018, 11 pages.
Non-Final Office Action dated May 22, 2018, issued in connection with U.S. Appl. No. 15/946,599, filed Apr. 5, 2018, 19 pages.
Non-Final Office Action dated Sep. 22, 2020, issued in connection with U.S. Appl. No. 16/539,843, filed Aug. 13, 2019, 7 pages.
Non-Final Office Action dated Jun. 23, 2021, issued in connection with U.S. Appl. No. 16/439,032, filed Jun. 12, 2019, 13 pages.
Non-Final Office Action dated May 23, 2019, issued in connection with U.S. Appl. No. 16/154,071, filed Oct. 8, 2018, 36 pages.
Non-Final Office Action dated Nov. 23, 2020, issued in connection with U.S. Appl. No. 16/524,306, filed Jul. 29, 2019, 14 pages.
Non-Final Office Action dated Sep. 23, 2020, issued in connection with U.S. Appl. No. 16/177,185, filed Oct. 31, 2018, 17 pages.
Non-Final Office Action dated Aug. 24, 2017, issued in connection with U.S. Appl. No. 15/297,627, filed Oct. 19, 2016, 13 pages.
Non-Final Office Action dated Jul. 24, 2019, issued in connection with U.S. Appl. No. 16/439,009, filed Jun. 12, 2019, 26 pages.
Non-Final Office Action dated Jul. 25, 2017, issued in connection with U.S. Appl. No. 15/273,679, filed Jul. 22, 2016, 11 pages.
Non-Final Office Action dated Dec. 26, 2018, issued in connection with U.S. Appl. No. 16/154,469, filed Oct. 8, 2018, 7 pages.
Non-Final Office Action dated Jan. 26, 2017, issued in connection with U.S. Appl. No. 15/098,867, filed Apr. 14, 2016, 16 pages.
Non-Final Office Action dated Oct. 26, 2017, issued in connection with U.S. Appl. No. 15/438,744, filed Feb. 21, 2017, 12 pages.
Non-Final Office Action dated Oct. 26, 2021, issued in connection with U.S. Appl. No. 16/736,725, filed Jan. 7, 2020, 12 pages.
Non-Final Office Action dated Jun. 27, 2018, issued in connection with U.S. Appl. No. 15/438,749, filed Feb. 21, 2017, 16 pages.
Non-Final Office Action dated Jun. 27, 2019, issued in connection with U.S. Appl. No. 16/437,437, filed Jun. 11, 2019, 8 pages.
Non-Final Office Action dated Jun. 27, 2019, issued in connection with U.S. Appl. No. 16/437,476, filed Jun. 11, 2019, 8 pages.
Non-Final Office Action dated Mar. 27, 2020, issued in connection with U.S. Appl. No. 16/790,621, filed Feb. 13, 2020, 8 pages.
Non-Final Office Action dated May 27, 2020, issued in connection with U.S. Appl. No. 16/715,713, filed Dec. 16, 2019, 14 pages.
Non-Final Office Action dated Oct. 27, 2020, issued in connection with U.S. Appl. No. 16/213,570, filed Dec. 7, 2018, 13 pages.
Non-Final Office Action dated Oct. 27, 2020, issued in connection with U.S. Appl. No. 16/715,984, filed Dec. 16, 2019, 14 pages.
Non-Final Office Action dated Oct. 27, 2020, issued in connection with U.S. Appl. No. 16/819,755, filed Mar. 16, 2020, 8 pages.
Non-Final Office Action dated Oct. 28, 2019, issued in connection with U.S. Appl. No. 16/145,275, filed Sep. 28, 2018, 11 pages.
Non-Final Office Action dated Oct. 28, 2021, issued in connection with U.S. Appl. No. 16/378,516, filed Apr. 8, 2019, 10 pages.
Non-Final Office Action dated Oct. 28, 2021, issued in connection with U.S. Appl. No. 17/247,736, filed Dec. 21, 2020, 12 pages.
Non-Final Office Action dated Mar. 29, 2019, issued in connection with U.S. Appl. No. 16/102,650, filed Aug. 13, 2018, 11 pages.
Non-Final Office Action dated Mar. 29, 2021, issued in connection with U.S. Appl. No. 16/528,265, filed Jul. 31, 2019, 18 pages.
Non-Final Office Action dated Nov. 29, 2021, issued in connection with U.S. Appl. No. 16/989,350, filed Aug. 10, 2020, 15 pages.
Non-Final Office Action dated Sep. 29, 2020, issued in connection with U.S. Appl. No. 16/402,617, filed May 3, 2019, 12 pages.
Non-Final Office Action dated Dec. 3, 2020, issued in connection with U.S. Appl. No. 16/145,275, filed Sep. 28, 2018, 11 pages.
Non-Final Office Action dated Jul. 3, 2019, issued in connection with U.S. Appl. No. 15/948,541, filed Apr. 9, 2018, 7 pages.
Non-Final Office Action dated May 3, 2019, issued in connection with U.S. Appl. No. 16/178,122, filed Nov. 1, 2018, 14 pages.
Non-Final Office Action dated Oct. 3, 2018, issued in connection with U.S. Appl. No. 16/102,153, filed Aug. 13, 2018, 20 pages.
Non-Final Office Action dated Apr. 30, 2019, issued in connection with U.S. Appl. No. 15/718,521, filed Sep. 28, 2017, 39 pages.
Non-Final Office Action dated Jun. 30, 2017, issued in connection with U.S. Appl. No. 15/277,810, filed Sep. 27, 2016, 13 pages.
Non-Final Office Action dated Apr. 4, 2019, issued in connection with U.S. Appl. No. 15/718,911, filed Sep. 28, 2017, 21 pages.
Non-Final Office Action dated Aug. 4, 2020, issued in connection with U.S. Appl. No. 16/600,644, filed Oct. 14, 2019, 30 pages.
Non-Final Office Action dated Jan. 4, 2019, issued in connection with U.S. Appl. No. 15/948,541, filed Apr. 9, 2018, 6 pages.
International Bureau, International Preliminary Report on Patentability, dated Jun. 17, 2021, issued in connection with International Application No. PCT/US2019/064907, filed on Dec. 6, 2019, 8 pages.

(56) References Cited

OTHER PUBLICATIONS

International Bureau, International Preliminary Report on Patentability, dated Mar. 2, 2021, issued in connection with International Application No. PCT/US2019/048558, filed on Aug. 28, 2019, 8 pages.
International Bureau, International Preliminary Report on Patentability, dated Feb. 20, 2020, issued in connection with International Application No. PCT/US2018/045397, filed on Aug. 6, 2018, 8 pages.
International Bureau, International Preliminary Report on Patentability, dated Apr. 23, 2019, issued in connection with International Application No. PCT/US2017/057220, filed on Oct. 18, 2017, 7 pages.
International Bureau, International Preliminary Report on Patentability, dated Mar. 31, 2020, issued in connection with International Application No. PCT/US2018053123, filed on Sep. 27, 2018, 12 pages.
International Bureau, International Preliminary Report on Patentability, dated Mar. 31, 2020, issued in connection with International Application No. PCT/US2018053472, filed on Sep. 28, 2018, 8 pages.
International Bureau, International Preliminary Report on Patentability, dated Mar. 31, 2020, issued in connection with International Application No. PCT/US2018053517, filed on Sep. 28, 2018, 10 pages.
International Bureau, International Preliminary Report on Patentability, dated Sep. 7, 2018, issued in connection with International Application No. PCT/US2017/018728, filed on Feb. 21, 2017, 8 pages.
International Bureau, International Preliminary Report on Patentability, dated Sep. 7, 2018, issued in connection with International Application No. PCT/US2017/018739, filed on Feb. 21, 2017, 7 pages.
International Bureau, International Search Report and Written Opinion dated Nov. 10, 2020, issued in connection with International Application No. PCT/US2020/044250, filed on Jul. 30, 2020, 15 pages.
International Bureau, International Search Report and Written Opinion dated Dec. 11, 2019, issued in connection with International Application No. PCT/US2019/052129, filed on Sep. 20, 2019, 18 pages.
International Bureau, International Search Report and Written Opinion dated Nov. 13, 2018, issued in connection with International Application No. PCT/US2018/045397, filed on Aug. 6, 2018, 11 pages.
International Bureau, International Search Report and Written Opinion dated Jan. 14, 2019, issued in connection with International Application No. PCT/US2018053472, filed on Sep. 28, 2018, 10 pages.
International Bureau, International Search Report and Written Opinion dated Jul. 14, 2020, issued in connection with International Application No. PCT/US2020/017150, filed on Feb. 7, 2020, 27 pages.
International Bureau, International Search Report and Written Opinion dated Nov. 14, 2017, issued in connection with International Application No. PCT/US2017/045521, filed on Aug. 4, 2017, 10 pages.
International Bureau, International Search Report and Written Opinion dated Jul. 17, 2019, issued in connection with International Application No. PCT/US2019/032934, filed on May 17, 2019, 17 pages.
International Bureau, International Search Report and Written Opinion dated Nov. 18, 2019, issued in connection with International Application No. PCT/US2019/048558, filed on Aug. 28, 2019, 11 pages.
International Bureau, International Search Report and Written Opinion dated Nov. 18, 2019, issued in connection with International Application No. PCT/U.S. Pat. No. 2019052841, filed on Sep. 25, 2019, 12 pages.
International Bureau, International Search Report and Written Opinion dated Mar. 2, 2020, issued in connection with International Application No. PCT/U.S. Pat. No. 2019064907, filed on Dec. 6, 2019, 11 pages.
International Bureau, International Search Report and Written Opinion dated Mar. 2, 2020, issued in connection with International Application No. PCT/US2019/064907, filed on Dec. 6, 2019, 9 pages.
International Bureau, International Search Report and Written Opinion dated Dec. 20, 2019, issued in connection with International Application No. PCT/U.S. Pat. No. 2019052654, filed on Sep. 24, 2019, 11 pages.
International Bureau, International Search Report and Written Opinion dated Sep. 21, 2020, issued in connection with International Application No. PCT/US2020/037229, filed on Jun. 11, 2020, 17 pages.
International Bureau, International Search Report and Written Opinion dated Oct. 22, 2020, issued in connection with International Application No. PCT/US2020/044282, filed on Jul. 30, 2020, 15 pages.
International Bureau, International Search Report and Written Opinion dated Apr. 23, 2021, issued in connection with International Application No. PCT/US2021/070007, filed on Jan. 6, 2021, 11 pages.
International Bureau, International Search Report and Written Opinion dated Jul. 24, 2018, issued in connection with International Application No. PCT/US2018/019010, filed on Feb. 21, 2018, 12 pages.
International Bureau, International Search Report and Written Opinion, dated Feb. 27, 2019, issued in connection with International Application No. PCT/US2018/053123, filed on Sep. 27, 2018, 16 pages.
International Bureau, International Search Report and Written Opinion dated Sep. 27, 2019, issued in connection with International Application No. PCT/US2019/039828, filed on Jun. 28, 2019, 13 pages.
International Bureau, International Search Report and Written Opinion dated Nov. 29, 2019, issued in connection with International Application No. PCT/US2019/053253, filed on Sep. 29, 2019, 14 pages.
International Bureau, International Search Report and Written Opinion dated Sep. 4, 2019, issued in connection with International Application No. PCT/US2019/033945, filed on May 24, 2019, 8 pages.
International Bureau, International Search Report and Written Opinion dated Aug. 6, 2020, issued in connection with International Application No. PCT/FR2019/000081, filed on May 24, 2019, 12 pages.
International Bureau, International Search Report and Written Opinion dated Dec. 6, 2018, issued in connection with International Application No. PCT/US2018/050050, filed on Sep. 7, 2018, 9 pages.
International Bureau, International Search Report and Written Opinion dated Dec. 6, 2019, issued in connection with International Application No. PCT/US2019050852, filed on Sep. 12, 2019, 10 pages.
International Bureau, International Search Report and Written Opinion dated Oct. 6, 2017, issued in connection with International Application No. PCT/US2017/045551, filed on Aug. 4, 2017, 12 pages.
International Bureau, International Search Report and Written Opinion dated Apr. 8, 2020, issued in connection with International Application No. PCT/US2019/067576, filed on Dec. 19, 2019, 12 pages.
International Searching Authority, International Search Report and Written Opinion dated Feb. 8, 2021, issued in connection with International Application No. PCT/EP2020/082243, filed on Nov. 16, 2020, 10 pages.
International Searching Authority, International Search Report and Written Opinion dated Feb. 12, 2021, issued in connection with International Application No. PCT/US2020/056632, filed on Oct. 21, 2020, 10 pages.

(56) References Cited

OTHER PUBLICATIONS

International Searching Authority, International Search Report and Written Opinion dated Dec. 19, 2018, in connection with International Application No. PCT/US2018/053517, 13 pages.
International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated Apr. 23, 2021, issued in connection with International Application No. PCT/US2020/066231, filed on Dec. 18, 2020, 9 pages.
International Searching Authority, International Search Report and Written Opinion dated Jan. 23, 2018, issued in connection with International Application No. PCT/US2017/57220, filed on Oct. 18, 2017, 8 pages.
International Searching Authority, International Search Report and Written Opinion dated May 23, 2017, issued in connection with International Application No. PCT/US2017/018739, Filed on Feb. 21, 2017, 10 pages.
International Searching Authority, International Search Report and Written Opinion dated Oct. 23, 2017, issued in connection with International Application No. PCT/US2017/042170, filed on Jul. 14, 2017, 15 pages.
International Searching Authority, International Search Report and Written Opinion dated Oct. 24, 2017, issued in connection with International Application No. PCT/US2017/042227, filed on Jul. 14, 2017, 16 pages.
International Searching Authority, International Search Report and Written Opinion dated May 30, 2017, issued in connection with International Application No. PCT/US2017/018728, Filed on Feb. 21, 2017, 11 pages.
Japanese Patent Office, Decision of Refusal and Translation dated Jun. 8, 2021, issued in connection with Japanese Patent Application No. 2019-073348, 5 pages.
Japanese Patent Office, English Translation of Office Action dated Nov. 17, 2020, issued in connection with Japanese Application No. 2019-145039, 5 pages.
Japanese Patent Office, English Translation of Office Action dated Aug. 27, 2020, issued in connection with Japanese Application No. 2019-073349, 6 pages.
Japanese Patent Office, English Translation of Office Action dated Jul. 30, 2020, issued in connection with Japanese Application No. 2019-517281, 26 pages.
Japanese Patent Office, Non-Final Office Action and Translation dated Nov. 5, 2019, issued in connection with Japanese Patent Application No. 2019-517281, 6 pages.
Japanese Patent Office, Notice of Reasons for Refusal and Translation dated Jun. 22, 2021, issued in connection with Japanese Patent Application No. 2020-517935, 4 pages.
Notice of Allowance dated Oct. 25, 2021, issued in connection with U.S. Appl. No. 16/723,909, filed Dec. 20, 2019, 11 pages.
Notice of Allowance dated Aug. 26, 2020, issued in connection with U.S. Appl. No. 15/948,541, filed Apr. 9, 2018, 9 pages.
Notice of Allowance dated May 26, 2021, issued in connection with U.S. Appl. No. 16/927,670, filed Jul. 13, 2020, 10 pages.
Notice of Allowance dated Apr. 27, 2020, issued in connection with U.S. Appl. No. 16/700,607, filed Dec. 2, 2019, 10 pages.
Notice of Allowance dated Mar. 27, 2019, issued in connection with U.S. Appl. No. 16/214,666, filed Dec. 10, 2018, 6 pages.
Notice of Allowance dated Mar. 28, 2018, issued in connection with U.S. Appl. No. 15/699,982, filed Sep. 8, 2017, 17 pages.
Notice of Allowance dated May 28, 2021, issued in connection with U.S. Appl. No. 16/524,306, filed Jul. 29, 2019, 9 pages.
Notice of Allowance dated Dec. 29, 2017, issued in connection with U.S. Appl. No. 15/131,776, filed Apr. 18, 2016, 13 pages.
Notice of Allowance dated Jan. 29, 2021, issued in connection with U.S. Appl. No. 16/290,599, filed Mar. 1, 2019, 9 pages.
Notice of Allowance dated Jun. 29, 2020, issued in connection with U.S. Appl. No. 16/216,357, filed Dec. 11, 2018, 8 pages.
Notice of Allowance dated Mar. 29, 2021, issued in connection with U.S. Appl. No. 16/600,949, filed Oct. 14, 2019, 9 pages.
Notice of Allowance dated May 29, 2020, issued in connection with U.S. Appl. No. 16/148,879, filed Oct. 1, 2018, 6 pages.
Notice of Allowance dated Sep. 29, 2021, issued in connection with U.S. Appl. No. 16/876,493, filed May 18, 2020, 5 pages.
Notice of Allowance dated Apr. 3, 2019, issued in connection with U.S. Appl. No. 16/160,107, filed Oct. 15, 2018, 7 pages.
Notice of Allowance dated Jun. 3, 2021, issued in connection with U.S. Appl. No. 16/876,493, filed May 18, 2020, 7 pages.
Notice of Allowance dated Jul. 30, 2018, issued in connection with U.S. Appl. No. 15/098,718, filed Apr. 14, 2016, 5 pages.
Notice of Allowance dated Jul. 30, 2019, issued in connection with U.S. Appl. No. 15/131,254, filed Apr. 18, 2016, 9 pages.
Notice of Allowance dated Mar. 30, 2020, issued in connection with U.S. Appl. No. 15/973,413, filed May 7, 2018, 5 pages.
Notice of Allowance dated Nov. 30, 2018, issued in connection with U.S. Appl. No. 15/438,725, filed Feb. 21, 2017, 5 pages.
Notice of Allowance dated Oct. 30, 2019, issued in connection with U.S. Appl. No. 16/131,392, filed Sep. 14, 2018, 9 pages.
Notice of Allowance dated Oct. 30, 2020, issued in connection with U.S. Appl. No. 16/528,016, filed Jul. 31, 2019, 10 pages.
Notice of Allowance dated May 31, 2019, issued in connection with U.S. Appl. No. 15/717,621, filed Sep. 27, 2017, 9 pages.
Notice of Allowance dated Jun. 4, 2021, issued in connection with U.S. Appl. No. 16/528,265, filed Jul. 31, 2019, 17 pages.
Notice of Allowance dated Mar. 4, 2020, issued in connection with U.S. Appl. No. 16/444,975, filed Jun. 18, 2019, 10 pages.
Notice of Allowance dated Feb. 5, 2020, issued in connection with U.S. Appl. No. 16/178,122, filed Nov. 1, 2018, 9 pages.
Notice of Allowance dated Oct. 5, 2018, issued in connection with U.S. Appl. No. 15/211,748, filed Jul. 15, 2018, 10 pages.
Notice of Allowance dated Feb. 6, 2019, issued in connection with U.S. Appl. No. 16/102,153, filed Aug. 13, 2018, 9 pages.
Notice of Allowance dated Feb. 6, 2020, issued in connection with U.S. Appl. No. 16/227,308, filed Dec. 20, 2018, 7 pages.
Notice of Allowance dated Apr. 7, 2020, issued in connection with U.S. Appl. No. 15/098,760, filed Apr. 14, 2016, 7 pages.
Notice of Allowance dated Apr. 7, 2020, issued in connection with U.S. Appl. No. 16/147,710, filed Sep. 29, 2018, 15 pages.
Notice of Allowance dated Jun. 7, 2019, issued in connection with U.S. Appl. No. 16/102,153, filed Aug. 13, 2018, 9 pages.
Notice of Allowance dated Jun. 7, 2021, issued in connection with U.S. Appl. No. 16/528,224, filed Jul. 31, 2019, 9 pages.
Notice of Allowance dated Nov. 8, 2021, issued in connection with U.S. Appl. No. 17/008,104, filed Aug. 31, 2020, 9 pages.
Notice of Allowance dated Aug. 9, 2018, issued in connection with U.S. Appl. No. 15/229,868, filed Aug. 5, 2016, 11 pages.
Notice of Allowance dated Dec. 9, 2021, issued in connection with U.S. Appl. No. 16/845,946, filed Apr. 10, 2020, 10 pages.
Notice of Allowance dated Mar. 9, 2018, issued in connection with U.S. Appl. No. 15/584,782, filed May 2, 2017, 8 pages.
Oord et al. WaveNet: A Generative Model for Raw Audio. Arxiv.org, Cornell University Library, Sep. 12, 2016, 15 pages.
Optimizing Siri on HomePod in Far-Field Settings. Audio Software Engineering and Siri Speech Team, Machine Learning Journal vol. 1, Issue 12. https://machinelearning.apple.com/2018/12/03/optimizing-siri-on-homepod-in-far-field-settings.html. Dec. 2018,18 pages .
Palm, Inc., "Handbook for the Palm VII Handheld," May 2000, 311 pages.
Parada et al. Contextual Information Improves OOV Detection in Speech. Proceedings of the 2010 Annual Conference of the North American Chapter of the Association for Computational Linguistics, Jun. 2, 2010, 9 pages.
Pre-Appeal Brief Decision dated Jan. 18, 2022, issued in connection with U.S. Appl. No. 16/806,747, filed Mar. 2, 2020, 2 pages.
Pre-Appeal Brief Decision dated Jun. 2, 2021, issued in connection with U.S. Appl. No. 16/213,570, filed Dec. 7, 2018, 2 pages.
Preinterview First Office Action dated Aug. 5, 2019, issued in connection with U.S. Appl. No. 16/434,426, filed Jun. 7, 2019, 4 pages.

(56) References Cited

OTHER PUBLICATIONS

Preinterview First Office Action dated Mar. 25, 2020, issued in connection with U.S. Appl. No. 16/109,375, filed Aug. 22, 2018, 6 pages.
Preinterview First Office Action dated Sep. 30, 2019, issued in connection with U.S. Appl. No. 15/989,715, filed May 25, 2018, 4 pages.
Preinterview First Office Action dated May 7, 2020, issued in connection with U.S. Appl. No. 16/213,570, filed Dec. 7, 2018, 5 pages.
Preinterview First Office Action dated Jan. 8, 2021, issued in connection with U.S. Appl. No. 16/798,967, filed Feb. 24, 2020, 4 pages.
Presentations at WinHEC 2000, May 2000, 138 pages.
Renato De Mori. Spoken Language Understanding: A Survey. Automatic Speech Recognition & Understanding, 2007. IEEE, Dec. 1, 2007, 56 pages.
Restriction Requirement dated Aug. 14, 2019, issued in connection with U.S. Appl. No. 16/214,711, filed Dec. 10, 2018, 5 pages.
Advisory Action dated Jun. 10, 2020, issued in connection with U.S. Appl. No. 15/936,177, filed Mar. 26, 2018, 4 pages.
Advisory Action dated Aug. 13, 2021, issued in connection with U.S. Appl. No. 16/271,550, filed Feb. 8, 2019, 4 pages.
Advisory Action dated Apr. 23, 2021, issued in connection with U.S. Appl. No. 16/219,702, filed Dec. 13, 2018, 3 pages.
Advisory Action dated Apr. 24, 2020, issued in connection with U.S. Appl. No. 15/948,541, filed Apr. 9, 2018, 4 pages.
Advisory Action dated Jun. 28, 2018, issued in connection with U.S. Appl. No. 15/438,744, filed Feb. 21, 2017, 3 pages.
Advisory Action dated Dec. 31, 2018, issued in connection with U.S. Appl. No. 15/804,776, filed Nov. 6, 2017, 4 pages.
Advisory Action dated Sep. 8, 2021, issued in connection with U.S. Appl. No. 16/168,389, filed Oct. 23, 2018, 4 pages.
Advisory Action dated Jun. 9, 2020, issued in connection with U.S. Appl. No. 16/145,275, filed Sep. 28, 2018, 3 pages.
Andra et al. Contextual Keyword Spotting in Lecture Video With Deep Convolutional Neural Network. 2017 International Conference on Advanced Computer Science and Information Systems, IEEE, Oct. 28, 2017, 6 pages.
Anonymous,. S Voice or Google Now—The Lowdown. Apr. 28, 2015, 9 pages, [online], [retrieved on Nov. 29, 2017], Retrieved from the Internet (URL:http://web.archive.org/web/20160807040123/http://lowdown.carphonewarehouse.com/news/s-voice-or-google-now/29958/).
Anonymous: "What are the function of 4 Microphones on iPhone 6S/6S+?", ETrade Supply, Dec. 24, 2015, XP055646381, Retrieved from the Internet URL:https://www.etradesupply.com/blog/4-microphones-iphone-6s6s-for/[retrieved on Nov. 26, 2019].
Audhkhasi Kartik et al. End-to-end ASR-free keyword search from speech. 2017 IEEE International Conference on Acoustics, Speech and Signal Processing, Mar. 5, 2017, 7 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Patent Office, Australian Examination Report Action dated Apr. 14, 2020, issued in connection with Australian Application No. 2019202257, 3 pages.
Australian Patent Office, Australian Examination Report Action dated Oct. 3, 2019, issued in connection with Australian Application No. 2018230932, 3 pages.
Australian Patent Office, Australian Examination Report Action dated Apr. 7, 2021, issued in connection with Australian Application No. 2019333058, 2 pages.
Australian Patent Office, Australian Examination Report Action dated Aug. 7, 2020, issued in connection with Australian Application No. 2019236722, 4 pages.
Australian Patent Office, Examination Report dated Jun. 28, 2021, issued in connection with Australian Patent Application No. 2019395022, 2 pages.
Australian Patent Office, Examination Report dated Oct. 30, 2018, issued in connection with Australian Application No. 2017222436, 3 pages.
"Automatic Parameter Tying in Neural Networks" ICLR 2018, 14 pages.
Bertrand et al. "Adaptive Distributed Noise Reduction for Speech Enhancement in Wireless Acoustic Sensor Networks" Jan. 2010, 4 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Examination Report dated Dec. 1, 2021, issued in connection with Canadian Application No. 3096442, 4 pages.
Canadian Patent Office, Canadian Examination Report dated Nov. 2, 2021, issued in connection with Canadian Application No. 3067776, 4 pages.
Canadian Patent Office, Canadian Examination Report dated Oct. 26, 2021, issued in connection with Canadian Application No. 3072492, 3 pages.
Canadian Patent Office, Canadian Examination Report dated Mar. 9, 2021, issued in connection with Canadian Application No. 3067776, 5 pages.
Canadian Patent Office, Canadian Office Action dated Nov. 14, 2018, issued in connection with Canadian Application No. 3015491, 3 pages.
Chinese Patent Office, Chinese Office Action and Translation dated Jul. 2, 2021, issued in connection with Chinese Application No. 201880077216.4, 22 pages.
Chinese Patent Office, Chinese Office Action and Translation dated Mar. 30, 2021, issued in connection with Chinese Application No. 202010302650.7, 15 pages.
Chinese Patent Office, First Office Action and Translation dated Dec. 1, 2021, issued in connection with Chinese Application No. 201780077204.7, 11 pages.
Chinese Patent Office, First Office Action and Translation dated Dec. 20, 2021, issued in connection with Chinese Application No. 202010302650.7, 10 pages.
Chinese Patent Office, First Office Action and Translation dated Mar. 20, 2019, issued in connection with Chinese Application No. 201780025028.2, 18 pages.
Chinese Patent Office, First Office Action and Translation dated Mar. 27, 2019, issued in connection with Chinese Application No. 201780025029.7, 9 pages.
Chinese Patent Office, First Office Action and Translation dated May 27, 2021, issued in connection with Chinese Application No. 201880026360.5, 15 pages.
Chinese Patent Office, First Office Action and Translation dated Dec. 28, 2020, issued in connection with Chinese Application No. 201880072203.8, 11 pages.
Chinese Patent Office, First Office Action and Translation dated Nov. 5, 2019, issued in connection with Chinese Application No. 201780072651.3, 19 pages.
Chinese Patent Office, First Office Action dated Feb. 28, 2020, issued in connection with Chinese Application No. 201780061543.6, 29 pages.
Chinese Patent Office, Second Office Action and Translation dated May 11, 2020, issued in connection with Chinese Application No. 201780061543.6, 17 pages.
Chinese Patent Office, Second Office Action and Translation dated Jul. 18, 2019, issued in connection with Chinese Application No. 201780025029.7, 14 pages.
Chinese Patent Office, Second Office Action and Translation dated Sep. 23, 2019, issued in connection with Chinese Application No. 201780025028.2, 15 pages.
Chinese Patent Office, Second Office Action and Translation dated Mar. 31, 2020, issued in connection with Chinese Application No. 201780072651.3, 17 pages.
Chinese Patent Office, Third Office Action and Translation dated Sep. 16, 2019, issued in connection with Chinese Application No. 201780025029.7, 14 pages.

(56) References Cited

OTHER PUBLICATIONS

Chinese Patent Office, Third Office Action and Translation dated Aug. 5, 2020, issued in connection with Chinese Application No. 201780072651.3, 10 pages.
Chinese Patent Office, Translation of Office Action dated Jul. 18, 2019, issued in connection with Chinese Application No. 201780025029.7, 8 pages.
Chung et al. Empirical Evaluation of Gated Recurrent Neural Network on Sequence Modeling. Dec. 11, 2014, 9 pages.
Cipriani,. The complete list of OK, Google commands—CNET Jul. 1, 2016, 5 pages. [online], [retrieved on Jan. 15, 2020]. Retrieved from the Internet: (URL:https://web.archive.org/web/20160803230926/https://www.cnet.com/how-to/complete-list-of-ok-google--commands/).
Corrected Notice of Allowability dated Mar. 8, 2017, issued in connection with U.S. Appl. No. 15/229,855, filed Aug. 5, 2016, 6 pages.
Japanese Patent Office, Notice of Reasons for Refusal and Translation dated Nov. 28, 2021, issued in connection with Japanese Patent Application No. 2020-550102, 9 pages.
Japanese Patent Office, Office Action and Translation dated Mar. 16, 2021, issued in connection with Japanese Patent Application No. 2020-506725, 7 pages.
Japanese Patent Office, Office Action and Translation dated Nov. 17, 2020, issued in connection with Japanese Patent Application No. 2019-145039, 7 pages.
Japanese Patent Office, Office Action and Translation dated Apr. 20, 2021, issued in connection with Japanese Patent Application No. 2020-513852, 9 pages.
Japanese Patent Office, Office Action and Translation dated Feb. 24, 2021, issued in connection with Japanese Patent Application No. 2019-517281, 4 pages.
Japanese Patent Office, Office Action and Translation dated Apr. 27, 2021, issued in connection with Japanese Patent Application No. 2020-518400, 10 pages.
Japanese Patent Office, Office Action and Translation dated Aug. 27, 2020, issued in connection with Japanese Patent Application No. 2019-073349, 6 pages.
Japanese Patent Office, Office Action and Translation dated Jul. 30, 2020, issued in connection with Japanese Patent Application No. 2019-517281, 6 pages.
Japanese Patent Office, Office Action and Translation dated Jul. 6, 2020, issued in connection with Japanese Patent Application No. 2019-073348, 10 pages.
Japanese Patent Office, Office Action and Translation dated Jul. 6, 2021, issued in connection with Japanese Patent Application No. 2019-073349, 6 pages.
Japanese Patent Office, Office Action and Translation dated Oct. 8, 2019, issued in connection with Japanese Patent Application No. 2019-521032, 5 pages.
Japanese Patent Office, Office Action dated Dec. 7, 2021, issued in connection with Japanese Patent Application No. 2020-513852, 6 pages.
Japanese Patent Office, Office Action Translation dated Nov. 5, 2019, issued in connection with Japanese Patent Application No. 2019-517281, 2 pages.
Japanese Patent Office, Office Action Translation dated Oct. 8, 2019, issued in connection with Japanese Patent Application No. 2019-521032, 8 pages.
Jo et al., "Synchronized One-to-many Media Streaming with Adaptive Playout Control," Proceedings of SPIE, 2002, pp. 71-82, vol. 4861.
Johnson, "Implementing Neural Networks into Modem Technology," IJCNN'99. International Joint Conference on Neural Networks. Proceedings [Cat. No. 99CH36339], Washington, DC, USA, 1999, pp. 1028-1032, vol. 2, doi: 10.1109/IJCNN.1999.831096. [retrieved on Jun. 22, 2020].

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Jose Alvarez and Mathieu Salzmann "Compression-aware Training of Deep Networks" 31st Conference on Neural Information Processing Systems, Nov. 13, 2017, 12pages.
Joseph Szurley et al, "Efficient computation of microphone utility in a wireless acoustic sensor network with multi-channel Wiener filter based noise reduction", 2012 IEEE International Conference on Acoustics, Speech and Signal Processing, Kyoto, Japan, Mar. 25-30, 2012, pp. 2657-2660, XP032227701, DOI: 10.1109/ICASSP.2012.6288463 ISBN: 978-1-4673-0045-2.
Ketabdar et al. Detection of Out-of-Vocabulary Words in Posterior Based ASR. Proceedings of Interspeech 2007, Aug. 27, 2007, 4 pages.
Kim et al. Character-Aware Neural Language Models. Retrieved from the Internet: URL: https://arxiv.org/pdf/1508.06615v3.pdf, Oct. 16, 2015, 9 pages.
Korean Patent Office, Korean Examination Report and Translation dated Nov. 25, 2021, issued in connection with Korean Application No. 10-2021-7008937, 14 pages.
Korean Patent Office, Korean Examination Report and Translation dated Apr. 26, 2021, issued in connection with Korean Application No. 10-2021-7008937, 15 pages.
Korean Patent Office, Korean Examination Report and Translation dated Dec. 27, 2021, issued in connection with Korean Application No. 10-2021-7008937, 22 pages.
Korean Patent Office, Korean Office Action and Translation dated Oct. 14, 2021, issued in connection with Korean Application No. 10-2020-7011843, 29 pages.
Korean Patent Office, Korean Office Action and Translation dated Aug. 16, 2019, issued in connection with Korean Application No. 10-2018-7027452, 14 pages.
Korean Patent Office, Korean Office Action and Translation dated Apr. 2, 2020, issued in connection with Korean Application No. 10-2020-7008486, 12 pages.
Korean Patent Office, Korean Office Action and Translation dated Mar. 25, 2020, issued in connection with Korean Application No. 10-2019-7012192, 14 pages.
Korean Patent Office, Korean Office Action and Translation dated Aug. 26, 2020, issued in connection with Korean Application No. 10-2019-7027640, 16 pages.
Korean Patent Office, Korean Office Action and Translation dated Mar. 30, 2020, issued in connection with Korean Application No. 10 2020 7004425, 5 pages.
Korean Patent Office, Korean Office Action and Translation dated Jan. 4, 2021, issued in connection with Korean Application No. 10-2020-7034425, 14 pages.
Korean Patent Office, Korean Office Action and Translation dated Sep. 9, 2019, issued in connection with Korean Application No. 10-2018-7027451, 21 pages.
Korean Patent Office, Korean Office Action dated May 8, 2019, issued in connection with Korean Applicatior No. 10-2018-7027451, 7 pages.
Korean Patent Office, Korean Office Action dated May 8, 2019, issued in connection with Korean Applicatior No. 10-2018-7027452, 5 pages.
Lei et al. Accurate and Compact Large Vocabulary Speech Recognition on Mobile Devices. Interspeech 2013, Aug. 25, 2013, 4 pages.
Lengerich et al. An End-to-End Architecture for Keyword Spotting and Voice Activity Detection, arXiv:1611.09405v1, Nov. 28, 2016, 5 pages.
Louderback, Jim, "Affordable Audio Receiver Furnishes Homes With MP3," TechTV Vault. Jun. 28, 2000 retrieved Jul. 10, 2014, 2 pages.
Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 4-6, 2012, 4pages.
Matrix—The Ultimate Development Board Sep. 14, 2019 Matrix—The Ultimate Development Board Sep. 14, 2019 https-//web.archive.org/web/20190914035838/https-//www.matrix.one/ , 1 page.

(56) References Cited

OTHER PUBLICATIONS

Mesaros et al. Detection and Classification of Acoustic Scenes and Events: Outcome of the DCASE 2016 Challenge. IEEE/ACM Transactions on Audio, Speech, and Language Processing. Feb. 2018, 16 pages.
Morales-Cordovilla et al. "Room Localization for Distant Speech Recognition," Proceedings of Interspeech 2014, Sep. 14, 2014, 4 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Non-Final Office Action dated Jul. 12, 2021, issued in connection with U.S. Appl. No. 17/008,104, filed Aug. 31, 2020, 6 pages.
Non-Final Office Action dated Jun. 18, 2021, issued in connection with U.S. Appl. No. 17/236,559, filed Apr. 21, 2021, 9 pages.
Non-Final Office Action dated Dec. 21, 2020, issued in connection with U.S. Appl. No. 16/153,530, filed Oct. 5, 2018, 22 pages.
Non-Final Office Action dated Jul. 22, 2021, issued in connection with U.S. Appl. No. 16/179,779, filed Nov. 2, 2018, 19 pages.
Non-Final Office Action dated Apr. 23, 2021, issued in connection with U.S. Appl. No. 16/660,197, filed Oct. 22, 2019, 9 pages.
Notice of Allowance dated Jan. 14, 2021, issued in connection with U.S. Appl. No. 17/087,423, filed Nov. 2, 2020, 8 pages.
Notice of Allowance dated Jan. 14, 2022, issued in connection with U.S. Appl. No. 16/966,397, filed Jul. 30, 2020, 5 pages.
Notice of Allowance dated Jun. 14, 2017, issued in connection with U.S. Appl. No. 15/282,554, filed Sep. 30, 2016, 11 pages.
Notice of Allowance dated Nov. 14, 2018, issued in connection with U.S. Appl. No. 15/297,627, filed Oct. 19, 2016, 5 pages.
Notice of Allowance dated Dec. 15, 2017, issued in connection with U.S. Appl. No. 15/223,218, filed Jul. 29, 2016, 7 pages.
Notice of Allowance dated Jan. 15, 2020, issued in connection with U.S. Appl. No. 16/439,009, filed Jun. 12, 2019, 9 pages.
Notice of Allowance dated Mar. 15, 2019, issued in connection with U.S. Appl. No. 15/804,776, filed Nov. 6, 2017, 9 pages.
Notice of Allowance dated Oct. 15, 2019, issued in connection with U.S. Appl. No. 16/437,437, filed Jun. 11, 2019, 9 pages.
Notice of Allowance dated Oct. 15, 2020, issued in connection with U.S. Appl. No. 16/715,713, filed Dec. 16, 2019, 9 pages.
Notice of Allowance dated Oct. 15, 2021, issued in connection with U.S. Appl. No. 16/213,570, filed Dec. 7, 2018, 8 pages.
Notice of Allowance dated Sep. 15, 2021, issued in connection with U.S. Appl. No. 16/685,135, filed Nov. 15, 2019, 10 pages.
Notice of Allowance dated Apr. 16, 2021, issued in connection with U.S. Appl. No. 16/798,967, filed Feb. 24, 2020, 16 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Feb. 17, 2021, issued in connection with U.S. Appl. No. 16/715,984, filed Dec. 16, 2019, 8 pages.
Notice of Allowance dated Jul. 17, 2019, issued in connection with U.S. Appl. No. 15/718,911, filed Sep. 28, 2017, 5 pages.
Notice of Allowance dated Jun. 17, 2020, issued in connection with U.S. Appl. No. 16/141,875, filed Sep. 25, 2018, 6 pages.
Notice of Allowance dated Sep. 17, 2018, issued in connection with U.S. Appl. No. 15/211,689, filed Jul. 15, 2016, 6 pages.
Notice of Allowance dated Apr. 18, 2019, issued in connection with U.S. Appl. No. 16/173,797, filed Oct. 29, 2018, 9 pages.
Notice of Allowance dated Dec. 18, 2019, issued in connection with U.S. Appl. No. 16/434,426, filed Jun. 7, 2019, 13 pages.
Notice of Allowance dated Feb. 18, 2020, issued in connection with U.S. Appl. No. 16/022,662, filed Jun. 28, 2018, 8 pages.
Notice of Allowance dated Jul. 18, 2019, issued in connection with U.S. Appl. No. 15/438,749, filed Feb. 21, 2017, 9 pages.
Notice of Allowance dated Jul. 18, 2019, issued in connection with U.S. Appl. No. 15/721,141, filed Sep. 29, 2017, 8 pages.
Notice of Allowance dated Mar. 18, 2021, issued in connection with U.S. Appl. No. 16/177,185, filed Oct. 31, 2018, 8 pages.
Notice of Allowance dated Aug. 19, 2020, issued in connection with U.S. Appl. No. 16/271,560, filed Feb. 8, 2019, 9 pages.
Notice of Allowance dated Dec. 19, 2018, issued in connection with U.S. Appl. No. 15/818,051, filed Nov. 20, 2017, 9 pages.
Notice of Allowance dated Jul. 19, 2018, issued in connection with U.S. Appl. No. 15/681,937, filed Aug. 21, 2017, 7 pages.
Notice of Allowance dated Mar. 19, 2021, issued in connection with U.S. Appl. No. 17/157,686, filed Jan. 25, 2021, 11 pages.
Notice of Allowance dated Aug. 2, 2019, issued in connection with U.S. Appl. No. 16/102,650, filed Aug. 13, 2018, 5 pages.
Notice of Allowance dated Dec. 2, 2020, issued in connection with U.S. Appl. No. 15/989,715, filed May 25, 2018, 11 pages.
Notice of Allowance dated Dec. 2, 2021, issued in connection with U.S. Appl. No. 16/841,116, filed Apr. 6, 2020, 5 pages.
Notice of Allowance dated Sep. 2, 2020, issued in connection with U.S. Appl. No. 16/214,711, filed Dec. 10, 2018, 9 pages.
Notice of Allowance dated Jul. 20, 2020, issued in connection with U.S. Appl. No. 15/984,073, filed May 18, 2018, 12 pages.
Notice of Allowance dated Mar. 20, 2018, issued in connection with U.S. Appl. No. 15/784,952, filed Oct. 16, 2017, 7 pages.
Notice of Allowance dated Oct. 20, 2021, issued in connection with U.S. Appl. No. 16/439,032, filed Jun. 12, 2019, 8 pages.
Notice of Allowance dated Sep. 20, 2018, issued in connection with U.S. Appl. No. 15/946,599, filed Apr. 5, 2018, 7 pages.
Notice of Allowance dated Apr. 21, 2021, issued in connection with U.S. Appl. No. 16/145,275, filed Sep. 28, 2018, 8 pages.
Notice of Allowance dated Dec. 21, 2021, issued in connection with U.S. Appl. No. 16/271,550, filed Feb. 8, 2019, 11 pages.
Notice of Allowance dated Feb. 21, 2020, issued in connection with U.S. Appl. No. 16/416,752, filed May 20, 2019, 6 pages.
Notice of Allowance dated Jan. 21, 2020, issued in connection with U.S. Appl. No. 16/672,764, filed Nov. 4, 2019, 10 pages.
Notice of Allowance dated Jan. 21, 2021, issued in connection with U.S. Appl. No. 16/600,644, filed Oct. 14, 2019, 7 pages.
Notice of Allowance dated Oct. 21, 2019, issued in connection with U.S. Appl. No. 15/946,585, filed Apr. 5, 2018, 5 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Jul. 22, 2020, issued in connection with U.S. Appl. No. 16/131,409, filed Sep. 14, 2018, 13 pages.
Notice of Allowance dated Jul. 22, 2020, issued in connection with U.S. Appl. No. 16/790,621, filed Feb. 13, 2020, 10 pages.
Notice of Allowance dated Nov. 22, 2021, issued in connection with U.S. Appl. No. 16/834,483, filed Mar. 30, 2020, 10 pages.
Notice of Allowance dated Aug. 23, 2021, issued in connection with U.S. Appl. No. 16/109,375, filed Aug. 22, 2018, 10 pages.
Notice of Allowance dated Jun. 23, 2021, issued in connection with U.S. Appl. No. 16/814,844, filed Mar. 10, 2020, 8 pages.
Notice of Allowance dated Apr. 24, 2019, issued in connection with U.S. Appl. No. 16/154,469, filed Oct. 8, 2018, 5 pages.
Final Office Action dated Feb. 21, 2018, issued in connection with U.S. Appl. No. 15/297,627, filed Oct. 19, 2016, 12 pages.
Final Office Action dated May 21, 2020, issued in connection with U.S. Appl. No. 15/989,715, filed May 25, 2018, 21 pages.
Final Office Action dated Feb. 22, 2021, issued in connection with U.S. Appl. No. 15/936,177, filed Mar. 26, 2018, 20 pages.
Final Office Action dated Feb. 22, 2021, issued in connection with U.S. Appl. No. 16/213,570, filed Dec. 7, 2018, 12 pages.
Final Office Action dated Jun. 22, 2020, issued in connection with U.S. Appl. No. 16/179,779, filed Nov. 2, 2018, 16 pages.
Final Office Action dated Mar. 23, 2020, issued in connection with U.S. Appl. No. 16/145,275, filed Sep. 28, 2018, 11 pages.
Final Office Action dated Feb. 24, 2020, issued in connection with U.S. Appl. No. 15/936,177, filed Mar. 26, 2018, 20 pages.
Final Office Action dated Apr. 26, 2019, issued in connection with U.S. Appl. No. 15/721,141, filed Sep. 29, 2017, 20 pages.

(56) References Cited

OTHER PUBLICATIONS

Final Office Action dated Nov. 29, 2021, issued in connection with U.S. Appl. No. 17/236,559, filed Apr. 21, 2021, 11 pages.
Final Office Action dated Apr. 30, 2019, issued in connection with U.S. Appl. No. 15/098,760, filed Apr. 14, 2016, 6 pages.
Final Office Action dated Jun. 4, 2021, issued in connection with U.S. Appl. No. 16/168,389, filed Oct. 23, 2018, 38 pages.
Final Office Action dated Oct. 4, 2021, issued in connection with U.S. Appl. No. 16/806,747, filed Mar. 2, 2020, 17 pages.
Final Office Action dated Feb. 5, 2019, issued in connection with U.S. Appl. No. 15/438,749, filed Feb. 21, 2017, 17 pages.
Final Office Action dated Feb. 7, 2020, issued in connection with U.S. Appl. No. 15/948,541, filed Apr. 9, 2018, 8 pages.
Final Office Action dated Jun. 8, 2021, issued in connection with U.S. Appl. No. 16/271,550, filed Feb. 8, 2019, 41 pages.
Final Office Action dated Sep. 8, 2020, issued in connection with U.S. Appl. No. 16/213,570, filed Dec. 7, 2018, 12 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
First Action Interview Office Action dated Mar. 8, 2021, issued in connection with U.S. Appl. No. 16/798,967, filed Feb. 24, 2020, 4 pages.
First Action Interview Office Action dated Aug. 14, 2019, issued in connection with U.S. Appl. No. 16/227,308, filed Dec. 20, 2018, 4 pages.
First Action Interview Office Action dated Jun. 15, 2020, issued in connection with U.S. Appl. No. 16/213,570, filed Dec. 7, 2018, 4 pages.
First Action Interview Office Action dated Jun. 2, 2020, issued in connection with U.S. Appl. No. 16/109,375, filed Aug. 22, 2018, 10 pages.
First Action Interview Office Action dated Jan. 22, 2020, issued in connection with U.S. Appl. No. 15/989,715, filed May 25, 2018, 3 pages.
First Action Interview Office Action dated Jul. 5, 2019, issued in connection with U.S. Appl. No. 16/227,308, filed Dec. 20, 2018, 4 pages.
Freiberger, Kari, "Development and Evaluation of Source Localization Algorithms for Coincident Microphone Arrays," Diploma Thesis, Apr. 1, 2010, 106 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.
Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
Han et al. "Deep Compression: Compressing Deep Neural Networks with Pruning, Trained Quantization and Huffman Coding." ICLR 2016, Feb. 15, 2016, 14 pages.
Hans Speidel: "Chatbot Training: How to use training data to provide fully automated customer support", Jun. 29, 2017, pp. 1-3, XP055473185, Retrieved from the Internet: URL:https://www.crowdguru.de/wp-content/uploads/Case-Study-Chatbot-training-How-to-use-training-data-to-provide-fully-automated-customer-support.pdf [retrieved on May 7, 2018].
Helwani et al "Source-domain adaptive filtering for MIMO systems with application to acoustic echo cancellation", Acoustics Speech and Signal Processing, 2010 IEEE International Conference, Mar. 14, 2010, 4 pages.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
Indian Patent Office, Examination Report dated May 24, 2021, issued in connection with Indian Patent Application No. 201847035595, 6 pages.
Indian Patent Office, Examination Report dated Feb. 25, 2021, issued in connection with Indian Patent Application No. 201847035625, 6 pages.
International Bureau, International Preliminary Report on Patentability and Written Opinion, dated Apr. 1, 2021, issued in connection with International Application No. PCT/US2019/052129, filed on Sep. 20, 2019, 13 pages.
International Bureau, International Preliminary Report on Patentability and Written Opinion, dated Jul. 1, 2021, issued in connection with International Application No. PCT/US2019/067576, filed on Dec. 19, 2019, 8 pages.
International Bureau, International Preliminary Report on Patentability and Written Opinion, dated Aug. 10, 2021, issued in connection with International Application No. PCT/US2020/017150, filed on Feb. 7, 2020, 20 pages.
International Bureau, International Preliminary Report on Patentability and Written Opinion, dated Dec. 10, 2020, issued in connection with International Application No. PCT/US2019/033945, filed on May 25, 2018, 7 pages.
International Bureau, International Preliminary Report on Patentability and Written Opinion, dated Mar. 10, 2020, issued in connection with International Application No. PCT/US2018/050050, filed on Sep. 7, 2018, 7 pages.
International Bureau, International Preliminary Report on Patentability and Written Opinion, dated Apr. 15, 2021, issued in connection with International Application No. PCT/US2019/054332, filed on Oct. 2, 2019, 9 pages.
International Bureau, International Preliminary Report on Patentability and Written Opinion, dated Jan. 15, 2019, issued in connection with International Application No. PCT/US2017/042170, filed on Jul. 14, 2017, 7 pages.
International Bureau, International Preliminary Report on Patentability and Written Opinion, dated Jan. 15, 2019, issued in connection with International Application No. PCT/US2017/042227, filed on Jul. 14, 2017, 7 pages.
International Bureau, International Preliminary Report on Patentability and Written Opinion, dated Mar. 25, 2021, issued in connection with International Application No. PCT/US2019/050852, filed on Sep. 12, 2019, 8 pages.
International Bureau, International Preliminary Report on Patentability and Written Opinion, dated Aug. 27, 2019, issued in connection with International Application No. PCT/US2018/019010, filed on Feb. 21, 2018, 9 pages.
International Bureau, International Preliminary Report on Patentability and Written Opinion, dated Mar. 31, 2020, issued in connection with International Application No. PCT/US2018/053517, filed on Sep. 28, 2018, 10 pages.
International Bureau, International Preliminary Report on Patentability and Written Opinion, dated Feb. 5, 2019, issued in connection with International Application No. PCT/US2017/045521, filed on Aug. 4, 2017, 7 pages.
International Bureau, International Preliminary Report on Patentability and Written Opinion, dated Feb. 5, 2019, issued in connection with International Application No. PCT/US2017/045551, filed on Aug. 4, 2017, 9 pages.
International Bureau, International Preliminary Report on Patentability and Written Opinion, dated Jan. 7, 2021, issued in connection with International Application No. PCT/US2019/039828, filed on Jun. 28, 2019, 11 pages.
International Bureau, International Preliminary Report on Patentability and Written Opinion, dated Apr. 8, 2021, issued in connection with International Application No. PCT/US2019/052654, filed on Sep. 24, 2019, 7 pages.
International Bureau, International Preliminary Report on Patentability and Written Opinion, dated Apr. 8, 2021, issued in connection with International Application No. PCT/US2019/052841, filed on Sep. 25, 2019, 8 pages.
International Bureau, International Preliminary Report on Patentability and Written Opinion, dated Apr. 8, 2021, issued in connection with International Application No. PCT/US2019/053253, filed on Sep. 26, 2019, 10 pages.

(56) References Cited

OTHER PUBLICATIONS

International Bureau, International Preliminary Report on Patentability, dated Apr. 11, 2019, issued in connection with International Application No. PCT/US2017/0054063, filed on Sep. 28, 2017, 9 pages.

* cited by examiner

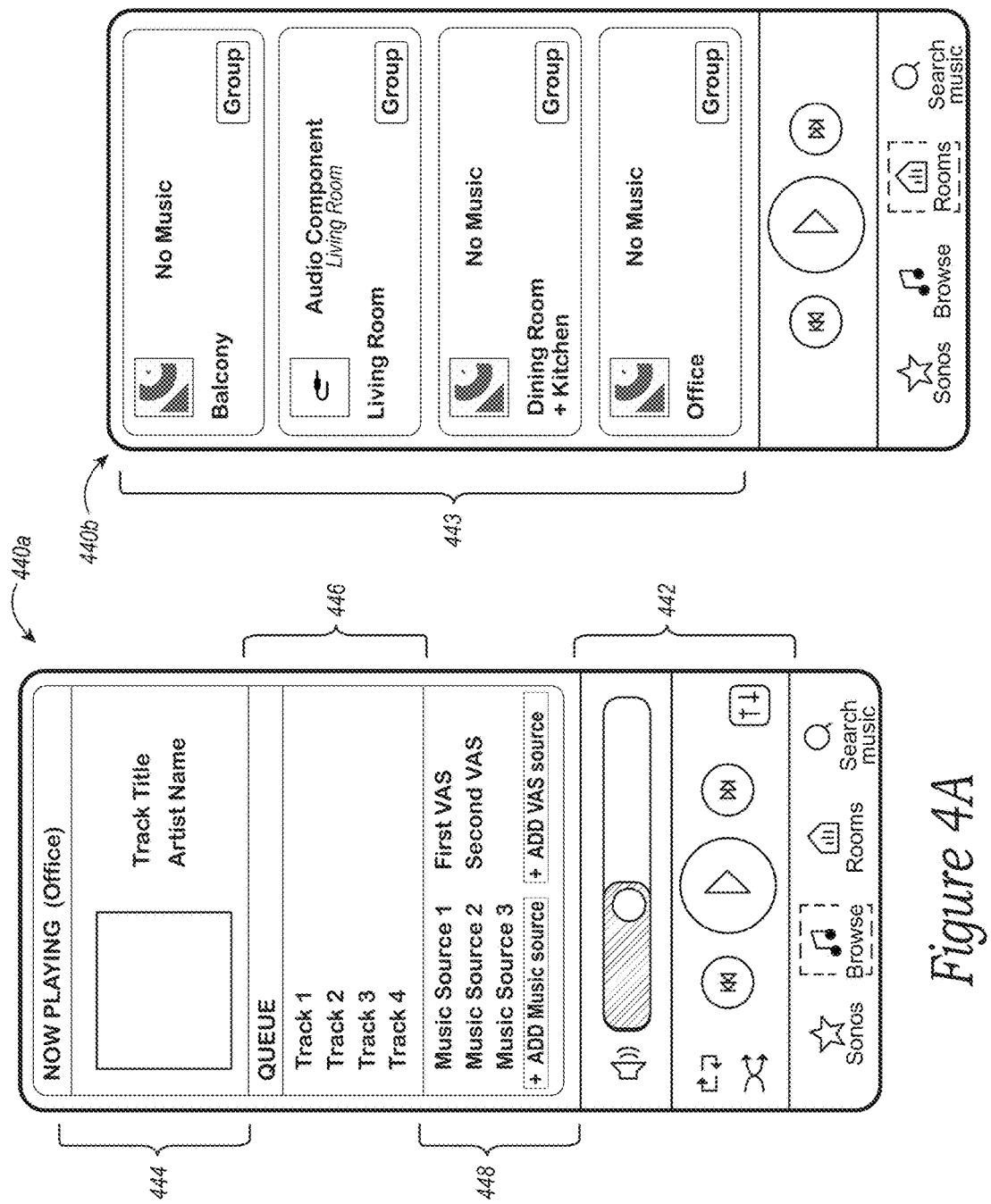

SYSTEMS AND METHODS FOR ASSOCIATING PLAYBACK DEVICES WITH VOICE ASSISTANT SERVICES

CROSS-REFERENCE TO RELATED APPLICATION

The present application is a continuation of U.S. patent application Ser. No. 16/876,493, filed May 18, 2020, which is a continuation of U.S. patent application Ser. No. 16/022,662, filed Jun. 28, 2018, now U.S. Pat. No. 10,681,460, the disclosures of which are incorporated herein by reference in their entireties.

TECHNICAL FIELD

The present technology relates to consumer goods and, more particularly, to methods, systems, products, features, services, and other elements directed to associating playback devices with voice assistant services or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 4A and 4B are controller interfaces in accordance with aspects of the disclosure;

Figure 1A:
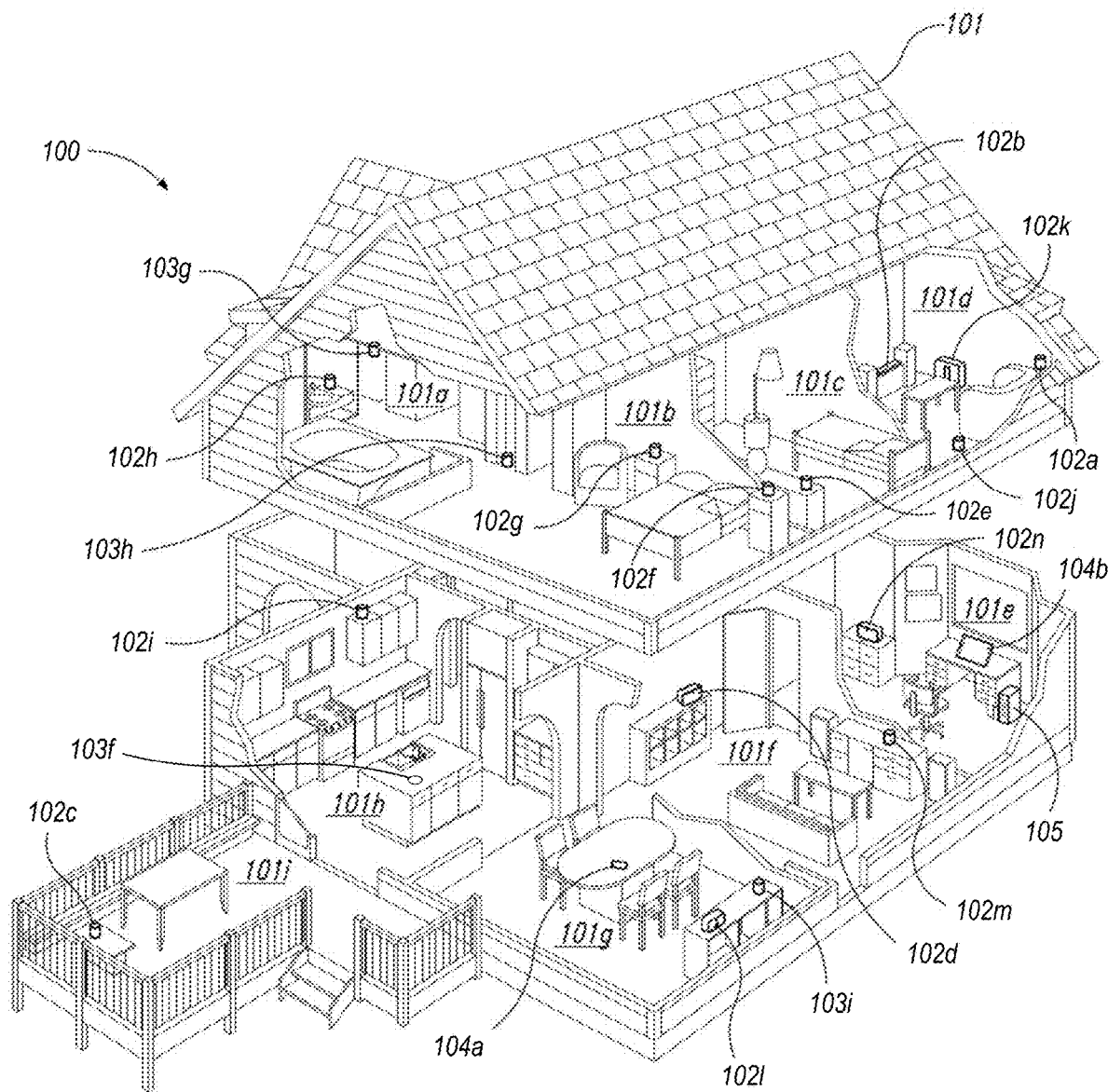
FIG. 1A is a partial cutaway view of an environment having a media playback system configured in accordance with aspects of the disclosed technology.

The drawings are for purposes of illustrating example embodiments, but it is understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Voice control can be beneficial for a "smart" home having smart appliances and related devices, such as wireless illumination devices, home-automation devices (e.g., thermostats, door locks, etc.), and audio playback devices. In some implementations, networked microphone devices may be used to control smart home devices. A network microphone device will typically include a microphone for receiving voice inputs. The network microphone device can forward voice inputs to a voice assistant service (VAS), such as AMAZON's ALEXA®, APPLE's SIRI®, MICROSOFT's CORTANA®, GOOGLE's Assistant, etc. A VAS may be a remote service implemented by cloud servers to process voice inputs. A VAS may process a voice input to determine an intent of the voice input. Based on the response, the network microphone device may cause one or more smart devices to perform an action. For example, the network microphone device may instruct an illumination device to turn on/off based on the response to the instruction from the VAS.

A voice input detected by a network microphone device will typically include a wake word followed by an utterance containing a user request. The wake word is typically a predetermined word or phrase used to "wake up" and invoke the VAS for interpreting the intent of the voice input. For instance, in querying AMAZON's ALEXA®, a user might speak the wake word "Alexa." Other examples include "Ok, Google" for invoking GOOGLE's Assistant, and "Hey, Siri" for invoking APPLE's SIRI®, or "Hey, Sonos" for a VAS offered by SONOS®. In various embodiments, a wake word may also be referred to as, e.g., an activation-, trigger-, wakeup-word or phrase, and may take the form of any suitable word; combination of words, such as phrases; and/or audio cues indicating that the network microphone device and/or an associated VAS is to invoke an action.

A network microphone device listens for a user request or command accompanying a wake word in the voice input. In some instances, the user request may include a command to control a third-party device, such as a thermostat (e.g., NEST® thermostat), an illumination device (e.g., a PHILIPS HUE® lighting device), or a media playback device (e.g., a SONOS® playback device). For example, a user might speak the wake word "Alexa" followed by the utterance "set the thermostat to 68 degrees" to set the temperature in a home using AMAZON's ALEXA® VAS. A user might speak the same wake word followed by the utterance "turn on the living room" to turn on illumination devices in a living room area of the home. The user may similarly speak a wake word followed by a request to play a particular song, an album, or a playlist of music on a playback device in the home.

A VAS may employ natural language understanding (NLU) systems to process voice inputs. NLU systems typically require multiple remote servers that are programmed to detect the underlying intent of a given voice input. For example, the servers may maintain a lexicon of language; parsers; grammar and semantic rules; and associated processing algorithms to determine the user's intent.

It can be difficult to manage the association between various playback devices with one or more corresponding VASes. For example, although a user may wish to utilize multiple VASes within her home, it may not be possible or preferable to associate a single playback device with more than one VAS. This may be due to the constraints of processing power and memory required to perform multiple wake word detection algorithms on a single device, or it may be due to restrictions imposed by one or more VASes. As a result, for any particular playback device, a user may be required to select only a single VAS to the exclusion of any other VASes.

In some embodiments, a playback device may be purchased with a pre-associated VAS. In such instances, a user may wish to replace the pre-associated VAS with a different VAS of the user's choosing. For example, if a user purchases a playback device that is associated with AMAZON's ALEXA® VAS, the user may wish to instead associate the playback device with GOOGLE's Assistant VAS, and to deactivate AMAZON's ALEXA® on that playback device. Additionally, some voice-enabled playback devices may be sold without any pre-associated VAS, in which cases a user may wish to manage the selection and association of a particular VAS with the playback device.

The systems and methods detailed herein address the above-mentioned challenges of managing associations between one or more playback devices and one or more VASes. In particular, systems and methods are provided for allowing a user to select a VAS from among multiple VASes to associate with one or more playback devices of a media playback system.

As described in more detail below, in some instances two or more playback devices that are individually associated with different VASes can be bonded together to form a bonded zone. For example, first and second playback devices can be bonded to form a stereo pair. In this instance, the bonded pair of devices can present to the media playback system as a single user interface (UI) entity. When displayed to a user via a user interface (e.g., a UI displayed on a screen of a controller device), the bonded pair can be displayed as a single "device" for control. The individual playback devices of the bonded zone can be associated with different VASes. For example, the first playback device can be associated with AMAZON's ALEXA® while the second playback device of the bonded zone is associated with GOOGLE's Assistant. As a result, a single "device" or UI entity presented to the media playback system can be effectively associated with two different VASes. This allows a user to interact with a single UI entity (i.e., the bonded zone, which appears as a single device via the media playback system) which can in turn interact with two different VASes. For example, a user can use a first wake word such as "Alexa" to interact via voice input with AMAZON's ALEXA®, and alternately use a second wake word such as "OK, Google" to interact via voice input with GOOLGE's Assistant. Accordingly, even if individual playback devices cannot be associated with multiple VASes, a user may have access to multiple VASes through a single UI entity via the bonded zone. This advantageously allows a user to realize the benefits of multiple VASes, each of which may excel in different aspects, rather than requiring a user to limit her interactions to a single VAS to the exclusion of any others.

In some embodiments, a bonded zone can include three or more voice assistants. For example, in a home theatre context in which five devices are bonded into a single zone, a left channel playback device can be associated with AMAZON'S ALEXA, the right channel device can be associated with MICROSOFT'S CORTANA, and the middle channel playback device can be associated with GOOGLE'S Assistant. In another example, the left and right channel devices may be associated with a first VAS (e.g., AMAZON'S ALEXA), while the middle channel is associated with a second VAS (e.g., GOOGLE'S Assistant).

While some embodiments described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

Figure 1B:
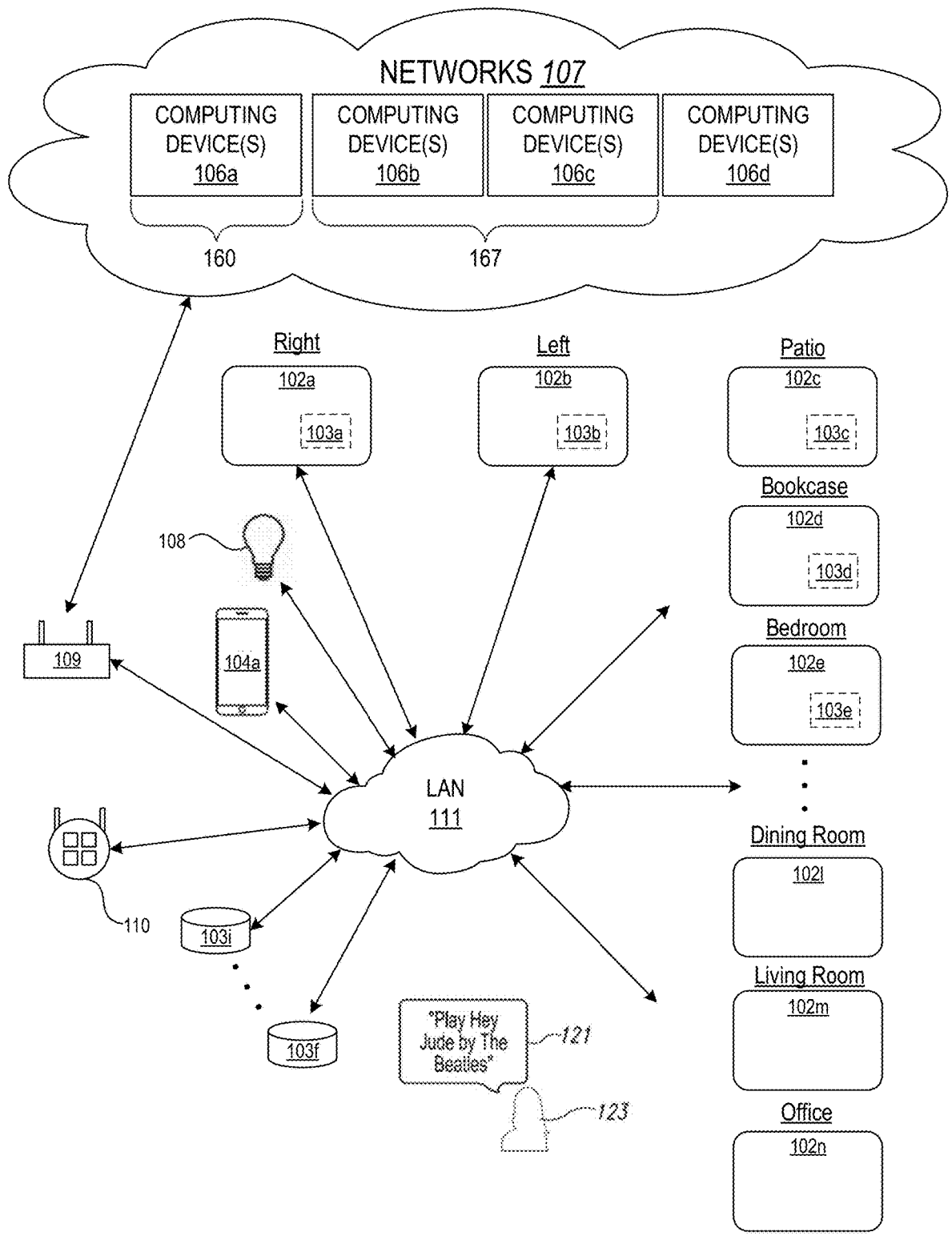
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment" or "environment 101". The environment 101 comprises a household having several rooms, spaces, and/or playback zones, including a master bathroom 101*a*, a master bedroom 101*b* (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102n), network microphone devices 103 (identified individually as "NMD(s)" 103a-103i), and controller devices 104a and 104b (collectively "controller devices 104"). The home environment may include additional and/or other computing devices, including local network devices, such as one or more smart illumination devices 108 (FIG. 1B), and a smart thermostat 110, and a local computing device 105 (FIG. 1A).

Referring to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102j (which may be designated as "Left") in the Den 101d (FIG. 1A) may have a point-to-point connection with the playback device 102a in the Den 101d (which may be designated as "Right"). In one embodiment, the Left playback device 102j may communicate over the point-to-point connection with the Right playback device 102a. In a related embodiment, the Left playback device 102j may communicate with other network devices via the point-to-point connection and/or other connections via the LAN 111.

As further shown in FIG. 1B, in some embodiments the MPS 100 is coupled to one or more remote computing devices 106, which may comprise different groups of remote computing devices 106a-106c associated with various services, including voice assistant services ("VAS(es)"), media content services ("MCS(es)"), and/or services for supporting operations of the MPS 100 via a wide area network (WAN) 107. In some embodiments, the remote computing device(s) may be cloud servers. The remote computing device(s) 106 may be configured to interact with computing devices in the environment 101 in various ways. For example, the remote computing device(s) 106 may be configured to facilitate streaming and controlling playback of media content, such as audio, in the home environment. In one aspect of the technology described in greater detail below, the various playback devices, network microphone devices, and/or controller devices 102-104 are coupled to at least one remote computing device associated with a VAS, and at least one remote computing device associated with a media content service. Also, as described in greater detail below, in some embodiments the various playback devices, network microphone devices, and/or controller devices 102-104 may be coupled to several remote computing devices, each associated with a different VAS and/or to a plurality of remote computing devices associated with multiple different media content services.

In some embodiments, one or more of the playback devices 102 may include an on-board (e.g., integrated) network microphone device. For example, the playback devices 102a-e include corresponding NMDs 103a-e, respectively. Playback devices that include network microphone devices may be referred to herein interchangeably as a playback device or a network microphone device unless indicated otherwise in the description.

In some embodiments, one or more of the NMDs 103 may be a stand-alone device. For example, the NMDs 103f and 103g may be stand-alone network microphone devices. A stand-alone network microphone device may omit components typically included in a playback device, such as a speaker or related electronics. In such cases, a stand-alone network microphone device may not produce audio output or may produce limited audio output (e.g., relatively low-quality audio output).

In use, a network microphone device may receive and process voice inputs from a user in its vicinity. For example, a network microphone device may capture a voice input upon detection of the user speaking the input. In the illustrated example, the NMD 103d of the playback device 102d in the Living Room may capture the voice input of a user in its vicinity. In some instances, other network microphone devices (e.g., the NMDs 103f and 103i) in the vicinity of the voice input source (e.g., the user) may also detect the voice input. In such instances, network microphone devices may arbitrate between one another to determine which device(s) should capture and/or process the detected voice input. Examples for selecting and arbitrating between network microphone devices may be found, for example, in U.S. application Ser. No. 15/438,749 filed Feb. 21, 2017, and titled "Voice Control of a Media Playback System," which is incorporated herein by reference in its entirety.

In certain embodiments, a network microphone device may be assigned to a playback device that may not include a network microphone device. For example, the NMD 103f may be assigned to the playback devices 102i and/or 102l in its vicinity. In a related example, a network microphone device may output audio through a playback device to which it is assigned. Additional details regarding associating network microphone devices and playback devices as designated or default devices may be found, for example, in previously referenced U.S. patent application Ser. No. 15/438,749.

In use, the network microphone devices 103 are configured to interact with a voice assistant service VAS, such as a first VAS 160 hosted by one or more of the remote computing devices 106a. For example, as shown in FIG. 1B, the NMD 103f is configured to receive voice input 121 from a user 123. The NMD 103f transmits data associated with the received voice input 121 to the remote computing devices 106a of the first VAS 160, which are configured to (i) process the received voice input data and (ii) transmit a corresponding command to the MPS 100. In some aspects, for example, the remote computing devices 106a comprise one or more modules and/or servers of a VAS (e.g., a VAS operated by one or more of SONOS®, AMAZON®, GOOGLE®, APPLE®, or MICROSOFT®). The remote computing devices 106a can receive the voice input data from the NMD 103f, for example, via the LAN 111 and the router 109. In response to receiving the voice input data, the remote computing devices 106a process the voice input data (i.e., "Play Hey Jude by The Beatles"), and may determine that the processed voice input includes a command to play a song (e.g., "Hey Jude"). In response, one of the computing devices 106a of the first VAS 160 transmits a command to one or more remote computing devices (e.g., remote computing devices 106d) associated with the MPS 100. In this example, the first VAS 160 may transmit a command to the MPS 100 to play back "Hey Jude" by the Beatles. As described below, the MPS 100, in turn, can query a plurality of suitable media content services ("MCS(es)") 167 for media content, such as by sending a request to a first MCS hosted by first one or more remote computing devices 106*b* and a second MCS hosted by second one or more remote computing devices 106*c*. In some aspects, for example, the remote computing devices 106*b* and 106*c* comprise one or more modules and/or servers of a corresponding MCS (e.g., an MCS operated by one or more of SPOTIFY®, PANDORA®, AMAZON MUSIC®, etc.).

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment as shown in FIG. 1A. For instance, the technologies described herein may be useful in other home environment configurations comprising more or fewer of any of the playback, network microphone, and/or controller devices 102-104. For example, the technologies herein may be utilized within an environment containing a single playback device 102 and/or a single network microphone device 103. In such cases, the LAN 111 may be eliminated and the single playback device 102 and/or the single network microphone device 103 may communicate directly with the remote computing devices 106*a-d*. In some embodiments, a telecommunication network (e.g., an LTE network, a 5G network) may communicate with the various playback, network microphone, and/or controller devices 102-104 independent of a LAN.

a. Example Playback and Network Microphone Devices

Figure 2A:
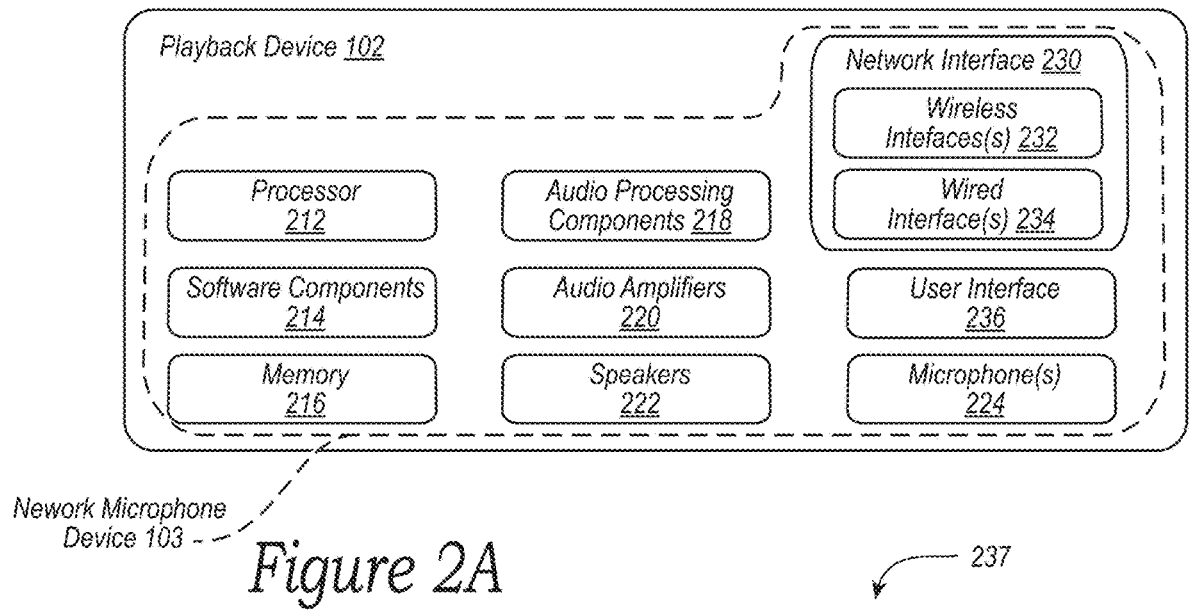
FIG. 2A is a functional block diagram of an example playback device.

FIG. 2A is a functional block diagram illustrating certain aspects of a selected one of the playback devices 102 shown in FIG. 1A. As shown, such a playback device may include a processor 212, software components 214, memory 216, audio processing components 218, audio amplifier(s) 220, speaker(s) 222, and a network interface 230 including wireless interface(s) 232 and wired interface(s) 234. In some embodiments, a playback device may not include the speaker(s) 222, but rather a speaker interface for connecting the playback device to external speakers. In certain embodiments, the playback device may include neither the speaker(s) 222 nor the audio amplifier(s) 222, but rather an audio interface for connecting a playback device to an external audio amplifier or audio-visual receiver.

A playback device may further include a user interface 236. The user interface 236 may facilitate user interactions independent of or in conjunction with one or more of the controller devices 104. In various embodiments, the user interface 236 includes one or more of physical buttons and/or graphical interfaces provided on touch sensitive screen(s) and/or surface(s), among other possibilities, for a user to directly provide input. The user interface 236 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2A includes both wireless interface(s) 232 and wired interface(s) 234, the network interface 230 may in some embodiments include only wireless interface(s) or only wired interface(s).

Figure 2B:
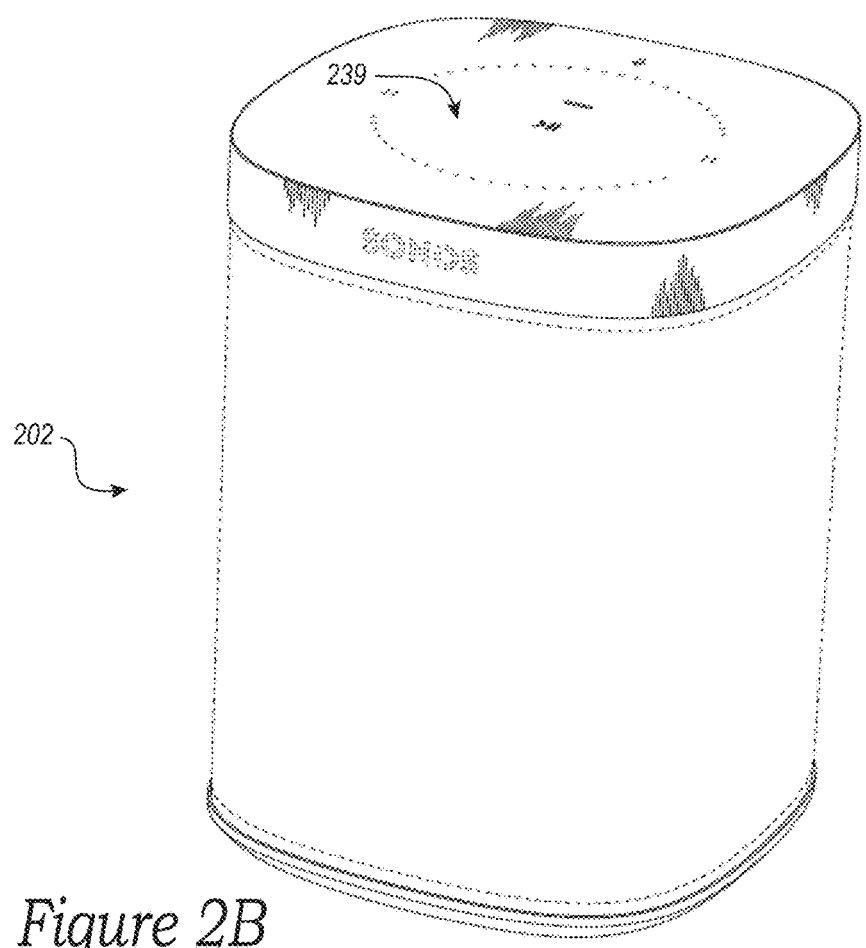
FIG. 2B is an isometric diagram of an example playback device that includes a network microphone device.

As discussed above, a playback device may include a network microphone device, such as one of the NMDs 103 shown in FIG. 1A. A network microphone device may share some or all the components of a playback device, such as the processor 212, the memory 216, the microphone(s) 224, etc. In other examples, a network microphone device includes components that are dedicated exclusively to operational aspects of the network microphone device. For example, a network microphone device may include far-field microphones and/or voice processing components, which in some instances a playback device may not include. In another example, a network microphone device may include a touch-sensitive button for enabling/disabling a microphone. In yet another example, a network microphone device can be a stand-alone device, as discussed above. FIG. 2B is an isometric diagram showing an example playback device 202 incorporating a network microphone device. The playback device 202 has a control area 237 at the top of the device for enabling/disabling microphone(s). The control area 237 is adjacent another area 239 at the top of the device for controlling playback.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2A or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3A:
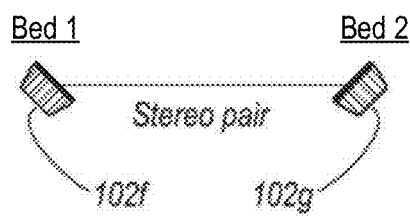
FIGS. 3A-3D are diagrams showing example zones and zone groups in accordance with aspects of the disclosure.
Figure 3B:
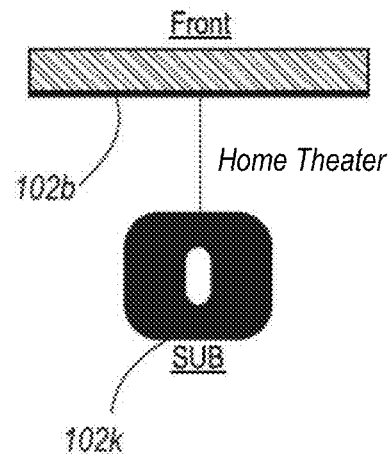
Figure 3C:
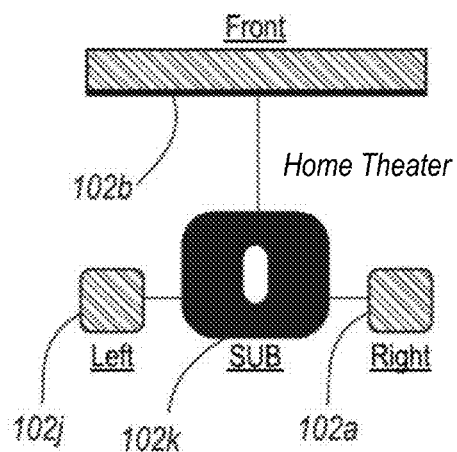
Figure 3D:
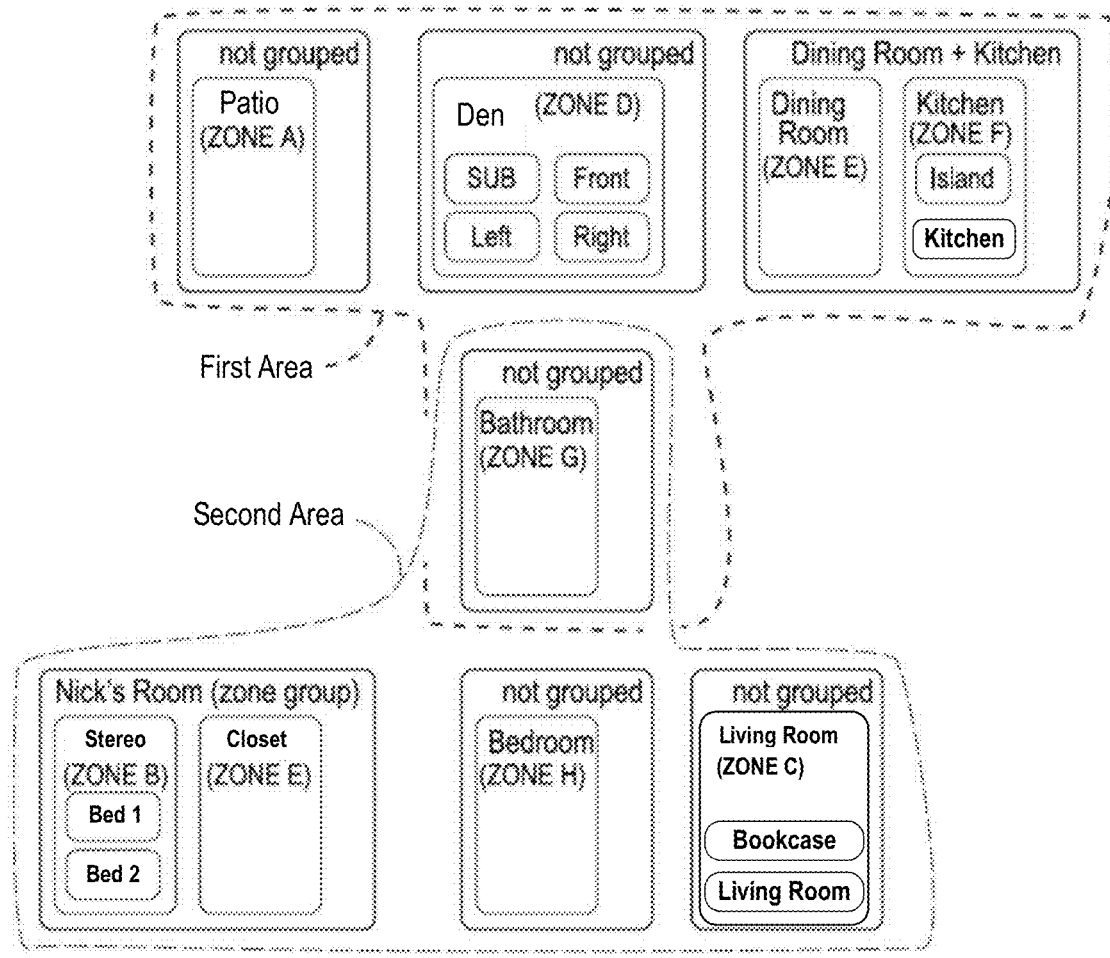

FIGS. 3A-3D show example configurations of playback devices in zones and zone groups. Referring first to FIG. 3D, in one example, a single playback device may belong to a zone. For example, the playback device 102c on the Patio may belong to Zone A. In some implementations described below, multiple playback devices may be "bonded" to form a "bonded pair" which together form a single zone. For example, the playback device 102f (FIG. 1A) named Bed1 in FIG. 3D may be bonded to the playback device 102g (FIG. 1A) named Bed2 in FIG. 3D to form Zone B. Bonded playback devices may have different playback responsibilities (e.g., channel responsibilities).

Each zone in the MPS 100 may be provided for control as a single user interface (UI) entity. For example, Zone A may be provided as a single entity named Patio. Zone C may be provided as a single entity named Living Room. Zone B may be provided as a single entity named Stereo.

In various embodiments, a zone may take on the name of one of the playback device(s) belonging to the zone. For example, Zone C may take on the name of the Living Room device 102m (as shown). In another example, Zone C may take on the name of the Bookcase device 102d. In a further example, Zone C may take on a name that is some combination of the Bookcase device 102d and Living Room device 102m. The name that is chosen may be selected by user. In some embodiments, a zone may be given a name that is different than the device(s) belonging to the zone. For example, Zone B is named Stereo but none of the devices in Zone B have this name.

Playback devices that are bonded may have different playback responsibilities, such as responsibilities for certain audio channels. For example, as shown in FIG. 3A, the Bed1 and Bed2 devices 102f and 102g may be bonded so as to produce or enhance a stereo effect of audio content. In this example, the Bed1 playback device 102f may be configured to play a left channel audio component, while the Bed2 playback device 102g may be configured to play a right channel audio component. In some implementations, such stereo bonding may be referred to as "pairing."

Additionally, bonded playback devices may have additional and/or different respective speaker drivers. As shown in FIG. 3B, the playback device 102b named Front may be bonded with the playback device 102k named SUB. The Front device 102b may render a range of mid to high frequencies and the SUB device 102k may render low frequencies as, e.g., a subwoofer. When unbonded, the Front device 102b may render a full range of frequencies. As another example, FIG. 3C shows the Front and SUB devices 102b and 102k further bonded with Right and Left playback devices 102a and 102k, respectively. In some implementations, the Right and Left devices 102a and 102k may form surround or "satellite" channels of a home theater system. The bonded playback devices 102a, 102b, 102j, and 102k may form a single Zone D (FIG. 3D).

Figure 3F:
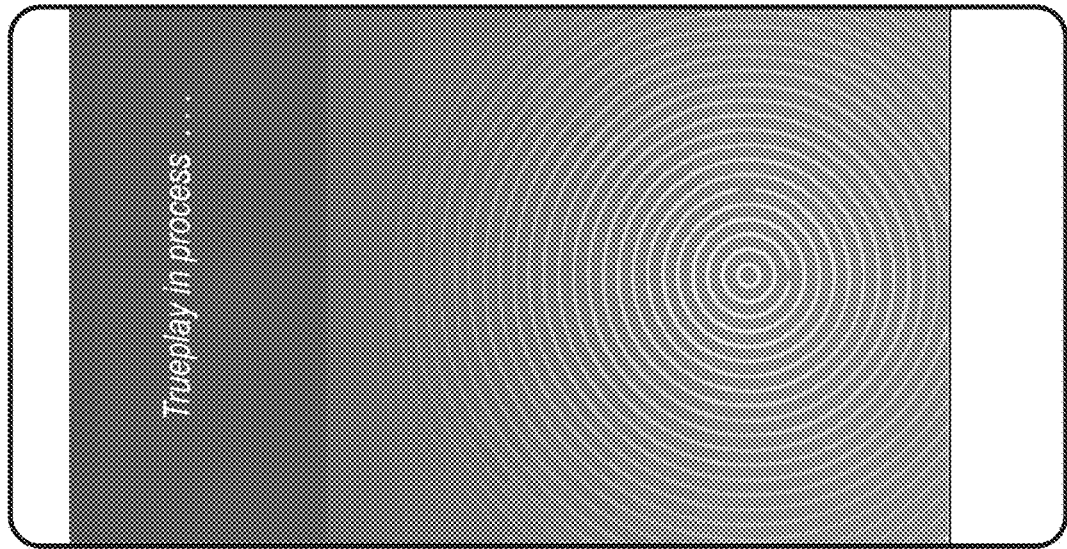
FIGS. 3E and 3F are diagrams showing example voice inputs for calibrating a bonded stereo pair of playback devices in accordance with aspects of the disclosure.
Figure 3E:
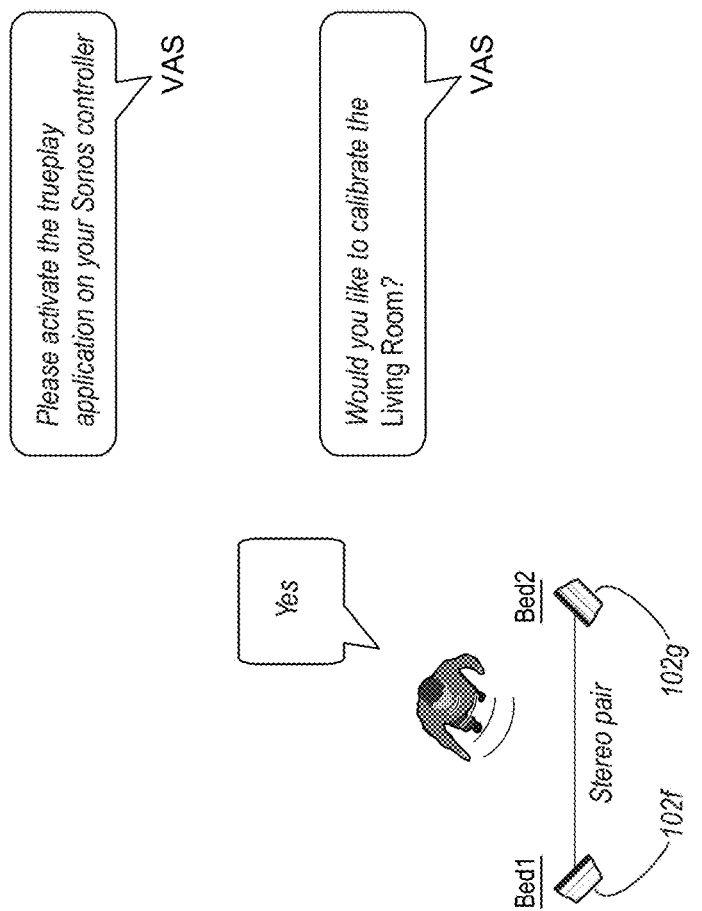

In some embodiments, playback devices in a bonded zone can be calibrated together and concurrently, rather than separately. For example, calibration software, such as SONOS's TRUEPLAY® can be used to calibrate a bonded zone together as a single entity. This is in contrast to playback devices that are merely grouped together, which may be calibrated either before or after formation of the group. In related embodiments, bonding playback devices can cause the MPS 100 and/or the VAS 160 to initiate multi-turn or other commands for calibrating playback devices, as shown in FIGS. 3E and 3F. In one example, after the Bed1 and Bed 2 playback devices 102f and 102g have been bonded to form a stereo pair, the MPS 100 or the VAS 160 may initiate calibration. For example, the VAS 160 may ready 3F software, such as SONOS' TRUEPLAY® software for calibration, as shown in FIG. 3F.

In some embodiments, a stand-alone network microphone device may be in a zone by itself. For example, the NMD 103h in FIG. 1A is named Closet and forms Zone E. A network microphone device may also be bonded or merged with another device so as to form a zone. For example, the NMD device 103f named Island may be bonded with the playback device 102i Kitchen, which together form Zone G, which is also named Kitchen. Additional details regarding associating network microphone devices and playback devices as designated or default devices may be found, for example, in previously referenced U.S. patent application Ser. No. 15/438,749. In some embodiments, a stand-alone network microphone device may not be associated with a zone.

Zones of individual, bonded, and/or merged devices may be grouped to form a zone group. For example, referring to FIG. 3D, Zone A may be grouped with Zone B to form a zone group that includes the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group, such as Dining Room+Kitchen, as shown in FIG. 3D. In some embodiments, a zone group may be given a unique name selected by a user, such as Nick's Room, as also shown in FIG. 3D.

Referring again to FIG. 2A, certain data may be stored in the memory 216 as one or more state variables that are periodically updated and used to describe the state of a playback zone, the playback device(s), and/or a zone group associated therewith. The memory 216 may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3. An area may involve a cluster of zone groups and/or zones not within a zone group. For instance, FIG. 3D shows a first area named First Area and a second area named Second Area. The First Area includes zones and zone groups of the Patio, Den, Dining Room, Kitchen, and Bathroom. The Second Area includes zones and zone groups of the Bathroom, Nick's Room, the Bedroom, and the Living Room. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 216 may be further configured to store other data. Such data may pertain to audio sources accessible by a playback device or a playback queue that the playback device (or some other playback device(s)) may be associated with. In embodiments described below, the memory 216 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the use may pair or group the moved playback device 102c with the Office zone and/or rename the players in the Office zone using, e.g., one of the controller devices 104 and/or voice input. As another example, if one or more playback devices 102 are moved to a particular area in the home environment that is not already a playback zone, the moved playback device(s) may be renamed or associated with a playback zone for the particular area.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices 102 in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may implement either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

Figure 4:
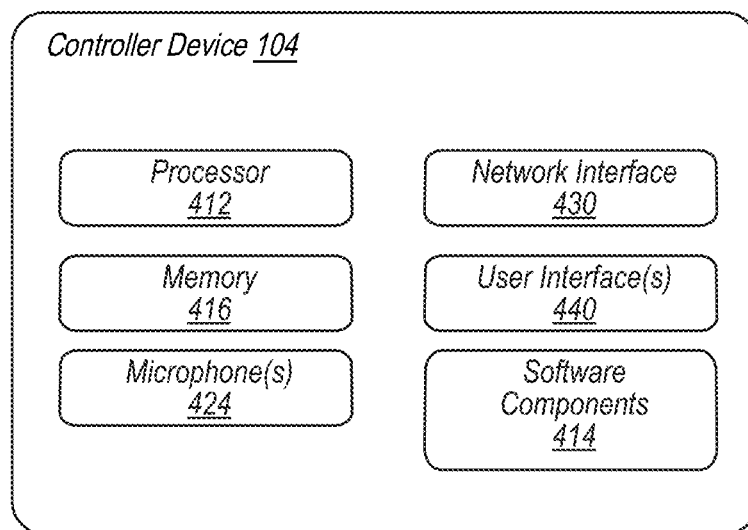
FIG. 4 is a functional block diagram of an example controller device in accordance with aspects of the disclosure.

FIG. 4 is a functional block diagram illustrating certain aspects of a selected one of the controller devices 104 of the MPS 100 of FIG. 1A. Such controller devices may also be referred to as a controller. The controller device shown in FIG. 4 may include components that are generally similar to certain components of the network devices described above, such as a processor 412, memory 416, microphone(s) 424, and a network interface 430. In one example, a controller device may be a dedicated controller for the MPS 100. In another example, a controller device may be a network device on which media playback system controller application software may be installed, such as for example, an iPhone™, iPad™ or any other smart phone, tablet or network device (e.g., a networked computer such as a PC or Mac™).

The memory 416 of a controller device may be configured to store controller application software and other data associated with the MPS 100 and a user of the system 100. The memory 416 may be loaded with one or more software components 414 executable by the processor 412 to achieve certain functions, such as facilitating user access, control, and configuration of the MPS 100. A controller device communicates with other network devices over the network interface 430, such as a wireless interface, as described above.

In one example, data and information (e.g., such as a state variable) may be communicated between a controller device and other devices via the network interface 430. For instance, playback zone and zone group configurations in the MPS 100 may be received by a controller device from a playback device, a network microphone device, or another network device, or transmitted by the controller device to another playback device or network device via the network interface 406. In some cases, the other network device may be another controller device.

Playback device control commands such as volume control and audio playback control may also be communicated from a controller device to a playback device via the network interface 430. As suggested above, changes to configurations of the MPS 100 may also be performed by a user using the controller device. The configuration changes may include adding/removing one or more playback devices to/from a zone, adding/removing one or more zones to/from a zone group, forming a bonded or merged player, separating one or more playback devices from a bonded or merged player, among others.

The user interface(s) 440 of a controller device may be configured to facilitate user access and control of the MPS 100, by providing controller interface(s) such as the controller interfaces 440a and 440b shown in FIGS. 4A and 4B, respectively, which may be referred to collectively as the controller interface 440. Referring to FIGS. 4A and 4B together, the controller interface 440 includes a playback control region 442, a playback zone region 443, a playback status region 444, a playback queue region 446, and a sources region 448. The user interface 400 as shown is just one example of a user interface that may be provided on a network device such as the controller device shown in FIG. 4 and accessed by users to control a media playback system such as the MPS 100. Other user interfaces of varying formats, styles, and interactive sequences may alternatively be implemented on one or more network devices to provide comparable control access to a media playback system.

The playback control region 442 (FIG. 4A) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4B) may include representations of playback zones within the MPS 100. The playback zones regions may also include representation of zone groups, such as the Dining Room+Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 443 (FIG. 4B) may be dynamically updated as playback zone or zone group configurations are modified.

The playback status region 444 (FIG. 4A) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 440.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL)

or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4A and 4B, the graphical representations of audio content in the playback queue region 446 (FIG. 4B) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and selectable voice assistants associated with a corresponding VAS. As described in more detail below with respect to FIGS. 8-11, the VAS(es) may be selectively assigned. In some examples, multiple VAS(es), such as AMAZON's Alexa®, MICROSOFT's Cortana®, etc., may be invokable by the same network microphone device. In some embodiments, a user may assign a VAS exclusively to one or more network microphone devices. For example, a user may assign a first VAS to one or both of the NMDs 102a and 102b in the Living Room shown in FIG. 1, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (such as a controller device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the MPS 100 of FIG. 1A. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Network Microphone Devices

Figure 5A:
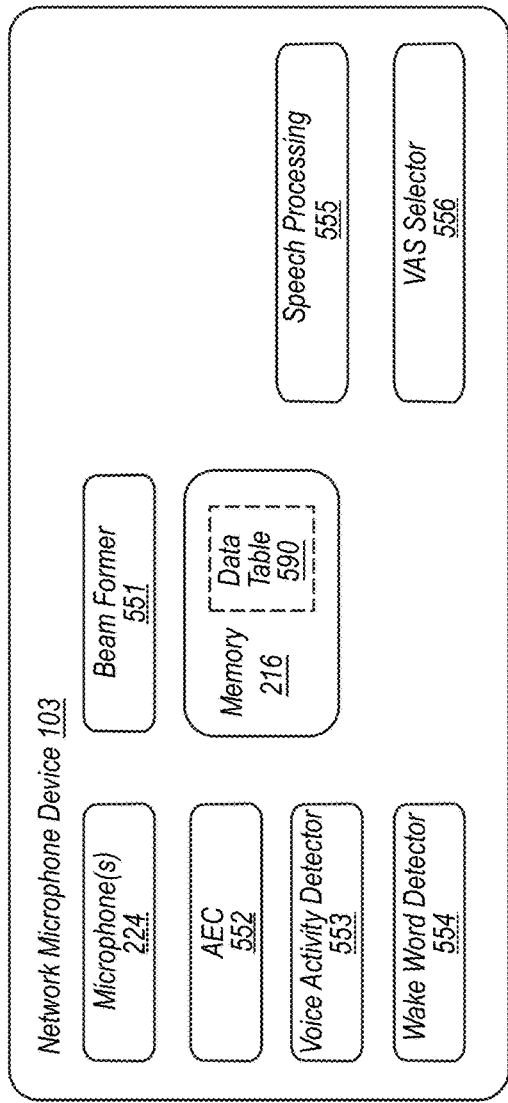
FIG. 5A is a functional block diagram of an example network microphone device in accordance with aspects of the disclosure.

FIG. 5A is a functional block diagram showing additional features of one or more of the NMDs 103 in accordance with aspects of the disclosure. The network microphone device shown in FIG. 5A may include components that are generally similar to certain components of network microphone devices described above, such as the processor 212 (FIG. 2A), network interface 230 (FIG. 2A), microphone(s) 224, and the memory 216. Although not shown for purposes of clarity, a network microphone device may include other components, such as speakers, amplifiers, signal processors, as discussed above.

The microphone(s) 224 may be a plurality of microphones arranged to detect sound in the environment of the network microphone device. In one example, the microphone(s) 224 may be arranged to detect audio from one or more directions relative to the network microphone device. The microphone(s) 224 may be sensitive to a portion of a frequency range. In one example, a first subset of the microphone(s) 224 may be sensitive to a first frequency range, while a second subset of the microphone(s) 224 may be sensitive to a second frequency range. The microphone(s) 224 may further be arranged to capture location information of an audio source (e.g., voice, audible sound) and/or to assist in filtering background noise. Notably, in some embodiments the microphone(s) 224 may have a single microphone rather than a plurality of microphones.

A network microphone device may further include beam former components 551, acoustic echo cancellation (AEC) components 552, voice activity detector components 553, and/or wake word detector components 554. In various embodiments, one or more of the components 551-556 may be a subcomponent of the processor 512.

The beamforming and AEC components 551 and 552 are configured to detect an audio signal and determine aspects of voice input within the detect audio, such as the direction, amplitude, frequency spectrum, etc. For example, the beamforming and AEC components 551 and 552 may be used in a process to determine an approximate distance between a network microphone device and a user speaking to the network microphone device. In another example, a network microphone device may detective a relative proximity of a user to another network microphone device in a media playback system.

The voice activity detector activity components 553 are configured to work closely with the beamforming and AEC components 551 and 552 to capture sound from directions where voice activity is detected. Potential speech directions can be identified by monitoring metrics which distinguish speech from other sounds. Such metrics can include, for example, energy within the speech band relative to background noise and entropy within the speech band, which is measure of spectral structure. Speech typically has a lower entropy than most common background noise.

The wake-word detector components 554 are configured to monitor and analyze received audio to determine if any wake words are present in the audio. The wake-word detector components 554 may analyze the received audio using a wake word detection algorithm. If the wake-word detector 554 detects a wake word, a network microphone device may process voice input contained in the received audio. Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

In some embodiments, the wake word detector 554 runs multiple wake word detections algorithms on the received audio simultaneously (or substantially simultaneously). As noted above, different voice services (e.g. AMAZON's Alexa®, APPLE's Siri®, MICROSOFT's Cortana®, GOOGLE'S Assistant, etc.) each use a different wake word for invoking their respective voice service. To support multiple services, the wake word detector 554 may run the received audio through the wake word detection algorithm for each supported voice service in parallel. In such embodiments, the network microphone device 103 may include VAS selector components 556 configured to pass voice input to the appropriate voice assistant service. In other embodiments, the VAS selector components 556 may be omitted. In some embodiments, individual NMDs 103 of the MPS 100 may be configured to run different wake word detection algorithms associated with particular VASes. For example, the NMDs of playback devices 102a and 102b of the Living Room may be associated with AMAZON's ALEXA®, and be configured to run a corresponding wake word detection algorithm (e.g., configured to detect the wake word "Alexa" or other associated wake word), while the NMD of playback device 102f in the Kitchen may be associated with GOOGLE's Assistant, and be configured to run a corresponding wake word detection algorithm (e.g., configured to detect the wake word "OK, Google" or other associated wake word).

In some embodiments, a network microphone device may include speech processing components 555 configured to further facilitate voice processing, such as by performing voice recognition trained to recognize a particular user or a particular set of users associated with a household. Voice recognition software may implement voice-processing algorithms that are tuned to specific voice profile(s).

In some embodiments, one or more of the components 551-556 described above can operate in conjunction with the microphone(s) 224 to detect and store a user's voice profile, which may be associated with a user account of the MPS 100. In some embodiments, voice profiles may be stored as and/or compared to variables stored in the set of command information, or data table 590, as shown in FIG. 5A. The voice profile may include aspects of the tone or frequency of user's voice and/or other unique aspects of the user such as those described in previously referenced U.S. patent application Ser. No. 15/438,749.

In some embodiments, one or more of the components 551-556 described above can operate in conjunction with the microphone array 524 to determine the location of a user in the home environment and/or relative to a location of one or more of the NMDs 103. Techniques for determining the location or proximity of a user may include or more techniques disclosed in previously referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." Each of these applications is incorporated herein by reference in its entirety.

Figure 5B:
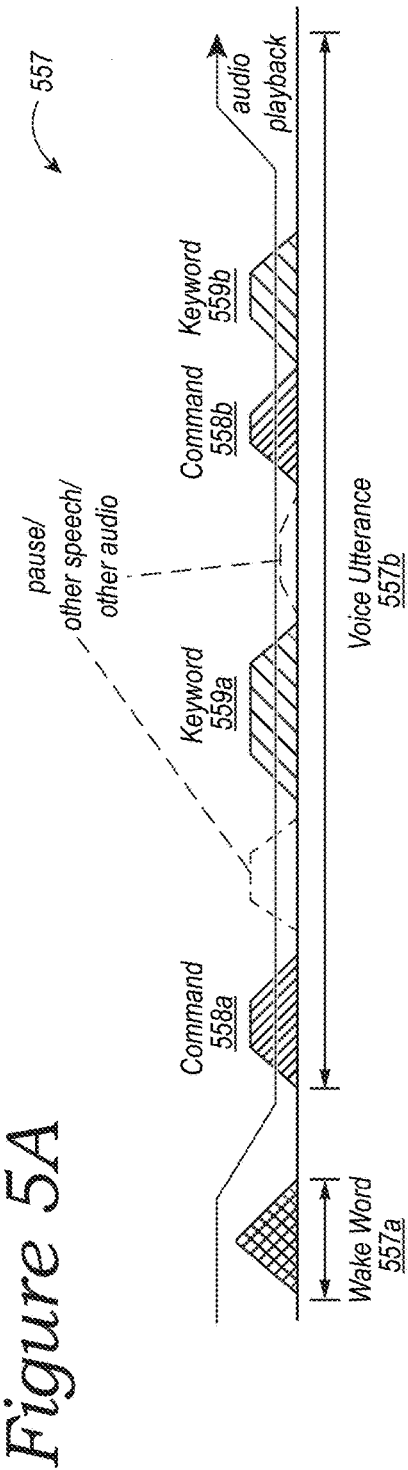
FIG. 5B is a diagram of an example voice input in accordance with aspects of the disclosure.

FIG. 5B is a diagram of an example voice input in accordance with aspects of the disclosure. The voice input may be captured by a network microphone device, such as by one or more of the NMDs 103 shown in FIG. 1A. The voice input may include a wake word portion 557a and a voice utterance portion 557b (collectively "voice input 557"). In some embodiments, the wake word 557a can be a known wake word, such as "Alexa," which is associated with AMAZON's Alexa®. In other embodiments, the voice input 557 may not include a wake word.

In some embodiments, a network microphone device may output an audible and/or visible response upon detection of the wake word portion 557a. In addition or alternately, a network microphone device may output an audible and/or visible response after processing a voice input and/or a series of voice inputs (e.g., in the case of a multi-turn request).

The voice utterance portion 557b of the voice input 557 may include, for example, one or more spoken commands 558 (identified individually as a first command 558a and a second command 558b) and one or more spoken keywords 559 (identified individually as a first keyword 559a and a second keyword 559b). A keyword may be, for example, a word in the voice input identifying a particular device or group in the MPS 100. As used herein, the term "keyword" may refer to a single word (e.g., "Bedroom") or a group of words (e.g., "the Living Room"). In one example, the first command 557a can be a command to play music, such as a specific song, album, playlist, etc. In this example, the keywords 559 may be one or more words identifying one or more zones in which the music is to be played, such as the Living Room and the Dining Room (FIG. 1A). In some examples, the voice utterance portion 557b can include other information, such as detected pauses (e.g., periods of non-speech) between words spoken by a user, as shown in FIG. 5B. The pauses may demarcate the locations of separate commands, keywords, or other information spoke by the user within the voice utterance portion 557b.

In some embodiments, the MPS 100 is configured to temporarily reduce the volume of audio content that it is playing while detecting the wake word portion 557a. The MPS 100 may restore the volume after processing the voice input 557, as shown in FIG. 5B. Such a process can be referred to as ducking, examples of which are disclosed in previously referenced U.S. patent application Ser. No. 15/438,749.

f. Example Network and Remote Computing Systems

Figure 6:
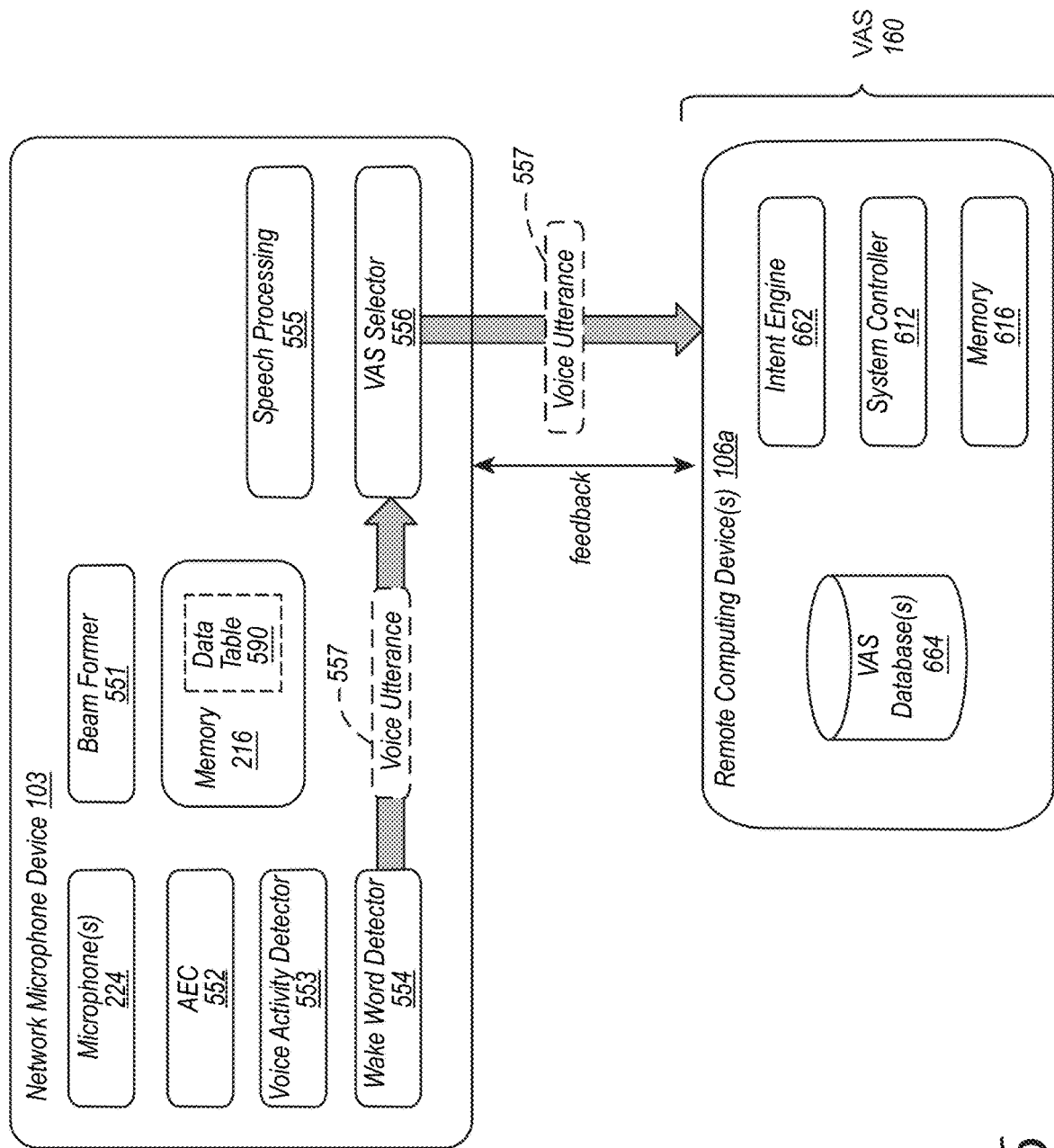
FIG. 6 is a functional block diagram of example remote computing device(s) in accordance with aspects of the disclosure.

As discussed above, the MPS 100 may be configured to communicate with one or more remote computing devices (e.g., cloud servers) associated with one or more VAS(es). FIG. 6 is a functional block diagram showing an example remote computing device(s) associated with an example VAS configured to communicate with the MPS 100. As shown in FIG. 6, in various embodiments one or more of the NMDs 103 may send voice inputs over a WAN 107 to the one or more remote computing device(s) associated with the one or more VAS(es). For purposes of illustration, selected communication paths of the voice input 557 are represented by arrows in FIG. 6. In some embodiments, the one or more NMDs 103 only send the voice utterance portion 557b (FIG. 5B) of the voice input 557 to the remote computing device(s) associated with the one or more VAS(es) (and not the wake word portion 557a). In some embodiments, the one or more NMDs 103 send both the voice utterance portion 557b and the wake word portion 557a (FIG. 5B) to the remote computing device(s) associated with the one or more VAS (es).

As shown in FIG. 6, the remote computing device(s) associated with the VAS(es) may include a memory 616, an intent engine 662, and a system controller 612 comprising one or more processors. In some embodiments, the intent engine 662 is a subcomponent of the system controller 612. The memory 616 may be a tangible computer-readable medium configured to store instructions executable by the system controller 612 and/or one or more of the playback devices, NMDs, and/or controller devices 102-104.

The intent engine 662 may receive a voice input from the MPS 100 after it has been converted to text by a speech-to-text engine (not shown). In some embodiments, the speech-to-text engine is a component that is onboard the remote computing device(s) associated with the particular VAS. The speech-to-text engine may additionally or alternatively be located at or distributed across one or more other computing devices, such as the one or more remote computing devices 106d (FIG. 1B) and/or the one or more of the local network devices (e.g., one or more of the playback devices, the NMDs, and/or the controller devices 102-104) of the MPS 100.

Upon receiving the voice input 557 from the MPS 100, the intent engine 662 processes the voice input 557 and determines an intent of the voice input 557. While processing the voice input 557, the intent engine 662 may determine if certain command criteria are met for particular command (s) detected in the voice input 557. Command criteria for a given command in a voice input may be based, for example, on the inclusion of certain keywords within the voice input. In addition or alternately, command criteria for given command(s) may involve detection of one or more control state and/or zone state variables in conjunction with detecting the given command(s). Control state variables may include, for example, indicators identifying a level of volume, a queue associated with one or more device(s), and playback state, such as whether devices are playing a queue, paused, etc. Zone state variables may include, for example, indicators identifying which, if any, zone players are grouped. The command information may be stored in memory of e.g., the databases 664 and/or the memory 216 of the one or more network microphone devices.

In some embodiments, the intent engine 662 is in communication with one or more database(s) 664 associated with the selected VAS and/or one or more database(s) of the MPS 100. The VAS database(s) 664 and/or database(s) of the MPS 100 may store various user data, analytics, catalogs, and other information for NLU-related and/or other processing. The VAS database(s) 664 may reside in the memory 616 of the remote computing device(s) associated with the VAS or elsewhere, such as in memory of one or more of the remote computing devices 106d and/or local network devices (e.g., the playback devices, NMDs, and/or controller devices 102-104) of the MPS 100 (FIG. 1A). Likewise, the media playback system database(s) may reside in the memory of the remote computing device(s) and/or local network devices (e.g., the playback devices, NMDs, and/or controller devices 102-104) of the MPS 100 (FIG. 1A). In some embodiments, the VAS database(s) 664 and/or database(s) associated with the MPS 100 may be updated for adaptive learning and feedback based on the voice input processing.

The various local network devices 102-105 (FIG. 1A) and/or remote computing devices 106d of the MPS 100 may exchange various feedback, information, instructions, and/ or related data with the remote computing device(s) associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in previously referenced U.S. patent application Ser. No. 15/438, 749.

Figure 7:
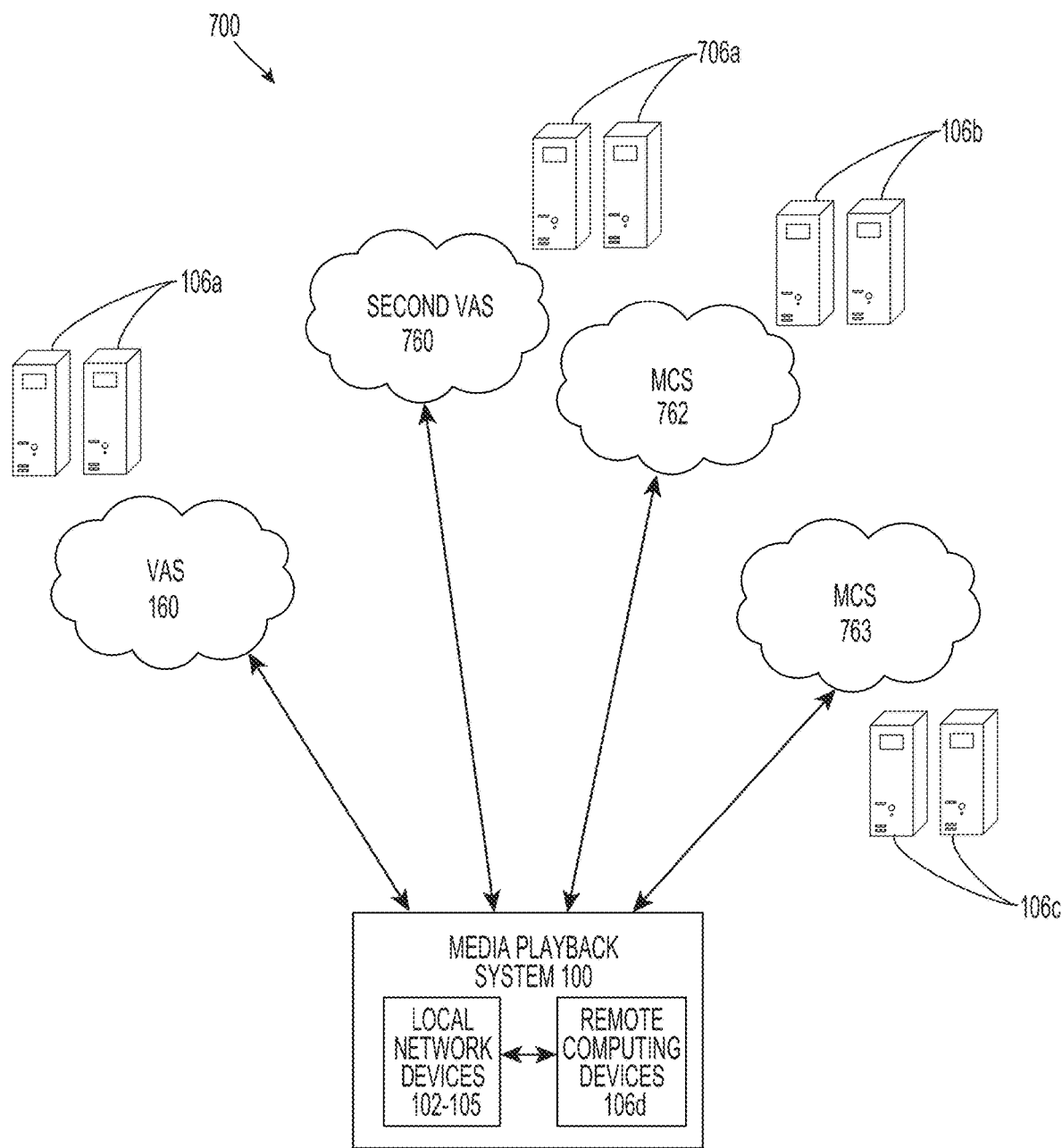
FIG. 7 is a schematic diagram of an example network system in accordance with aspects of the disclosure.

FIG. 7 depicts an example network system 700 in which a voice-assisted media content selection process is performed. The network system 700 comprises the MPS 100 coupled to: (i) the first VAS 160 and associated remote computing devices 106a; (ii) one or more second VAS(es) 760, each hosted by one or more corresponding remote computing devices 706a, and (iii) a plurality of MCS(es) 167, such as a first media content service 762 (or "MCS 762") hosted by one or more corresponding remote computing devices 106b, and a second media content service 763 (or "MCS 763") hosted by one or more corresponding remote computing devices 106c. In some embodiments, the MPS 100 may be coupled to more or fewer VASes (e.g., one VAS, three VASes, four VASes, five VASes, six VASes, etc.) and/or more or fewer media content services (e.g., one MCS, three MCSes, four MCSes, five MCSes, six MCSes, etc.).

As noted previously, in some embodiments, individual playback devices of the MPS 100 can be coupled to or associated with the first VAS 160 while other playback devices may be coupled to or associated with the second VAS 760. For example, a first playback device of the MPS 100 can be configured to detect a first wake word associated with first VAS 160 (e.g., "OK, Google" for GOOGLE's Assistant). Following detection of the first wake word, the first playback device can transmit a voice utterance to the first VAS 160 for further processing. Meanwhile, a second playback device of the MPS 100 can be configured to detect a second wake word associated with the second VAS 760 (e.g., "Alexa" for AMAZON's ALEXA). Following detection of the second wake word, the second playback device can transmit a voice utterance to the second VAS 760 for processing. As a result, the MPS 100 can enable a user to interact via voice-control with multiple different VASes.

The MPS 100 may be coupled to the VAS(es) 160, 760 and/or the first and second MCSes 762, 763 (and/or their associated remote computing devices 106a, 706a, 106b, and 106c) via a WAN and/or a LAN 111 connected to the WAN 107 and/or one or more routers 109 (FIG. 1B). In this way, the various local network devices 102-105 of the MPS 100 and/or the one or more remote computing devices 106d of the MPS 100 may communicate with the remote computing device(s) of the VAS(es) 160, 760 and the MCSes 762, 763.

In some embodiments, the MPS 100 may be configured to concurrently communicate with both the MCSes 167 and/or the VAS(es) 160, 760. For example, the MPS 100 may transmit search requests for particular content to both the first and second MCS(es) 762, 763 in parallel, and may send voice input data to one or more of the VAS(es) 160, 760 in parallel.

III. Example Systems and Methods for Associating Playback Devices with Voice Assistant Services FIG. 8 (including FIGS. 8A-8H) shows an example process flow for associating a voice assistant service (VAS) with one or more playback devices. As noted above, example VASes include AMAZON's ALEXA, GOOGLE's Assistant, APPLE's SIRI, MICROSOFT's CORTANA, etc. A VAS may be a remote service implemented by cloud servers to process voice inputs and perform certain actions in response. In some embodiments, a VAS can communicate with a playback device 102 via an integrated network microphone device 103. In other embodiments, a VAS can communicate with a separate microphone device (e.g., GOOGLE HOME, AMAZON's ECHO DOT, etc.) which in turn communicates with the playback device 102.

In the process flow illustrated in FIG. 8, a user can associate a first VAS (referred to in FIG. 8 as "VAS1") with one or more playback devices. This association can be established for either playback devices that include an integrated network microphone device, or for playback devices that do not include an integrated network microphone device, but that are coupled with a separate network microphone device (e.g., the playback device is in communication with the separate network microphone device over the LAN 111 (FIG. 1B)). Several of the steps illustrated in FIG. 8 can be performed via a control device 104 (FIG. 4) (for example, the graphical images can be displayed, and user input can be received, via user interface(s) 440). As described below, certain steps can be performed through a software control application running on a smartphone, tablet, or computer that is associated with the media playback system ("the MPS app"), while other steps can be performed through a separate software control application running on a smartphone, tablet, or computer that is associated with the first VAS ("the VAS1 app").

Figure 8A:
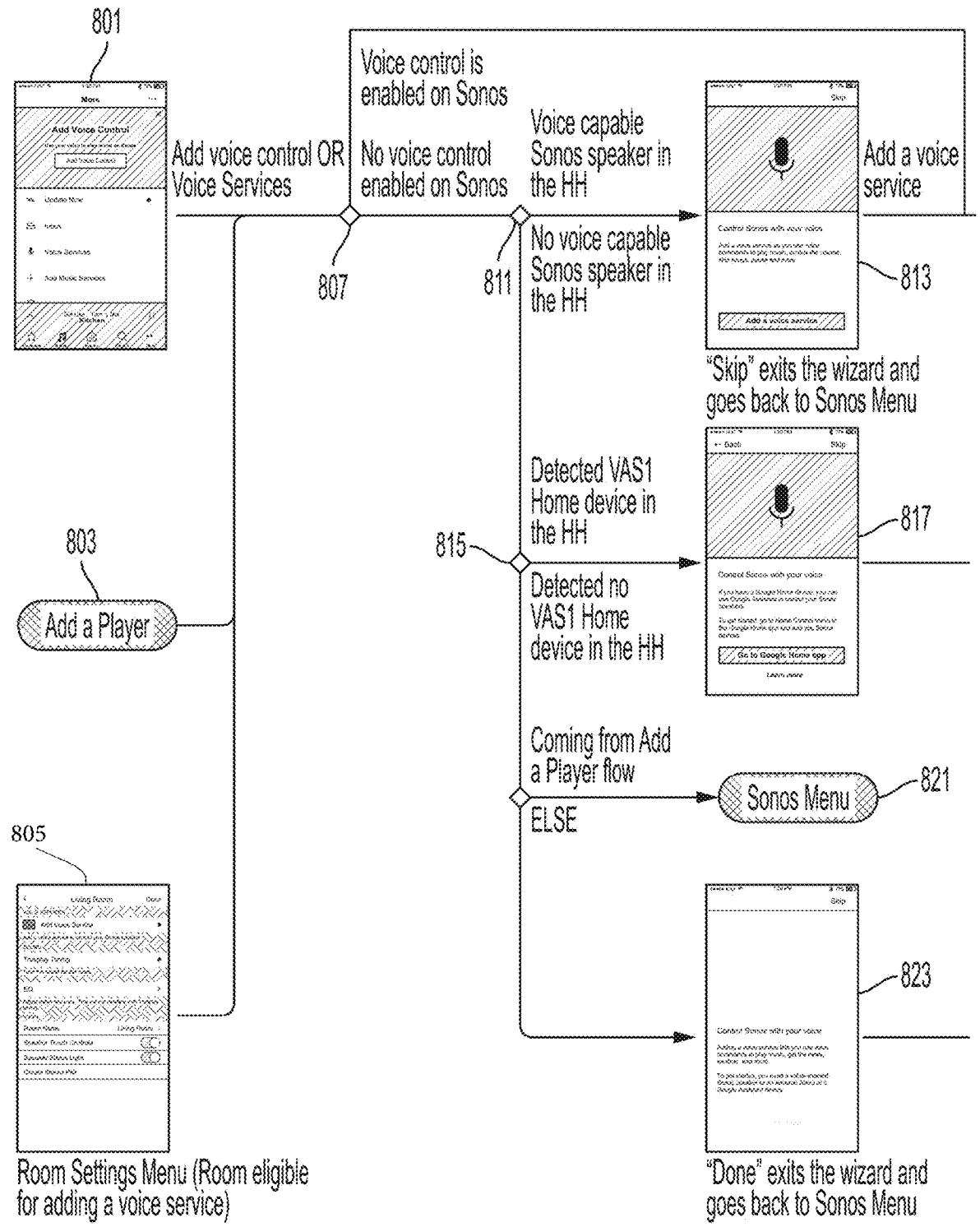
FIG. 8 (including FIGS. 8A-8H) is an example process flow for associating a voice assistant service with one or more playback devices of media playback system in accordance with aspects of the disclosure.

Referring to FIG. 8A, the process may begin in any one of three different stages. In interface 801, the user has the option to select "Add Voice Control" via the MPS app. In stage 803, the user may initiate the process by adding a new playback device to the MPS 100 (which may also be initiated via the MPS app). At interface 805, the user may select "Add Voice Service" via a Settings screen of the MPS app. Through either interfaces 801 or 805, or through selecting "Add a Player" at stage 803, the process 800 continues to decision block 807.

Figure 8B:
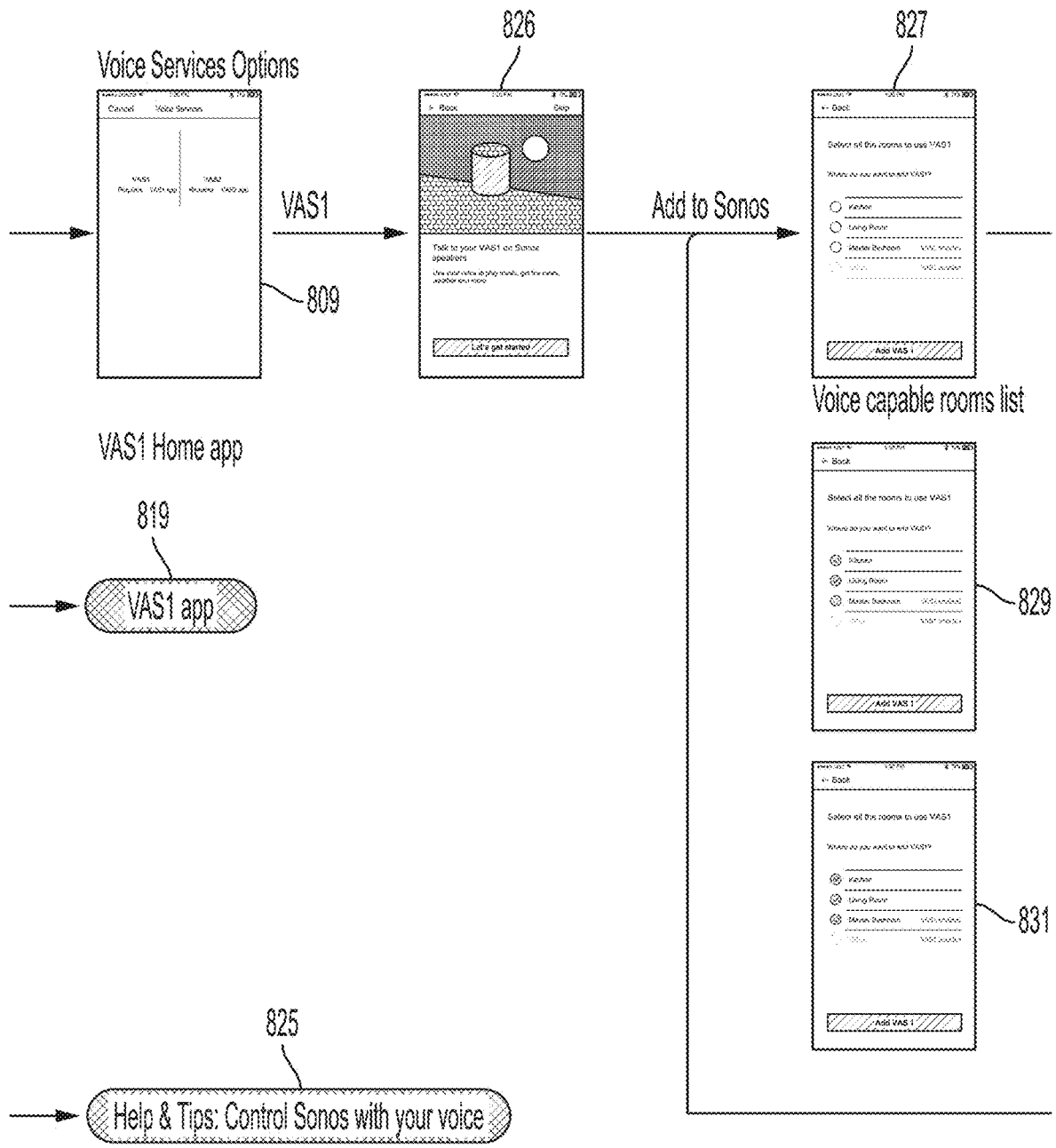

At decision block 807, if voice control has previously been enabled on the media playback system, then the process proceeds to FIG. 8B to select a voice service at interface 809. If, at decision block 807 of FIG. 8A, voice control has not previously been enabled on the media playback system, then the process continues to decision block 811 to determine whether a voice-capable playback device is present in the household. If there is a voice-capable playback device present, then the process proceeds to interface 813, where the user is prompted to select "Add a voice service."

If, in decision block 811, there is no voice-enabled playback device present in the household, the process continues to decision block 815 to determine whether a separate network microphone device associated with the first VAS (e.g., a VAS1 Home device) is present. If there is a VAS1 home device present, then the user is prompted, via interface 817, to access the VAS1 app. If, at interface 817, the user selects "Access the VAS1 app", the process continues to stage 819 in FIG. 8B with the user accessing the VAS1 app. Via the VAS1 app, the user can identify a previously configured network microphone device (e.g., a VAS1 home device) and associate that device with the selected playback device to enable voice control. For example, a non-voice-enabled playback device (e.g. a SONOS® PLAY:5™) may be coupled to a GOOGLE® HOME MINI networked microphone device. Together, the coupled devices can provide for voice-enabled control of audio playback. Additional details regarding identifying the presence of a VAS1 NMD can be found in U.S. Provisional Application No. 62/691,587, filed Jun. 28, 2018, which is hereby incorporated by reference in its entirety Returning to FIG. 8A, if, at decision block 815, there is no VAS1 home device present, the process returns to the main menu at stage 821 or else to interface 823, where the MPS app provides a user with a "Learn more" option to receive help and tips for accessing the enabled VAS. If this option is selected, the process proceeds to provide Help & Tips content at stage 825 (FIG. 8B). At this junction, the user has no detected voice-capable playback device and also has no separate VAS1 home device, and so the process is terminated without associating a VAS with a playback device.

Referring now FIG. 8B, the user is prompted, via user interface 809 of the MPS app, to select one among a plurality of VASes (here VAS1 and VAS2) to add to the particular playback device. After selection, the MPS app presents the selection (here, the user has selected VAS1) at interface 826 and prompts the user to continue the setup process (i.e., by selecting the "Let's get started" button).

FIG. 8B illustrates three variations of the interface that can follow the user's selection at interface 826. In each of interfaces 827, 829, and 831, the user interface can present all rooms that have voice-enabled devices (including playback devices with integrated network microphone devices as well as standalone network microphone devices). For example, as illustrated, the Kitchen and Living Room devices are not associated with any VAS, while the Master Bedroom device has been previously associated with another VAS (here VAS2). The Office device has been previously associated with VAS1, and so is not user-selectable at this interface. Using the radio buttons, the user can select the devices to which VAS1 should be added. If VAS1 has previously been added to a device (e.g., as with the "Office"), then the selection of Office can be grayed out to indicate that VAS1 cannot be added to this room. The user interface may also indicate rooms in which another VAS (e.g., VAS2) has previously been enabled, as with the "Master Bedroom" in which VAS2 has been enabled.

Figure 8C:
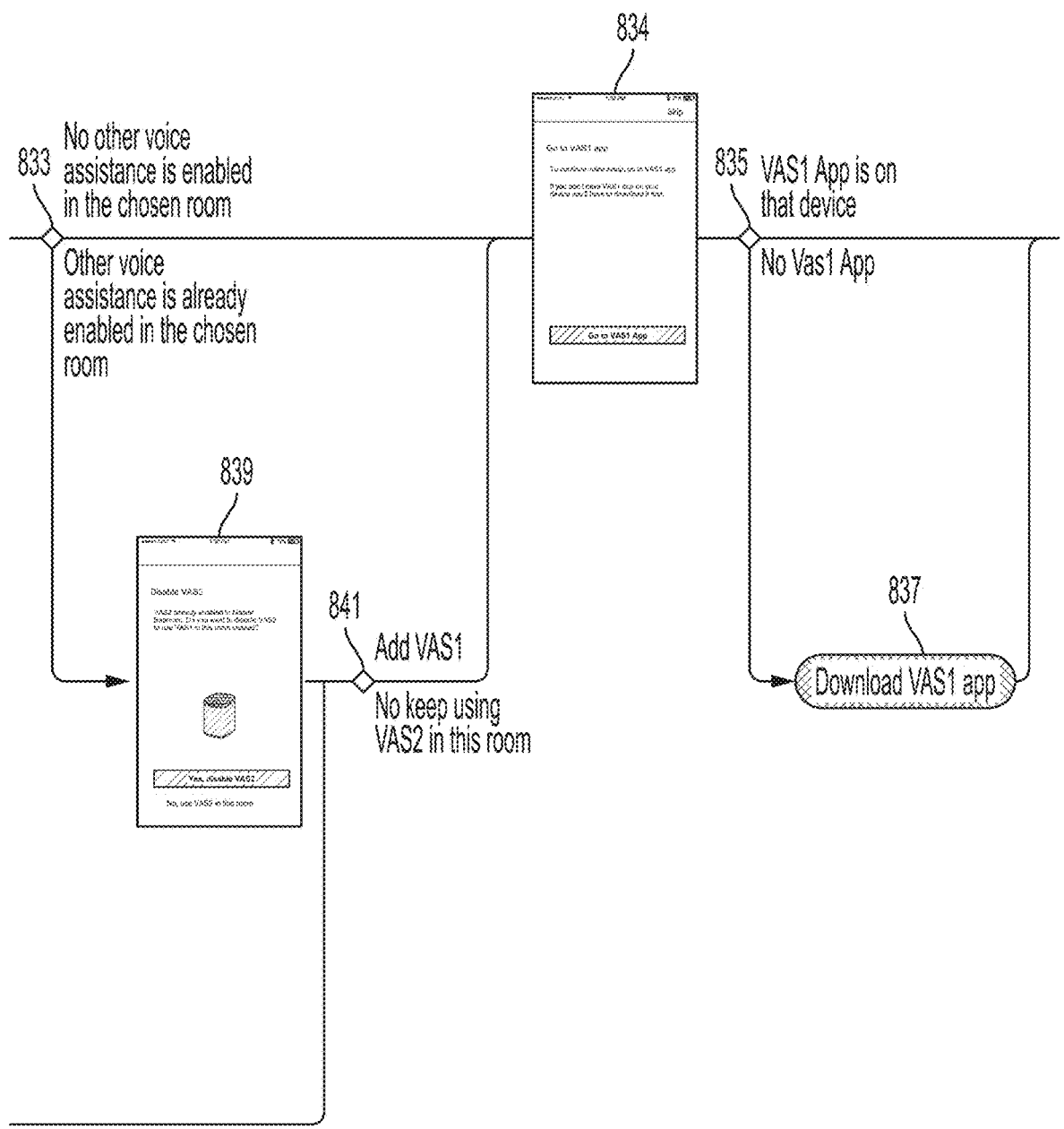
Figure 8D:
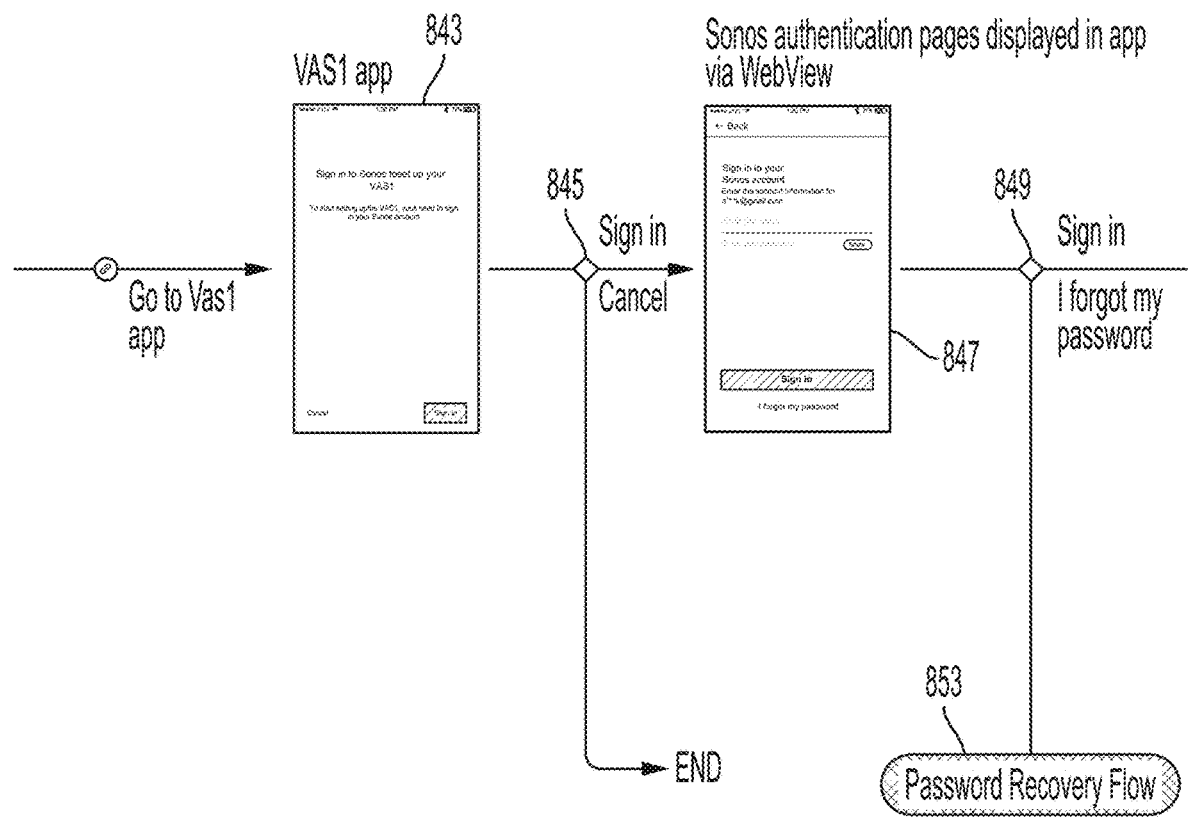
Figure 8E:
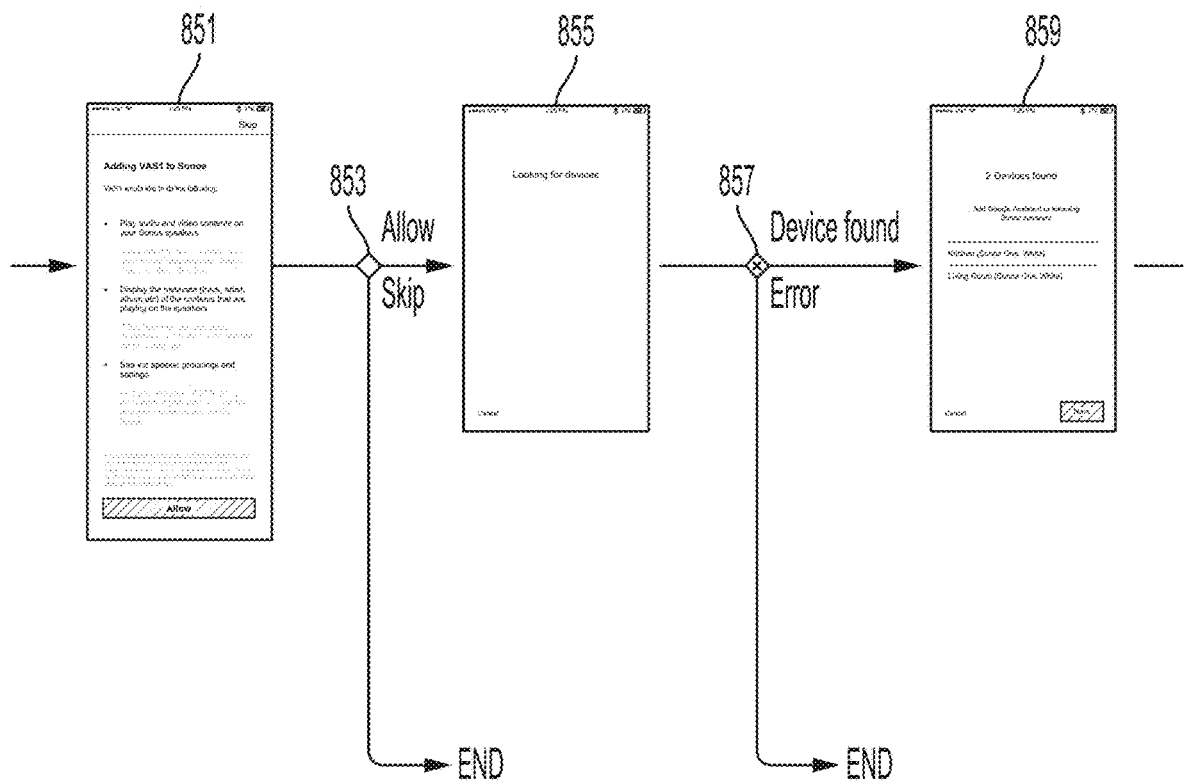
Figure 8F:
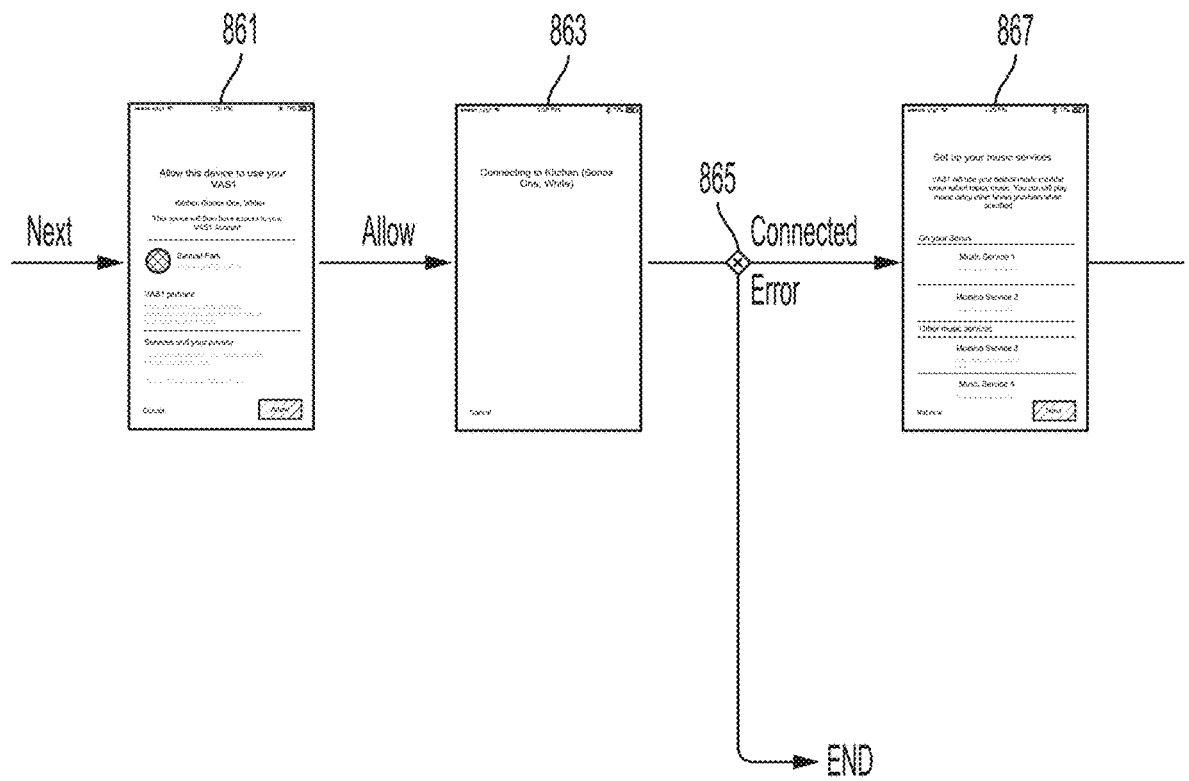

Once the user has selected, via one of interfaces 827, 829, or 831, the rooms to which VAS1 should be added, the process continues to FIG. 8C to decision block 833 to determine whether other voice assistance is enabled in the chosen room. If not, then the process continues to interface 834 to prompt the user to go to VAS1 app to continue the setup process. Once the user selects "Go to VAS1 App" at interface 834, the process continues to decision block 835 determine whether the VAS1 app has been installed on the user's device, and if not, the user is prompted to download the VAS1 app at stage 837.

Returning to decision block 833, if the process determines that other voice assistance is enabled in one or more of the chosen rooms, then the user is prompted via interface 839 to disable or unlink the previously enabled VAS (e.g., by displaying "Disable VAS2" and providing a first button labeled "Add VAS1" and a second button labeled "No, keep using VAS2"). As used herein, "disable" can indicate that the particular VAS will not be associated with the playback device and will not provide voice-control functionality. However, in some embodiments, the media playback system or the playback device can maintain the previously granted permissions, user credentials, and other information. Accordingly, if a user wishes to re-enable a previously disabled VAS, the process can be streamlined and the VAS can be re-enabled on a given playback device with relative ease.

In the illustrated embodiment, the user may only select one among several VASes for a particular room or playback device. Accordingly, if VAS2 was previously enabled in the Master Bedroom, then adding VAS1 to the Master Bedroom requires that VAS2 be unlinked or otherwise disabled from the Master Bedroom. If the user selects "No, keep using VAS2," at interface 839, then at decision block 841 the process returns to interfaces 827, 829, or 831 in FIG. 8B for adding a selected VAS to particular rooms. If, at interface 839, the user selects "Add VAS1," then at decision block 841 the process continues in FIG. 8C to decision block 835 to determine whether the VAS1 app is on the user's device as described previously. If the VAS1 app is not on the user's device, then the user is prompted to download the VAS1 app at stage 837. If the VAS1 app is on the user's device, then the process continues to FIG. 8D at interface 843.

Via interface 843, which can be displayed via the VAS1 app, the user is prompted to log into a user account associated with the MPS. If the user opts to sign in, then at decision block 845 the process continues to interface 847 to provide sign-in credentials. If, at decision block 845, the user selects cancel, then the process is terminated. Returning to interface 847, once the user provides credentials and selects "sign in," then at decision block 849 the process continues to interface 851 (FIG. 8E), where the user is prompted to provide permission to the VAS1 app to perform select functions, such as playing audio and video content over the playback device, display metadata, and view device groupings. If, at interface 847 (FIG. 8D), the user selects "I forgot my password," then at decision block 849 the process continues to stage 853 to initiate a password-retrieval process.

Returning to FIG. 8E, if, at interface 851, the user allows the requested access (e.g., by selecting the "Allow" button), then at decision block 853 of FIG. 8E the process continues to interface 855. If, at interface 855, the user selects "cancel," then at decision block 853 the process is terminated. Returning to interface 855, the VAS1 app searches for voice-capable devices. If one or more such devices are found, then at decision block 857, the process continues to interface 859, where the identified device(s) are displayed to the user to provide selection or confirmation of the playback device to associate with VAS1 (e.g., by selecting the "Next" button). In some embodiments, the user can select multiple devices at interface 859 to associate with VAS1, while in other embodiments the user may be restricted to associating a single identified device at a time. If no device is found, then at decision block 857 the process proceeds to display an error message. At interface 859, once the user confirms the identified device (e.g., by selecting the "Next" button), the process continues to block 861, where the user is prompted to provide permission for the selected device to use the user's account associated with VAS1. If the use grants permission via interface 861, then the process continues to interface 863, which displays a message while the selected playback device being connected to VAS1.

If the connection is successful, then in decision block 865 the process continues to interface 867, where the user is prompted to select from among a pre-populated list of available music service providers that VAS1 can use to provide playback via the device. The list of music service providers can include those providers previously associated with the user's media playback system as well as music services that have not yet been associated with the media playback system.

For music service providers (or other media service providers such as podcast services, audiobook services, etc.) that have been previously associated with the user's media playback system, the media playback system may have stored user credentials and log-in information. In some embodiments, these credentials can be shared with VAS1 to facilitate VAS1's interaction and control of these services. For example, if a user previously linked a SPOTIFY account to the user's media playback system, then during this stage of setting up a voice assistant service, the media playback system can transmit the user's log-in credentials for the user's SPOTIFY account to VAS1. As a result, VAS1 can interact directly with SPOTIFY without requiring the user to re-enter log-in credentials.

Figure 8G:
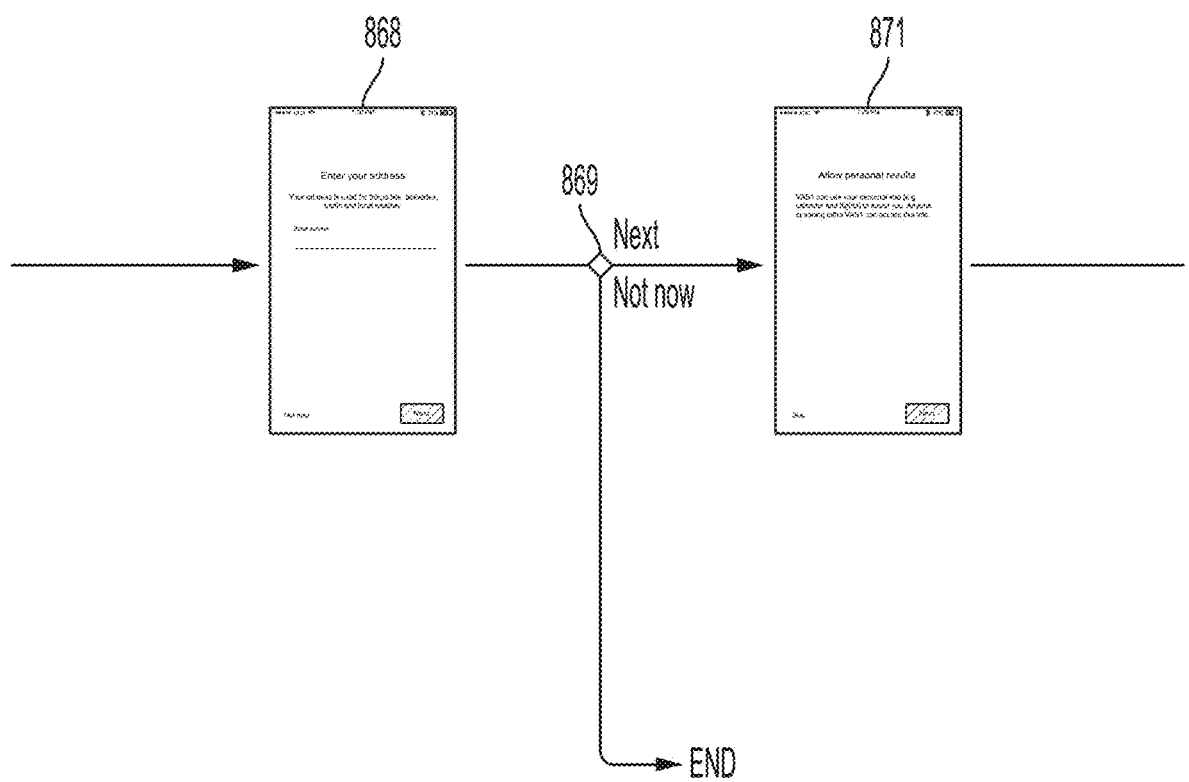

Once the user chooses one or more music service providers via interface 867 and selects "Next," the process continues FIG. 8G with interface 868, where the user is prompted to supply a home address and to allow personalized results provided via VAS1. In some embodiments, this information can be pre-populated for the user based on previously obtained information. Once a user provides the requested information or confirms the pre-populated information and selects the "Next" button, then at decision block 869 the process continues to interface 871, which prompts the user to provide permission for VAS1 to provide personalized results. If, at interface 868, the user selects "Not now" and does not provide a home address, then at decision block 869 the process terminates or can be redirected to another step in the process (e.g., interface 875).

At interface 871, the user can select "Next" to provide permission for personalized results or "Skip" to decline permission. If the user selects "Skip", then at decision block 871 of FIG. 8H, the process terminates or is redirected to another step in the process (e.g., interface 875). If the user selects "Next," then at decision block 873 the process continues to interface 875, which provides a message informing the user that the playback device has been set up with VAS1. The interface 875 shown illustrates a variety of possible keywords or phrases that a user can speak to engage VAS1 via the paired playback device. These keywords or phrases can be cognates to particular commands. Example cognates for the command "Play Music" include "Turn on the radio," "Play today's top hits," and "Play some upbeat pop." Example cognates for moving playback from one location to another include "Move the music to (room)," "Play this in (room), too," and "Take this into the (room)." Example cognates for Receiving Information from VAS1 include "What's the name of this song?", "When did Single Ladies come out?" and "When is Drake's concert near me?" Additional details regarding customization of cognates for various commands can be found in U.S. Provisional Application No. 62/691,587, filed Jun. 28, 2018, which is hereby incorporated by reference in its entirety.

Figure 8H:
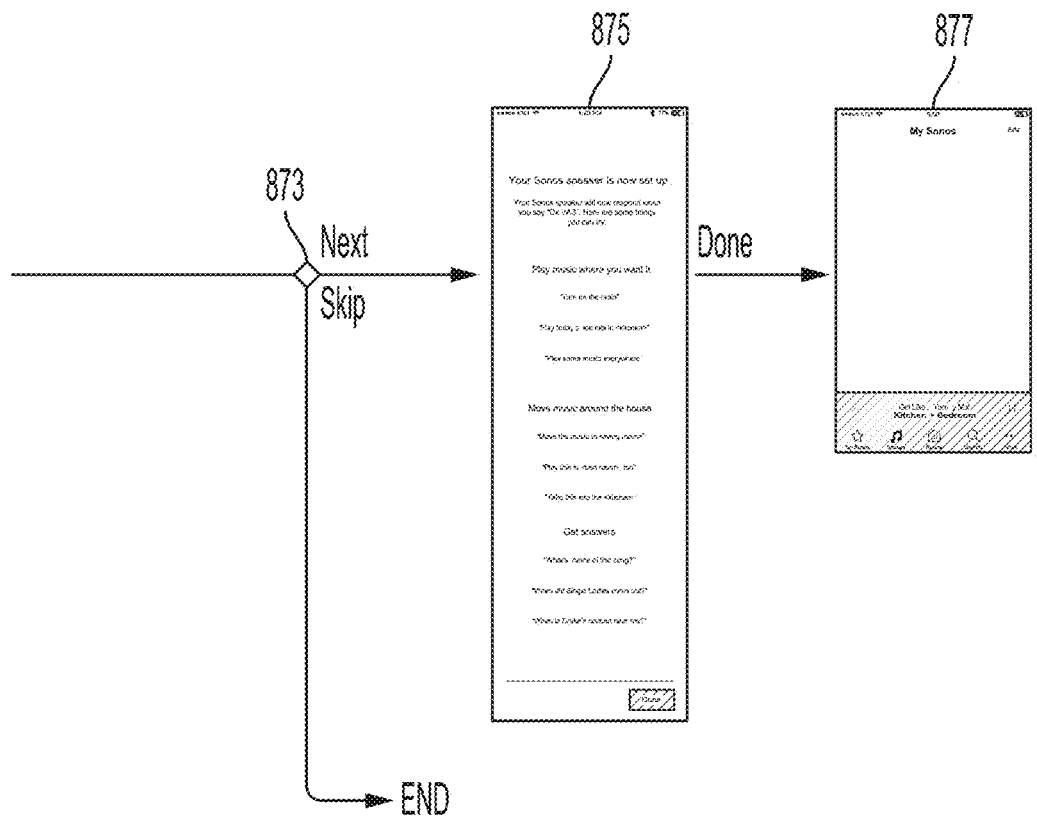

With continued reference to FIG. 8H, once the user selects "Done" via interface 875, then the process returns the user to MPS app, displaying interface 877 for example, and the setup process is complete. The process flow described above with respect to FIG. 8 is exemplary, and various modifications may be made in different embodiments. For example, the order of various steps may be altered, and certain steps may be omitted altogether (e.g., one or more of the confirmation screens or permission-requests may be omitted). Additionally, other steps may be incorporated into the process, for example allowing the user to customize additional aspects of the selected VAS1 for operation with the selected playback device.

Figure 9A:
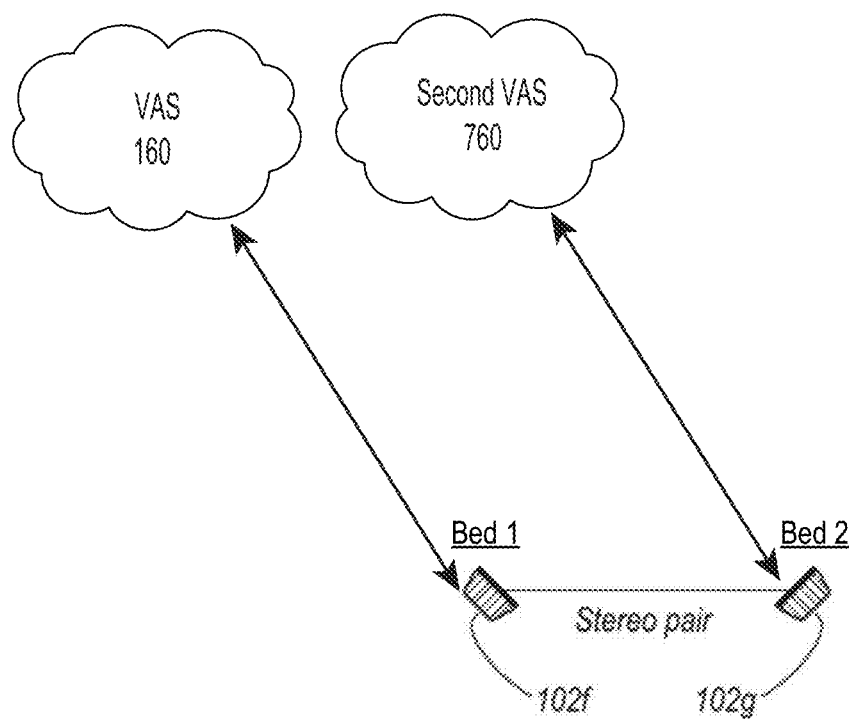
FIG. 9A illustrates a bonded pair of playback devices, each associated with a different voice assistant service in accordance with aspects of the disclosure.

FIG. 9A illustrates a bonded device pair with each device having a different associated VAS. As illustrated, the Bed1 playback device 102*f* and the Bed2 playback device 102*g* have been bonded to form a stereo pair. As a bonded pair, these playback devices can be presented to the media playback system for control as a single user interface (UI) entity. For example, the bonded pair can be presented to a user (e.g., via user interface 440 of FIG. 4) as a single device. While in some instances, such a stereo pair may be limited to a single VAS, in the illustrated embodiment each playback device 102*f* and 102*g* is associated with a separate VAS. Specifically, the Bed1 playback device 102*f* is associated with the first VAS 160 and the Bed2 playback device 102*g* is associated with the second VAS 760. For example, each of playback devices 102*f* and 102*g* can be associated with the respective VASes via a process as illustrated in FIG. 8. Before or after these playback devices have been enabled with their respective VASes, the playback devices can be bonded to form the stereo pair. As a result, a single stereo pair is enabled to interact with two different VASes. This can be extended to three, four, or more VASes with additional playback devices of a bonded zone being enabled with different VASes, as described below with respect to FIG. 9B.

Figure 9B:
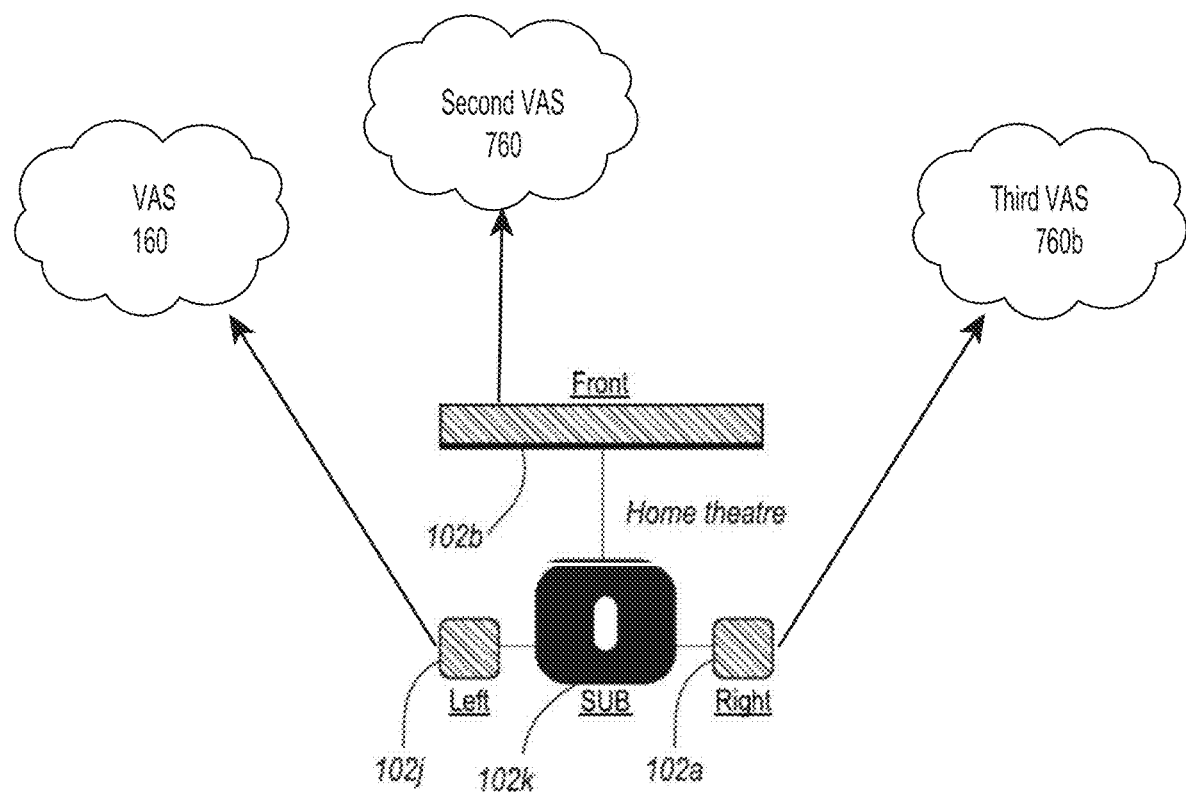
FIG. 9B illustrates a bonded zone of four playback devices, each associated with a different voice assistant service in accordance with aspects of the disclosure.

FIG. 9B illustrates a bonded zone of four playback devices, each associated with a different voice assistant service in accordance with aspects of the disclosure. Here, the bonded zone is a home theatre that includes a playback device 102*b* named Front that is bonded with the playback device 102*k* named SUB. The Front device 102*b* may render a range of mid to high frequencies and the SUB device 102*k* may render low frequencies as, e.g., a subwoofer. The Front and SUB devices 102*b* and 102*k* are further bonded with Right and Left playback devices 102*a* and 102*k*, respectively. In some implementations, the Right and Left devices 102*a* and 102*k* may form surround or "satellite" channels of a home theater system. The bonded playback devices 102*a*, 102*b*, 102*j*, and 102*k* together form a single bonded zone. As illustrated in FIG. 9B, each of these playback devices 102, 102*b*, 102*j*, and 102*k* can be associated with a different VAS (first VAS 160, second VAS 760, and third VAS 760*b*). As a result, a single home theatre zone is enabled to interact with four different VASes. In some embodiments, two or more of the individual playback devices of the bonded zone can be associated with the same VAS.

FIGS. 9C-9F illustrate example user interfaces for managing the VAS(es) associated with particular playback devices of a bonded zone in accordance with aspects of the disclosure. These example interfaces can be accessed, for example, using a Settings menu of the MPS app or other suitable software application. Specifically, the illustrated interfaces can be the Settings screen associated with a single zone (here, the Stereo (Zone B) zone, which includes the bonded stereo pair of Bed1 playback device 102*f* and Bed2 playback device 102*g* as shown in FIG. 9A). Using this interface, a user can add or change the VAS associated with individual devices of the bonded zone even after the bonded zone has been formed. In some embodiments, adding or adjusting the VAS associated with any given device of the bonded zone does not require that the bonded zone be re-established (e.g., the devices do not need to be re-calibrated, and the bonded zone remains intact).

Figure 9C:
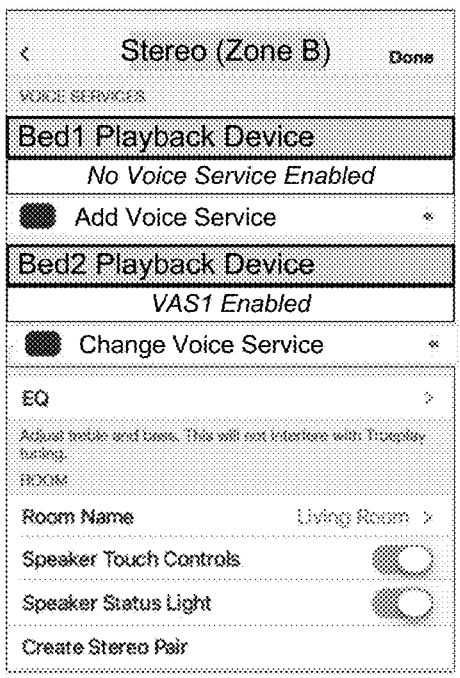
FIGS. 9C-9F illustrate example user interfaces for managing the VAS(es) associated with particular playback devices of a bonded zone in accordance with aspects of the disclosure.

In the example of FIG. 9C, the Bed1 playback device has no VAS enabled, and the user is presented with a button for "Add Voice Service" to add a new VAS. Meanwhile, the Bed2 playback device is indicated to already be associated with VAS1, and the user is presented with a "Change Voice Service" button if the user wishes to disable VAS1 on this device. Through this interface, the user can achieve various configurations of VAS associations with playback devices, including both devices having the same associated VAS, each device having a different associated VAS, or only one of the devices having an associated VAS, while the other has none.

Figure 9D:

FIG. 9D illustrates an example in which the Bed1 playback device and the Bed2 playback device each have VAS1 enabled. The user is able to individually change these VAS associations, if desired, including removing any VAS association from either of the devices.

Figure 9E:
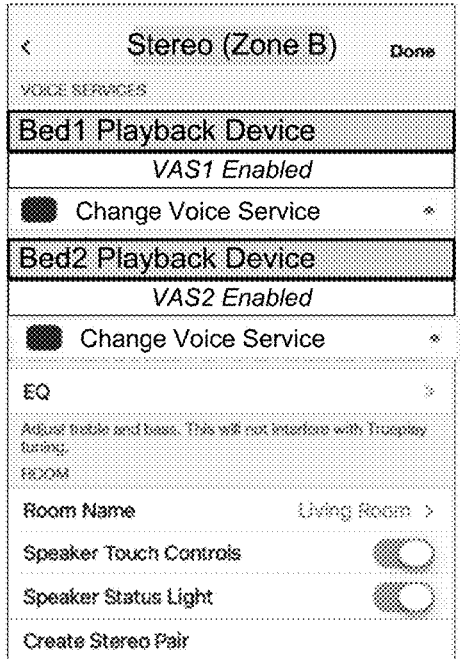

In FIG. 9E, the Bed1 playback device is associated with VAS1 while the Bed2 playback device is associated with VAS2. Again, these associations can be separately modified by the user as desired by selecting the "Change Voice Service" buttons.

Figure 9F:

FIG. 9F illustrates an example in which neither the Bed1 playback device nor the Bed2 playback device is associated with a VAS. By selecting the "Add Voice Service" button for either device, the user can associate a desired VAS with one or both of these playback devices.

Figure 10:
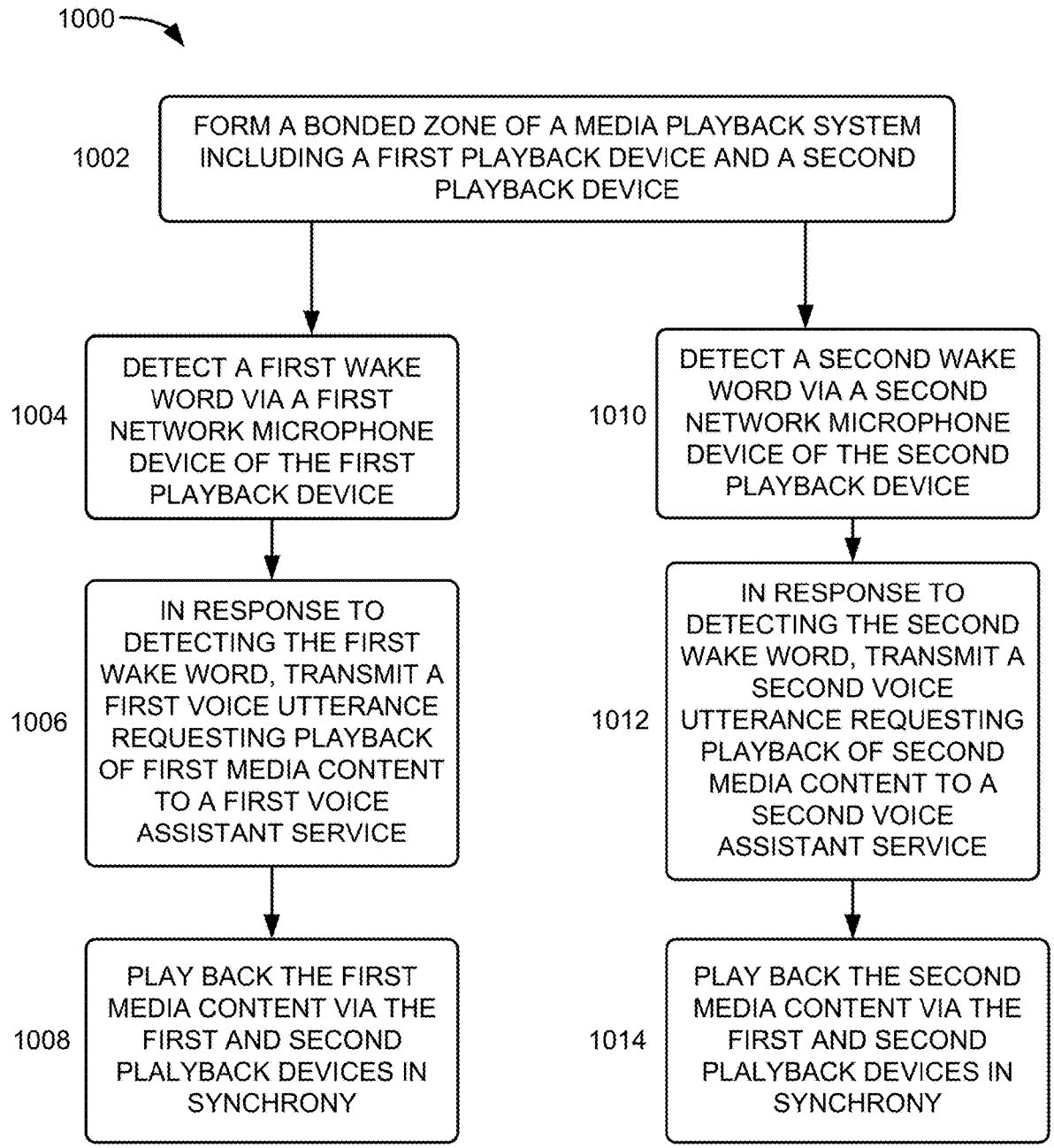
FIG. 10 illustrates an example method of interacting with two different voice assistant services via a bonded pair of playback devices in accordance with aspects of the disclosure.

In each instance shown in FIGS. 9C-9F, once the user selects "Add Voice Service" or "Change Voice Service," a process flow similar to that described above with respect to FIG. 8 can be initiated. For example, a user may be directed to interface 809 of FIG. 8B to select a particular VAS for association with the selected playback device. FIG. 10 illustrates an example method 1000 of utilizing a bonded device pair as shown in FIG. 9, in which each device has a different associated VAS. In block 1002, the method forms a bonded zone of a media playback system including a first playback device and a second playback device. For example, the first and second playback devices can be devices 102f and 102g shown in FIG. 9, which are bonded to form a stereo pair, and can be presented to the media playback system as a single user interface (UI) entity. For example, when displayed to a user via the user interface 440 of the controller device 104 (FIG. 4), the bonded pair can be displayed as a single "device" for control. As noted previously, the individual devices of the bonded zone can be assigned different playback responsibilities, such as responsibilities for certain audio channels. For example, the Bed1 playback device 102f may be configured to play a left channel audio component, while the Bed2 playback device 102g may be configured to play a right channel audio component. In various embodiments, additional playback devices can be bonded together to form a bonded zone, for example, three, four, five, or more playback devices can form a bonded zone.

The method 1000 continues in block 1004 with detecting a first wake word via a first network microphone device of the first playback device. For example, the Bed1 playback device 102f can include a networked microphone device 103 (FIG. 2) configured to receive audio input. The audio input can be a voice input 557, which includes a wake word 557a and a voice utterance 557b (FIG. 5B).

In block 1006, the method transmits a first voice utterance to a first voice assistant service in response to detecting the first wake word in block 1004. As noted previously, the voice utterance can follow the first wake word detected by the networked microphone device in block 1004, and the first voice utterance can be captured via the same networked microphone device. The voice utterance can take several forms, for example including a request for playback of first media content such as a particular song, album, podcast, etc. In other embodiments, the voice utterance can be a command to be performed locally by the playback device, such as grouping or bonding the device with other playback devices, adjusting playback volume of the device, deactivating the microphone of the device, or other suitable commands.

The method 1000 proceeds to block 1008 to play back the first media content via the first and second playback devices in synchrony. For example, the media playback system can receive the requested media content from the first voice assistant service. This requested media content is then played back via the bonded zone, which includes the first and second playback devices playing back the audio content in synchrony with one another.

Returning to block 1002, the method 1000 also proceeds along a second flow to block 1010 to detect a second wake word via second network microphone device of the second playback device. For example, the second playback device can be the Bed2 playback device 102g and can include a networked microphone device 103 (FIG. 2) configured to receive audio input. As noted previously, the audio input can be a voice input 557 that includes a wake word 557a and a voice utterance 557b (FIG. 5B). This detection of the second wake word can occur before or after the detection of the first wake word in block 1004.

In block 1012, the method 1000 transmits a second voice utterance requesting playback of second media content to a second VAS. As noted above, the voice utterance can follow the second wake word detected by the networked microphone device in block 1010, and the second voice utterance can be captured via the same networked microphone device.

The method 1000 continues in block 1014 with playing back the second media content via the first and second playback devices in synchrony. For example, the media playback system can receive the requested media content from the second voice assistant service. This requested media content is then played back via the bonded zone, which includes the first and second playback devices playing back the audio content in synchrony with one another.

In some embodiments, the second wake word can be different from the first wake word and may also be associated with a different VAS. For example, the first wake word detected in block 1004 may be "Alexa" and the first VAS may be AMAZON's ALEXA, while the second wake word detected in block 1010 can be "OK, Google" and the second VAS may be GOOGLE's Assistant. Various other configurations are possible. For example, the first or second wake word can be associated with local commands, and the first or second VAS can be a local service rather than one associated with one or more remote computing devices. For example, the second wake word can be "Hey Sonos" and the second voice assistant service can be a local VAS stored on one or more of the playback devices of the media playback system, configured to respond to voice input and perform commands (e.g., adjusting volume, grouping or bonding playback devices, deactivating microphones, etc.).

By associating individual devices of a bonded zone with different voice assistant services (which can have different corresponding wake words), the method allows a user to interact with a single UI entity (i.e., the bonded pair or zone, which appears as a single device via the media playback system) that can interact with two different VASes. Accordingly, even if individual playback devices cannot be associated with multiples VASes, a user may have access to multiple VASes via a single UI entity via the bonded zone. This advantageously allows a user to realize the benefits of multiple VASes, each of which may excel in different aspects, rather than requiring a user to limit her interactions to a single VAS to the exclusion of any others.

Figure 11:
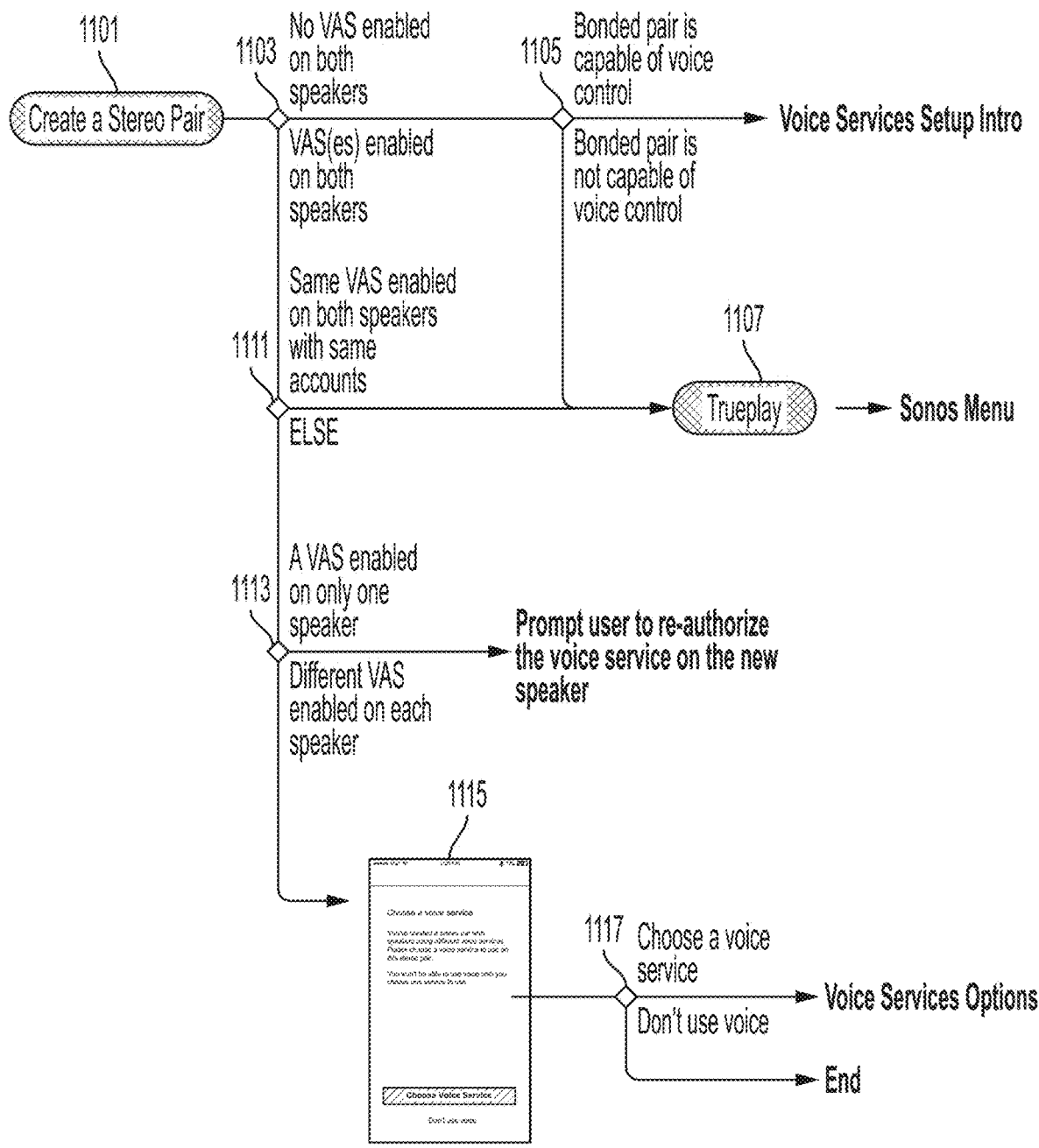
FIG. 11 is a flow diagram of an example process flow for associating a stereo pair of playback devices with a voice assistant service in accordance with aspects of the disclosure.

FIG. 11 is a process flow for associating a stereo pair of playback devices with a single voice assistant service. In some embodiments, it may be desirable to preclude a user from associating different individual devices of a bonded zone with different VASes. For example, with two devices of a stereo pair, or a plurality of devices of a home theatre setup, it may be desirable to limit the bonded zone to a single VAS. However, in some instances, devices may have previously been associated with different VASes prior to formation of the bonded zone. To accommodate the formation of a bonded zone without allowing multiple VASes, a process flow as outlined in FIG. 11 can be used. The process begins with bonding two playback devices to create a stereo pair. This can be achieved as described previously, for example via the MPS app, user voice input, or other suitable input that results in a bonded stereo pair. The process continues to decision block 1103 to determine whether either of the two playback devices has an associated VAS. If neither device has an associated VAS, then the process continues to decision block 1105 to determine whether the bonded pair is capable of voice control (i.e., whether the playback devices have integrated NMDs or associated NMDs through which to receive voice input). If, at decision block 1105, the bonded pair is capable of voice control, then the process continues to Voice Services Setup Intro (interface 813 in FIG. 8B). Following this flow, the bonded pair of devices can together be associated with a single VAS (e.g., VAS1 as described in FIG. 8). If, at decision block 1105, the bonded pair is not capable of voice control, then the process continues to Trueplay™ at stage 1107 for calibrating the devices for stereo playback for a particular room or space. In this instance, the bonded pair is not associated with any VAS.

Returning to decision block 1103, if both devices have an associated VAS, then the process continues to decision block 1111 to determine whether each device is associated with the same VAS. If so, then the process continues to Trueplay™ at stage 1107. In this instance, the bonded stereo pair is configured to be associated with a single VAS, which is the same VAS that each device was previously associated with.

If, in decision block 1111, both playback devices do not have the same associated VAS, the process continues to decision block 1113. If only one of the two playback devices has an associated VAS, then the user is prompted to re-authorize the VAS on the newly added playback device. For example, if the first playback device of the stereo pair has previously been associated with VAS1, while the second playback device has not been associated with any VAS, then once the two devices are bonded to form the stereo pair, the user can be prompted to authorize the second playback device to associate with VAS1. As a result, the bonded stereo pair can be configured to operate with VAS1.

At decision block 1113, if each playback device of the stereo pair has a different associated VAS, then the user is prompted via interface 1115 to select one among the two different VASes. In decision block 1117, if the user opts to select a VAS, then the process continues to Voice Services Options (interface 809 of FIG. 8). This flow will disable or unlink one of the playback devices from its previously associated VAS, and instead associate that playback device with the same VAS that is associated with the other device of the bonded pair. For example, if a first playback device of a bonded stereo pair is associated with VAS1, and a second playback device of the bonded stereo pair is associated with VAS2, then at interface 1115, the user is prompted to select VAS1 or VAS2 for the bonded stereo pair. If the user selects VAS2, then VAS1 will be disabled or unlinked from the first playback device, and instead the first playback device will be associated with VAS2. AS a result, the bonded stereo pair will be limited to association with a single VAS. If, at interface 115, the user selects "Don't use voice," then at decision block 1117 the process terminates and the bonded stereo pair will have no associated VAS.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

In addition to the examples described herein with respect to grouping and bonding playback devices, in some implementations multiple playback devices may be merged together. For example, a first playback device may be merged with a second playback device to form a single merged "device." The merged playback devices and may not be specifically assigned different playback responsibilities. That is, the merged playback devices and may, aside from playing audio content in synchrony, each play audio content as they would if they were not merged. However, the merged devices may present to the media playback system and/or to the user as a single user interface (UI) entity for control.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method comprising: detecting a first wake word via a first network microphone device of a first playback device; detecting a second wake word via a second network microphone device of a second playback device; forming a bonded zone of a media playback system, the bonded zone comprising the first playback device and the second playback device; in response to detecting the first wake word via the first network microphone device: transmitting a first voice utterance requesting playback of first media content to one or more remote computing devices associated with a first voice assistant service; and playing back the first media content via the first and second playback devices of the bonded zone in synchrony with one another; and in response to detecting the second wake word via the second network microphone device: transmitting a second voice utterance requesting playback of second media content to one or more remote computing devices associated with a second voice assistant service; and playing back the second media content via the first and second playback devices of the bonded zone in synchrony with one another. Example 2: The method of Example 1, wherein the first wake word is associated with the first voice assistant service, and the second wake word is associated with the second voice assistant service, and wherein the first wake word is different from the second wake word. Example 3: The method of Examples 1 or 2, wherein the at least a portion of the first voice utterance is additionally captured via the second network microphone device, and wherein the second network microphone device does not transmit the first voice utterance to the one or more remote computing devices associated with the second voice assistant service. Example 4: The method of any one of Examples 1-3, further comprising presenting, via the media playback system, the bonded zone as a single user interface (UI) entity. Example 5: The method of Example 4, wherein presenting the bonded zone comprises displaying, via a controller device of the media playback system, the bonded zone as a single device. Example 6: The method of any one of Examples 1-5, wherein forming the bonded zone is performed before detecting the first wake word and detecting the second wake word. Example 7: The method of any one of Examples 1-6, further comprising: before detecting the first wake word, associating the first network microphone device with a first wake word engine, and before detecting the second wake word, associating the second network microphone device with a second wake word engine, different from the first wake word engine. Example 8: The method of any one of Examples 1-7, wherein the first playback device and the second playback device are assigned different playback responsibilities when playing back the first media content and the second media content in synchrony with one another. Example 9: The method of any one of Examples 1-8, further comprising, after forming the bonded zone, calibrating the first playback device and the second playback device concurrently. Example 10: The method of any one of Examples 1-9, further comprising grouping a third playback device with the bonded zone, and wherein the playing back the first media content comprises playing back the first media content via the first, second, and third playback devices in synchrony with one another. Example 11: A media playback system, comprising: one or more processors; a first network microphone device; a second network microphone device; and tangible, non-transitory, computer-readable medium storing instructions executable by one or more processors to cause the media playback system to perform operations comprising: the method of any one of Examples 1-10. Example 12: Tangible, non-transitory, computer-readable medium storing instructions executable by one or more processors to cause a media playback system to perform operations comprising: the method of any one of Examples 1-10.

The invention claimed is:

1. A media playback system, comprising:
one or more processors;
a first network microphone device (NMD);
a second NMD; and
a tangible, non-transitory, computer-readable medium storing instructions executable by the one or more processors to cause the media playback system to perform operations comprising:
associating the first NMD with a first voice assistant service (VAS) such that the first NMD includes a first wake-word engine configured to detect a first wake word associated with the first VAS;
associating the second NMD with a second VAS such that the second NMD includes a second wake-word engine configured to detect a second wake word associated with the second VAS, the second wake word being different from the first wake word;
detecting the first wake word via the first NMD; and
after detecting the first wake word via the first NMD:
transmitting a first voice utterance requesting playback of media content to one or more remote computing devices associated with the first VAS;
playing back the media content via the first and second NMDs in synchrony with one another; and
transmitting a control state variable associated with at least the first NMD and the second NMD to the one or more remote computing devices associated with the second VAS.

2. The media playback system of claim 1, wherein the control state variable comprises queue information.

3. The media playback system of claim 2, wherein the queue information identifies the media content being played back via the first and second NMDs in synchrony with one another.

4. The media playback system of claim 1, wherein the operations further comprise:
detecting the second wake word via the second NMD;
after detecting the second wake word via the second NMD, transmitting a second voice utterance requesting playback of second media content to one or more remote computing devices associated with the first VAS;
playing back the second media content via the first and second NMDs in synchrony with one another; and
transmitting, from the first NMD, a second control state variable associated with at least the second NMD to the one or more remote computing devices associated with the first VAS.

5. The media playback system of claim 1, wherein the first and second NMDs are configured to have different playback responsibilities from one another.

6. The media playback system of claim 1, wherein the operations further comprise representing a synchrony group of the media playback system comprising the first NMD and the second NMD as a single user interface (UI) entity in the media playback system.

7. The media playback system of claim 6, wherein representing the single UI entity comprises displaying, via a controller device of the media playback system, a graphical representation of the single UI entity.

8. A method comprising:
associating a first network microphone device (NMD) with a first voice assistant service (VAS) such that the first NMD includes a first wake-word engine configured to detect a first wake word associated with the first VAS;
associating a second NMD with a second VAS such that the second NMD includes a second wake-word engine configured to detect a second wake word associated with the second VAS, the second wake word being different from the first wake word;
detecting the first wake word via the first NMD; and
after detecting the first wake word via the first NMD:
transmitting a first voice utterance requesting playback of media content to one or more remote computing devices associated with the first VAS;
playing back the media content via the first and second NMDs in synchrony with one another; and
transmitting, a control state variable associated with at least the first NMD and the second NMD to the one or more remote computing devices associated with the second VAS.

9. The method of claim 8, wherein the control state variable comprises queue information.

10. The method of claim 9, wherein the queue information identifies the media content being played back via the first and second NMDs in synchrony with one another.

11. The method of claim 8, further comprising:
detecting the second wake word via the second NMD;
after detecting the second wake word via the second NMD, transmitting a second voice utterance requesting playback of second media content to one or more remote computing devices associated with the first VAS;

playing back the second media content via the first and second NMDs in synchrony with one another; and transmitting, from the first NMD, a second control state variable associated with at least the second NMD to the one or more remote computing devices associated with the first VAS.

12. The method of claim 8, wherein the first and second NMDs are configured to have different playback responsibilities from one another.

13. The method of claim 8, further comprising representing a synchrony group of a media playback system comprising the first NMD and the second NMD as a single user interface (UI) entity in the media playback system.

14. The method of claim 13, wherein representing the single UI entity comprises displaying, via a controller device of the media playback system, a graphical representation of the single UI entity.

15. One or more tangible, non-transitory, computer-readable media storing instructions executable by one or more processors of a media playback system to cause the media playback system to perform operations comprising:

associating a first network microphone device (NMD) with a first voice assistant service (VAS) such that the first NMD includes a first wake-word engine configured to detect a first wake word associated with the first VAS;

associating a second NMD with a second VAS such that the second NMD includes a second wake-word engine configured to detect a second wake word associated with the second VAS, the second wake word being different from the first wake word;

detecting the first wake word via the first NMD; and after detecting the first wake word via the first NMD:

transmitting a first voice utterance requesting playback of media content to one or more remote computing devices associated with the first VAS;

playing back the media content via the first and second NMDs in synchrony with one another; and transmitting a control state variable associated with at least the first NMD and the second NMD to the one or more remote computing devices associated with the second VAS.

16. The computer-readable media of claim 15, wherein the control state variable comprises queue information.

17. The computer-readable media of claim 16, wherein the queue information identifies the media content being played back via the first and second NMDs in synchrony with one another.

18. The computer-readable media of claim 15, wherein the operations further comprise:

detecting the second wake word via the second NMD;

after detecting the second wake word via the second NMD, transmitting a second voice utterance requesting playback of second media content to one or more remote computing devices associated with the first VAS;

playing back the second media content via the first and second NMDs in synchrony with one another; and transmitting, from the first NMD, a second control state variable associated with at least the second NMD to the one or more remote computing devices associated with the first VAS.

19. The computer-readable media of claim 15, wherein the first and second NMDs are configured to have different playback responsibilities from one another.

20. The computer-readable media of claim 15, wherein the operations further comprise representing a synchrony group of the media playback system comprising the first NMD and the second NMD as a single user interface (UI) entity in the media playback system.

* * * * *

UNITED STATES PATENT AND TRADEMARK OFFICE
CERTIFICATE OF CORRECTION

| | |
|---|---|
| PATENT NO. | : 11,696,074 B2 |
| APPLICATION NO. | : 17/446690 |
| DATED | : July 4, 2023 |
| INVENTOR(S) | : Woo et al. |

It is certified that error appears in the above-identified patent and that said Letters Patent is hereby corrected as shown below:

On the Title Page

Item (57), in Column 2, under "Abstract", Line 8, delete "first voice first voice" and insert -- first voice --, therefor.

In the Claims

In Column 32, in Claim 8, Line 55, delete "transmitting," and insert -- transmitting --, therefor.

Signed and Sealed this
Fifteenth Day of August, 2023

Katherine Kelly Vidal
*Director of the United States Patent and Trademark Office*